US008145544B2

(12) United States Patent
Leal

(10) Patent No.: US 8,145,544 B2
(45) Date of Patent: Mar. 27, 2012

(54) METHOD AND SYSTEM FOR DEMAND AND SUPPLY MAP/SHOPPING PATH MODEL GRAPHICAL PLATFORM AND SUPPLYING OFFERS BASED ON PURCHASE INTENTIONS

(75) Inventor: Guilherme N. Leal, Alameda, CA (US)

(73) Assignee: Guiherme N. Leal, Alameda, CA (US)

( * ) Notice: Subject to any disclaimer, the term of this patent is extended or adjusted under 35 U.S.C. 154(b) by 1279 days.

(21) Appl. No.: 11/684,005

(22) Filed: Mar. 8, 2007

(65) Prior Publication Data

US 2007/0226082 A1    Sep. 27, 2007

Related U.S. Application Data

(60) Provisional application No. 60/780,942, filed on Mar. 8, 2006.

(51) Int. Cl.
*G06Q 30/00* (2006.01)
(52) U.S. Cl. .................. 705/27.1; 705/26.1; 705/27.2
(58) Field of Classification Search .................. 705/26, 705/27
See application file for complete search history.

(56) References Cited

U.S. PATENT DOCUMENTS

| | | | |
|---|---|---|---|
| 5,287,448 A | 2/1994 | Nicol et al. | |
| 5,710,887 A | 1/1998 | Chelliah et al. | |
| 5,727,174 A | 3/1998 | Aparicio, IV et al. | |
| 5,729,594 A | 3/1998 | Klingman | |
| 5,740,252 A | 4/1998 | Minor et al. | |
| 5,758,327 A | 5/1998 | Gardner et al. | |
| 5,758,328 A | 5/1998 | Giovannoli | |
| 5,765,138 A | 6/1998 | Aycock et al. | |
| 5,822,737 A | 10/1998 | Ogram | |
| 5,842,178 A | 11/1998 | Giovannoli | |
| 5,878,141 A | 3/1999 | Daly et al. | |
| 5,884,029 A | 3/1999 | Brush, II et al. | |
| 5,895,454 A | 4/1999 | Harrington | |
| 5,924,082 A | 7/1999 | Silverman et al. | |
| 5,926,798 A | 7/1999 | Carter | |
| 5,940,812 A | 8/1999 | Tengel et al. | |
| 5,946,665 A | 8/1999 | Suzuki et al. | |
| 5,983,200 A | 11/1999 | Slotznick | |

(Continued)

FOREIGN PATENT DOCUMENTS

GB     2319862     6/1998

(Continued)

OTHER PUBLICATIONS

War, economy and technology have mad impact on traveler's agenda (Michaelson, Jerry & Jan. News Sentinel. Knoxville, TN:. Nov. 30, 2003).*

(Continued)

*Primary Examiner* — Jeffrey A Smith
*Assistant Examiner* — Courtney Stopp
(74) *Attorney, Agent, or Firm* — Stephen J. LeBlanc; Quine Intellectual Property Law Group, P.C.

(57) ABSTRACT

Methods and systems allowing a consumer to use a graphical tool that summarizes, compares and browses multiple offers for products or services over a network or communications medium such as via the Internet. In specific embodiments, potential purchasers can make declarations to buy, which sellers can use to generate improved and customized offers.

16 Claims, 70 Drawing Sheets

U.S. PATENT DOCUMENTS

| | | | |
|---|---|---|---|
| 6,009,413 A | 12/1999 | Webber et al. |
| 6,032,129 A | 2/2000 | Greef et al. |
| 6,035,283 A | 3/2000 | Rofrano |
| 6,035,288 A | 3/2000 | Solomon |
| 6,041,308 A | 3/2000 | Walker et al. |
| 6,055,519 A | 4/2000 | Kennedy et al. |
| 6,058,379 A | 5/2000 | Odom et al. |
| 6,058,417 A | 5/2000 | Hess et al. |
| 6,064,981 A | 5/2000 | Barni et al. |
| 6,085,169 A | 7/2000 | Walker |
| 6,119,101 A | 9/2000 | Peckover |
| 6,360,206 B1 | 3/2002 | Yamashita |
| 6,574,608 B1 | 6/2003 | Dahod |
| 6,587,835 B1 | 7/2003 | Treyz |
| 6,604,681 B1 | 8/2003 | Burke |
| 6,704,716 B1 | 3/2004 | Force |
| 6,837,436 B2 | 1/2005 | Swartz |
| 6,868,392 B1 | 3/2005 | Ogasawara |
| 6,873,967 B1 | 3/2005 | Kalagnanam |
| 6,876,977 B1 | 4/2005 | Marks |
| 7,010,501 B1 | 3/2006 | Roslak |
| 7,063,263 B2 | 6/2006 | Swartz |
| 7,120,595 B2 | 10/2006 | Alexander |
| 7,177,818 B2 | 2/2007 | Nair |
| 7,188,081 B1 | 3/2007 | Shah |
| 7,195,157 B2 | 3/2007 | Swartz |
| 7,233,913 B2 | 6/2007 | Scroggie |
| 7,305,355 B2 | 12/2007 | Tarvydas |
| 7,386,477 B2 | 6/2008 | Fano |
| 7,680,694 B2 | 3/2010 | Glazer |
| 7,734,508 B2 | 6/2010 | Hayes |
| 2001/0032194 A1 | 10/2001 | Kutsuzawa |
| 2002/0026380 A1 | 2/2002 | Su |
| 2002/0038255 A1 | 3/2002 | Tarvydas |
| 2002/0052779 A1 | 5/2002 | Landesmann |
| 2002/0059147 A1 | 5/2002 | Ogasawara |
| 2002/0077927 A1 | 6/2002 | Lasnier |
| 2002/0133432 A1 | 9/2002 | Yamashita |
| 2002/0156685 A1 | 10/2002 | Ehrlich |
| 2002/0194303 A1 | 12/2002 | Suila |
| 2003/0004831 A1 | 1/2003 | Owens |
| 2003/0120550 A1 | 6/2003 | Peyrelevade |
| 2003/0132298 A1 | 7/2003 | Swartz |
| 2003/0154135 A1 | 8/2003 | Covington |
| 2005/0034161 A1 | 2/2005 | Brown |
| 2005/0040230 A1 | 2/2005 | Swartz |
| 2005/0096997 A1 | 5/2005 | Jain |
| 2006/0219780 A1 | 10/2006 | Swartz |
| 2006/0247978 A1 | 11/2006 | Davis |
| 2007/0073641 A1* | 3/2007 | Perry et al. .................. 707/2 |
| 2007/0073717 A1 | 3/2007 | Ramer |
| 2007/0094080 A1 | 4/2007 | Wiken |
| 2007/0100705 A1 | 5/2007 | Chen |
| 2007/0192203 A1 | 8/2007 | Di Stefano |
| 2007/0192294 A1 | 8/2007 | Ramer |
| 2007/0208629 A1 | 9/2007 | Jung |
| 2007/0210155 A1 | 9/2007 | Swartz |
| 2007/0299736 A1 | 12/2007 | Perrochon |
| 2008/0040240 A1 | 2/2008 | Covington |
| 2008/0046331 A1 | 2/2008 | Rand |
| 2008/0086386 A1 | 4/2008 | Bell |
| 2008/0140577 A1 | 6/2008 | Rahman |
| 2008/0245863 A1 | 10/2008 | Buchheit |
| 2009/0093902 A1 | 4/2009 | Tiozzo |
| 2009/0138376 A1 | 5/2009 | Smyers |

FOREIGN PATENT DOCUMENTS

| | | |
|---|---|---|
| GB | 2352856 | 7/2001 |
| WO | WO/95/024687 | 9/1995 |
| WO | WO/00/055787 | 9/2000 |
| WO | WO/01/020522 | 3/2001 |

OTHER PUBLICATIONS www.freemarkets.com (on Jun. 5, 2004 as archived by www.archive. org). Website retrieved Jan. 13, 2012 from www.archive.org.*
Software for purchasing dated Oct. 21, 1993 as retrieved on Dialog Jan. 13, 2012.*
www(.)freemarkets(.)com.
No Author, "Software for Purchasing", Purchasing, v115, n6, p49, Oct. 21, 1993. Retrieved from Dialog File: 148, Acct#:06757539.

* cited by examiner

Fig. 2

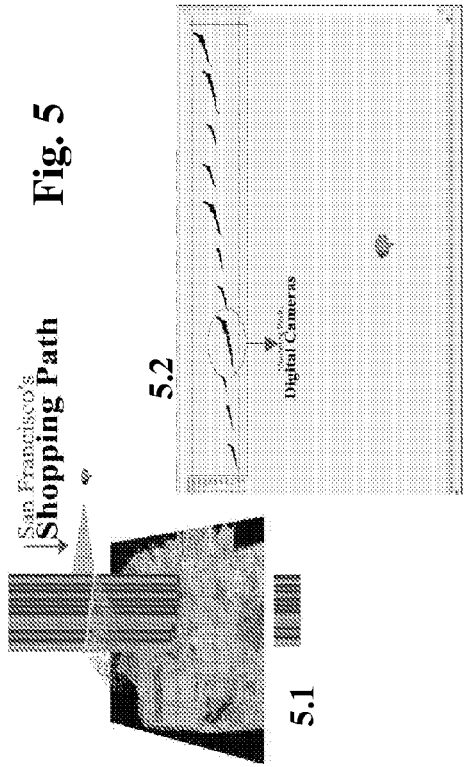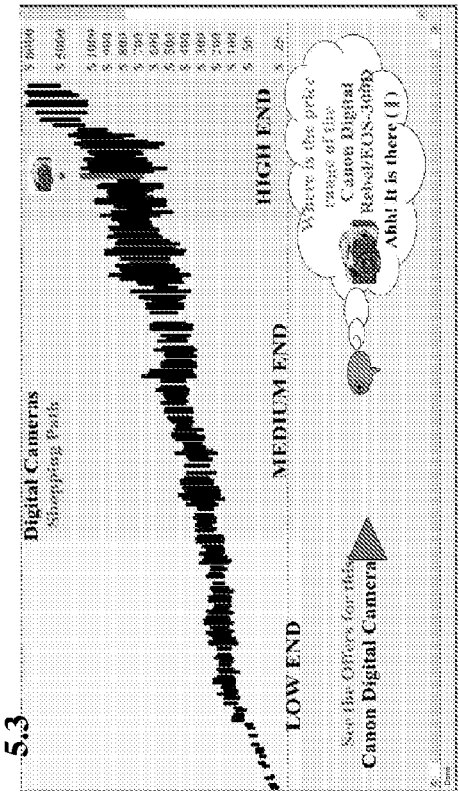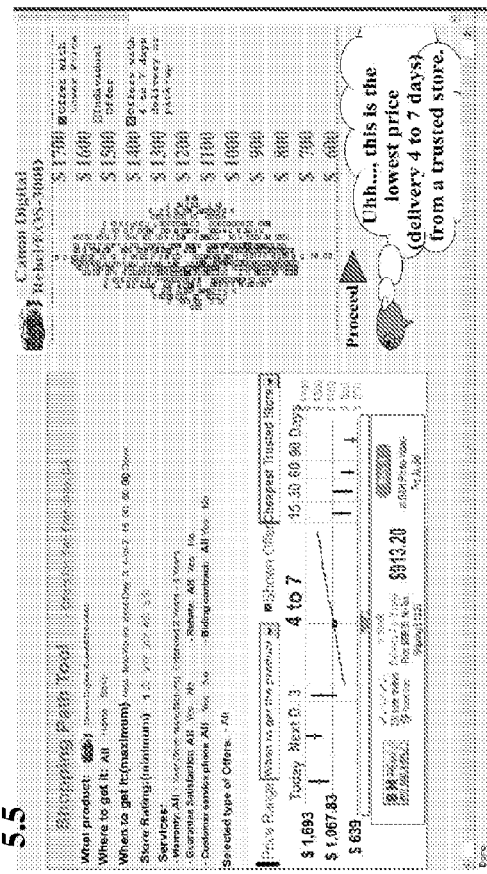
Fig. 5

Fig. 6
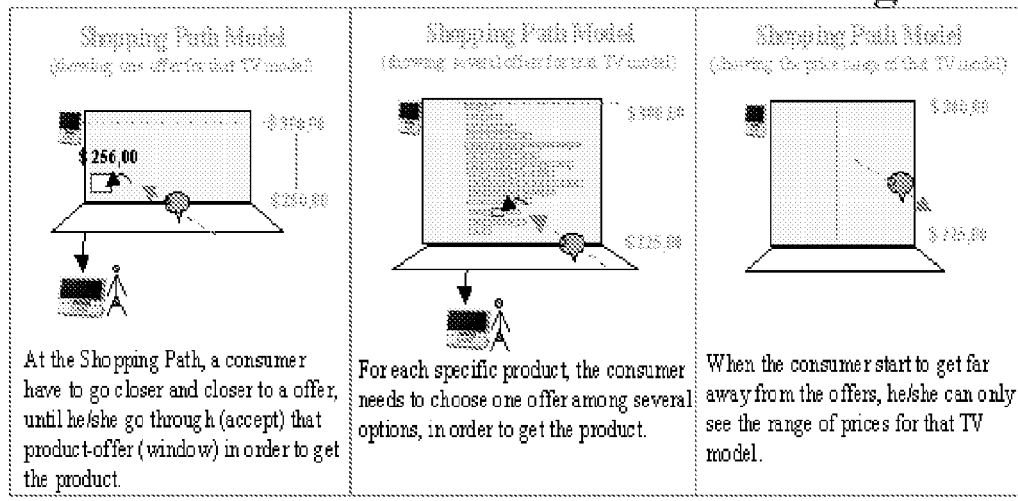
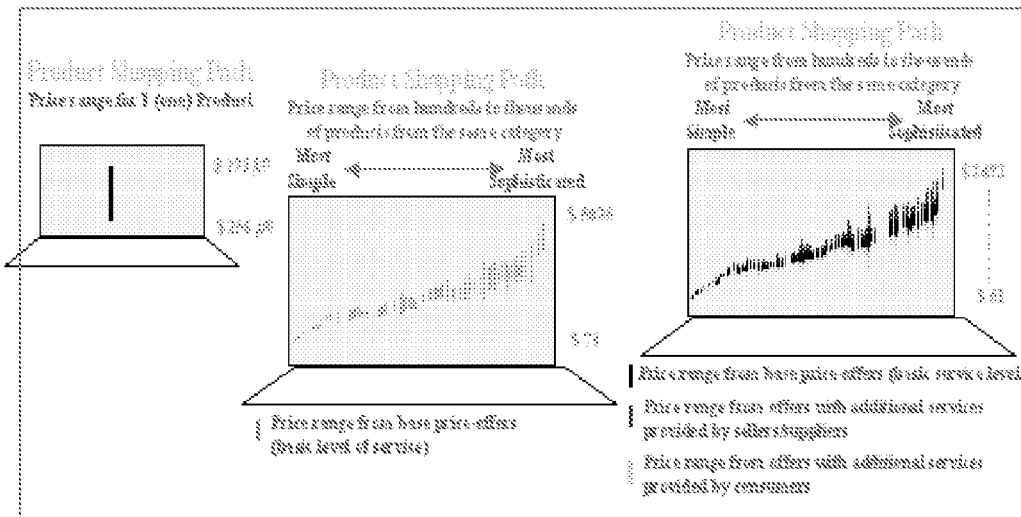
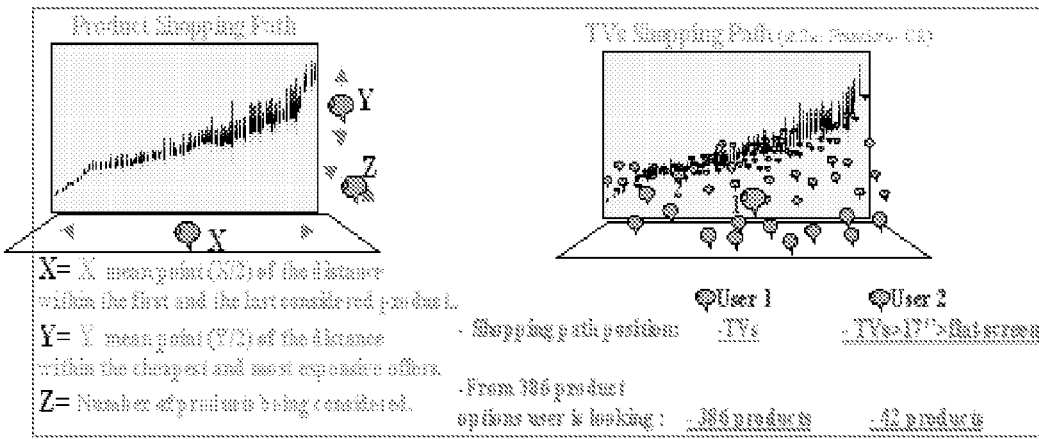

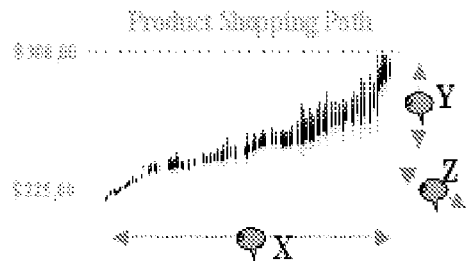

User-avatar position at a regional product shopping path

Fig. 7a

X= X mean point (X/2) of the distance (at the product shopping path) within the first and the last product being considered.
Y= Y mean point (Y/2) of the distance (at the product shopping path) within the cheapest and most expensive offers being considered.
Z= Number of products being considered.

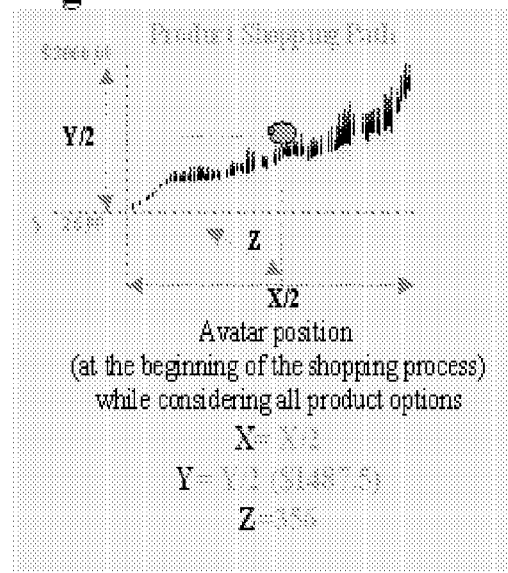

Fig. 7b

Avatar position
(at the beginning of the shopping process)
while considering all product options

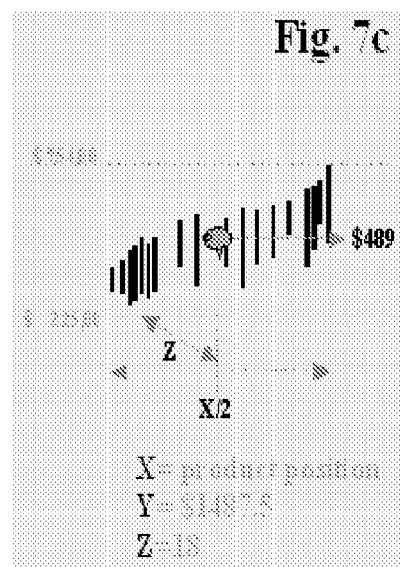

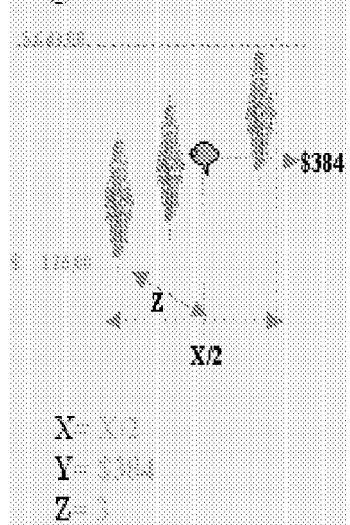

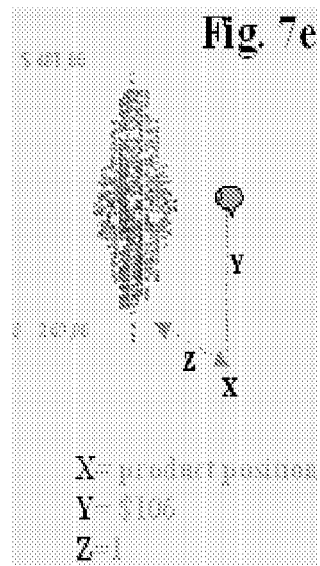

Fig. 7e

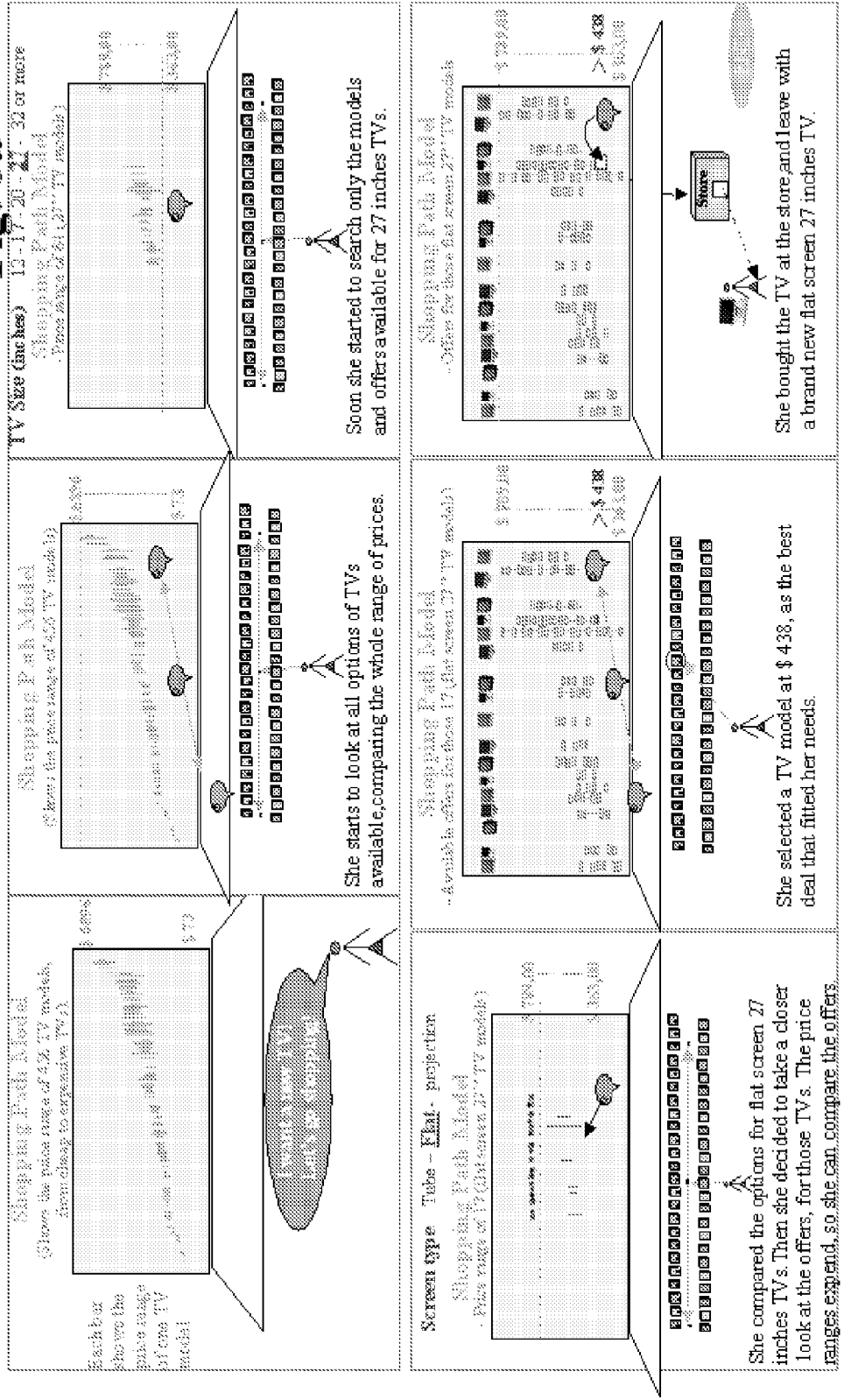

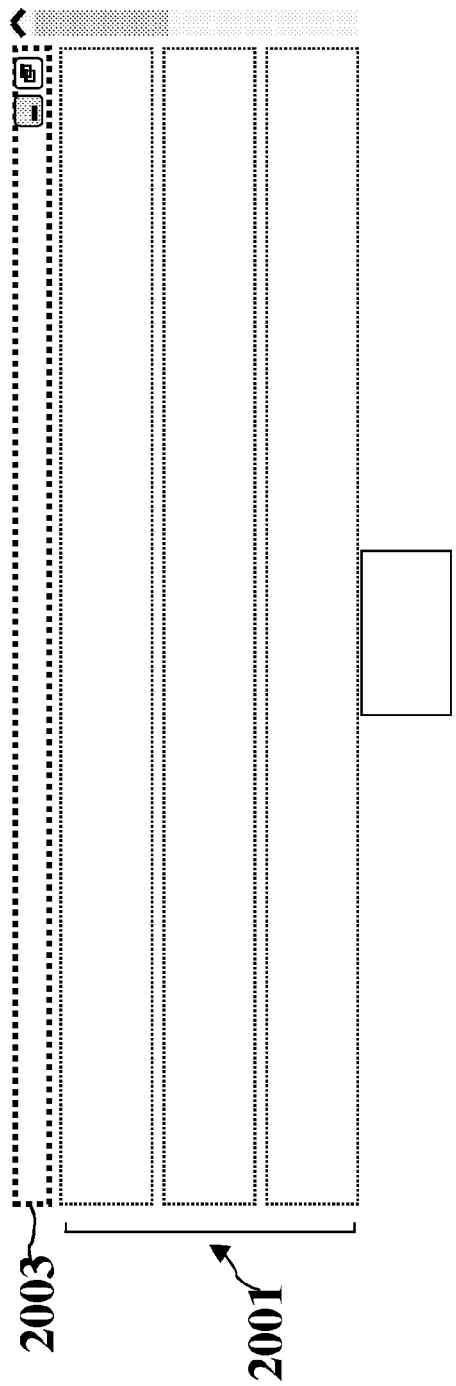
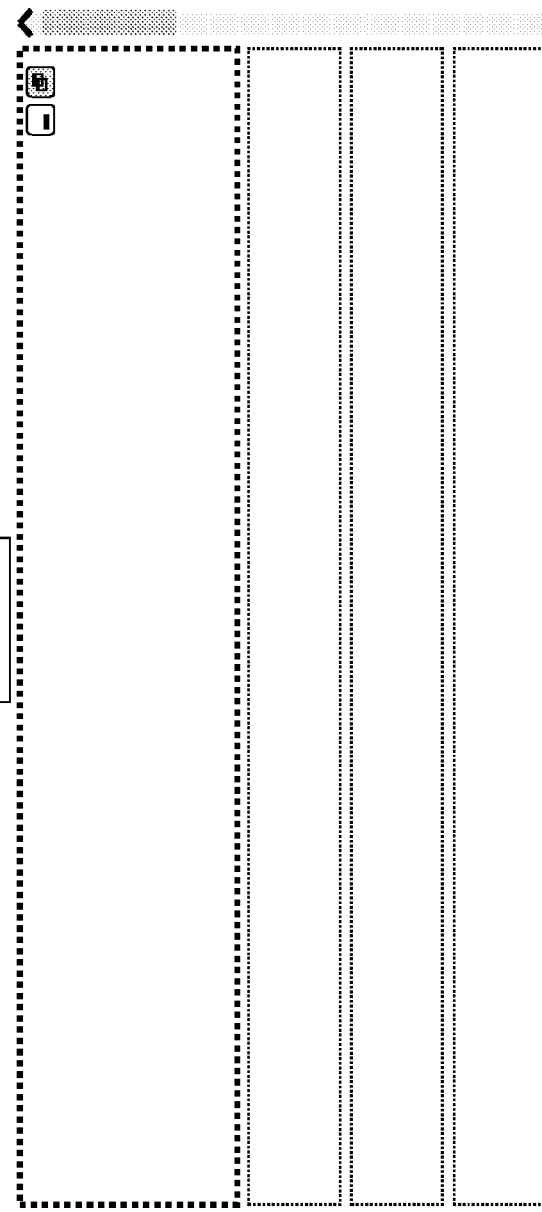

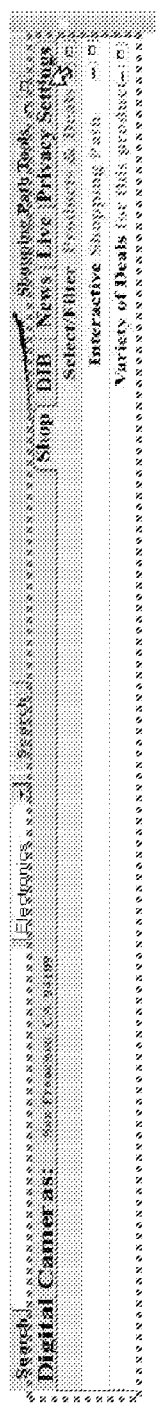
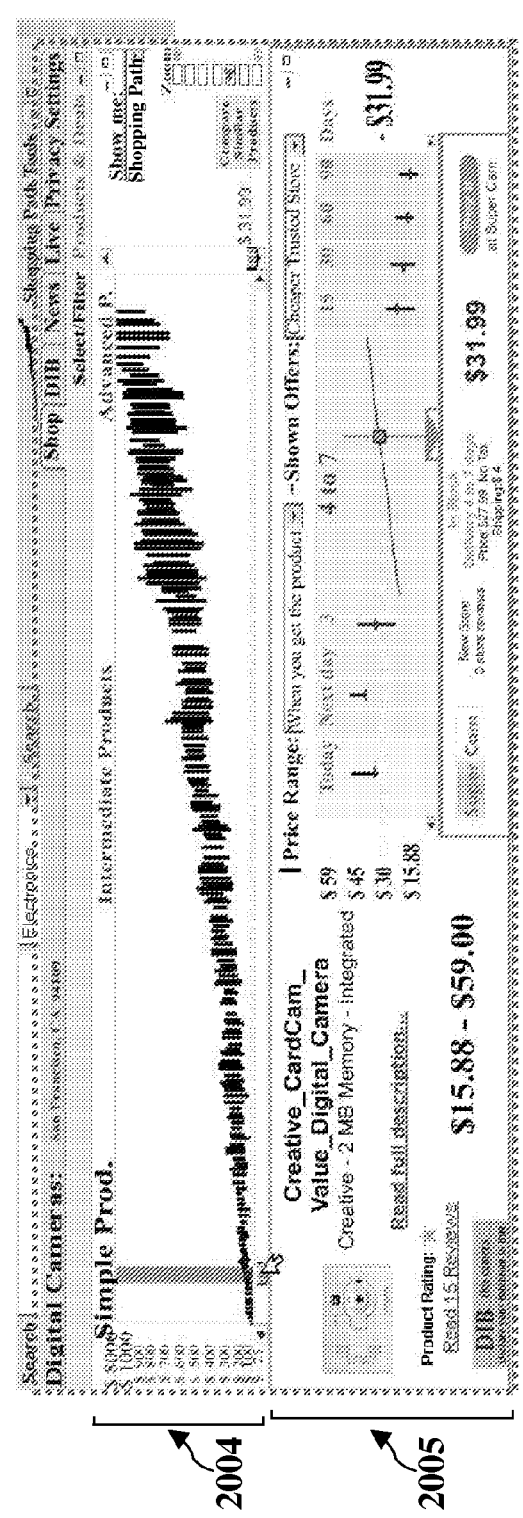
Fig. 16
Fig. 17
Fig. 18

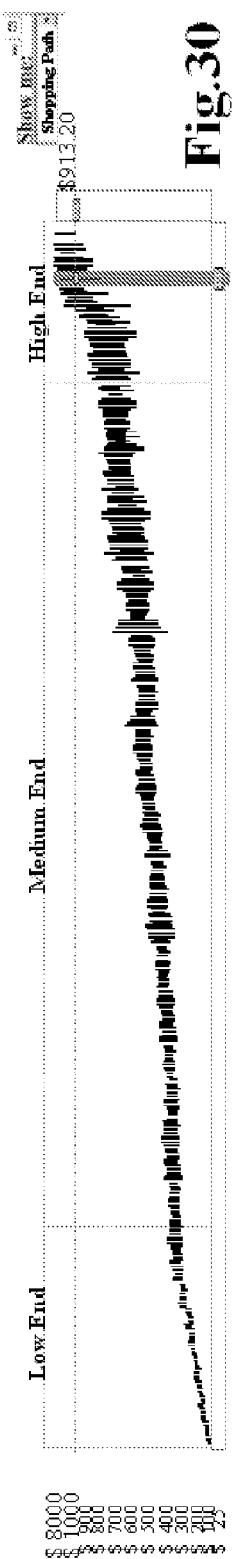

Product-bars arranged by Product Popularity
(showing all products of a category, such as digital cameras)

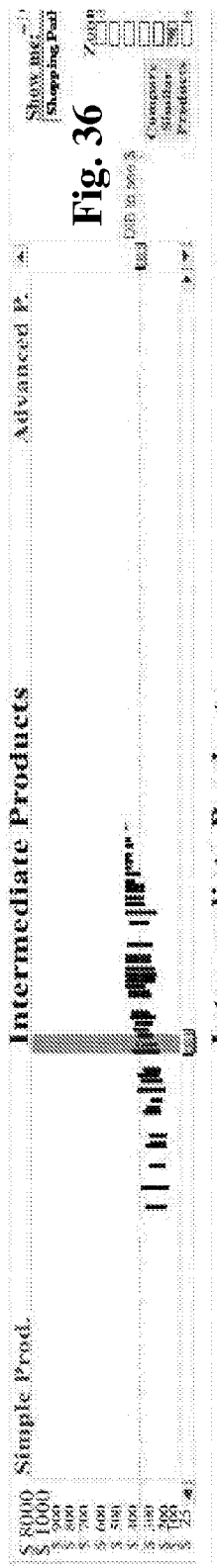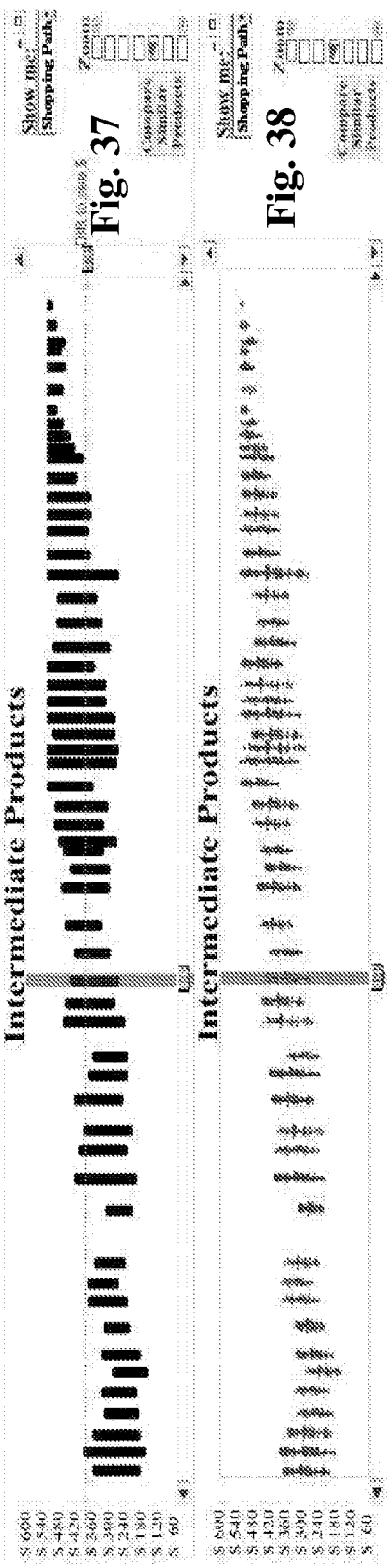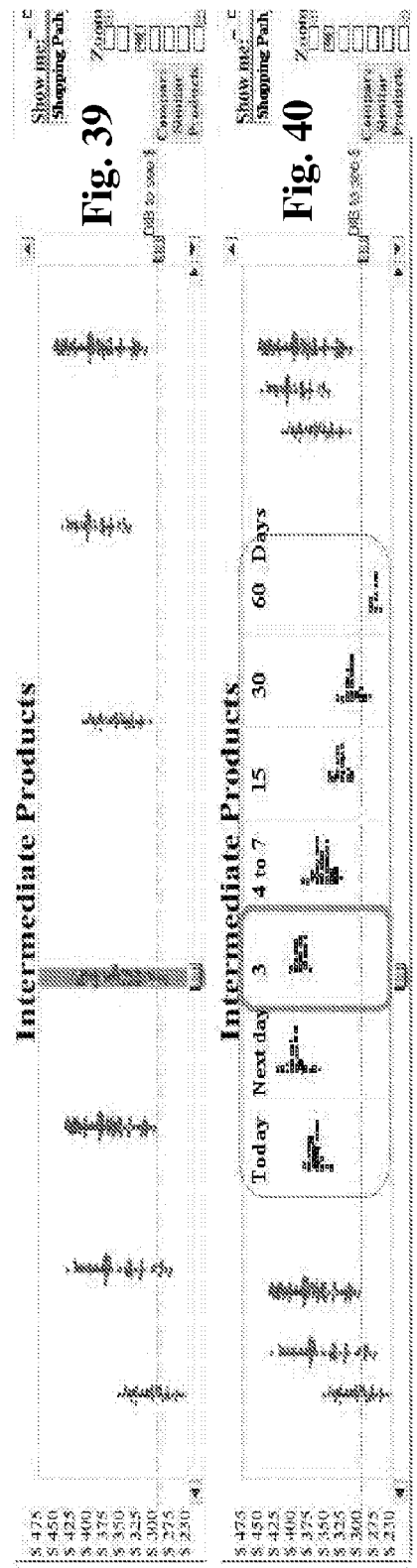
Fig. 36  Fig. 37  Fig. 38  Fig. 39  Fig. 40

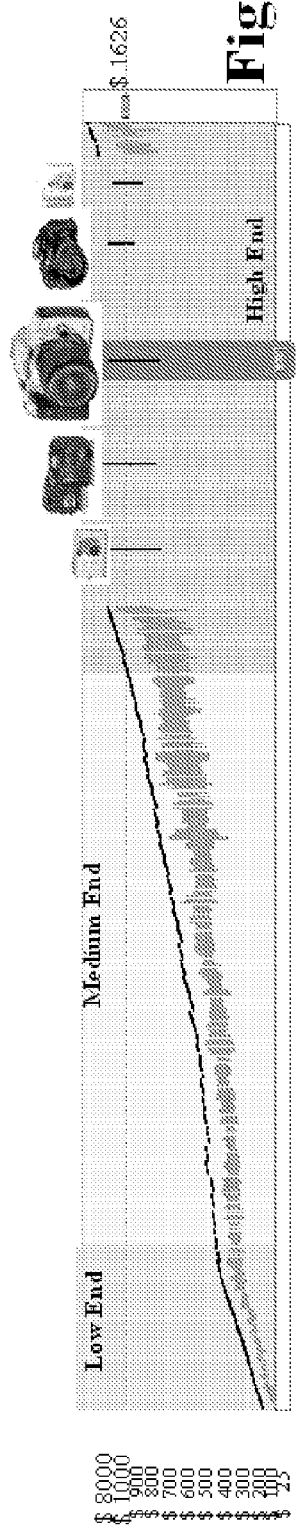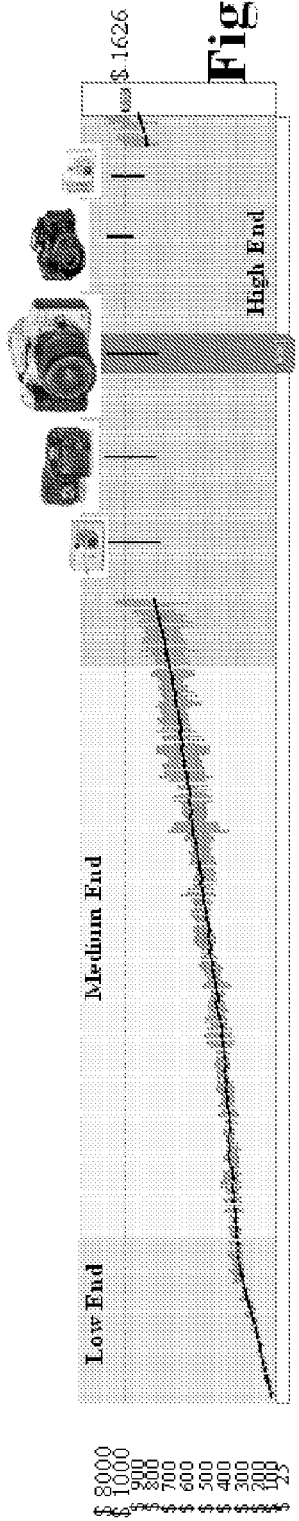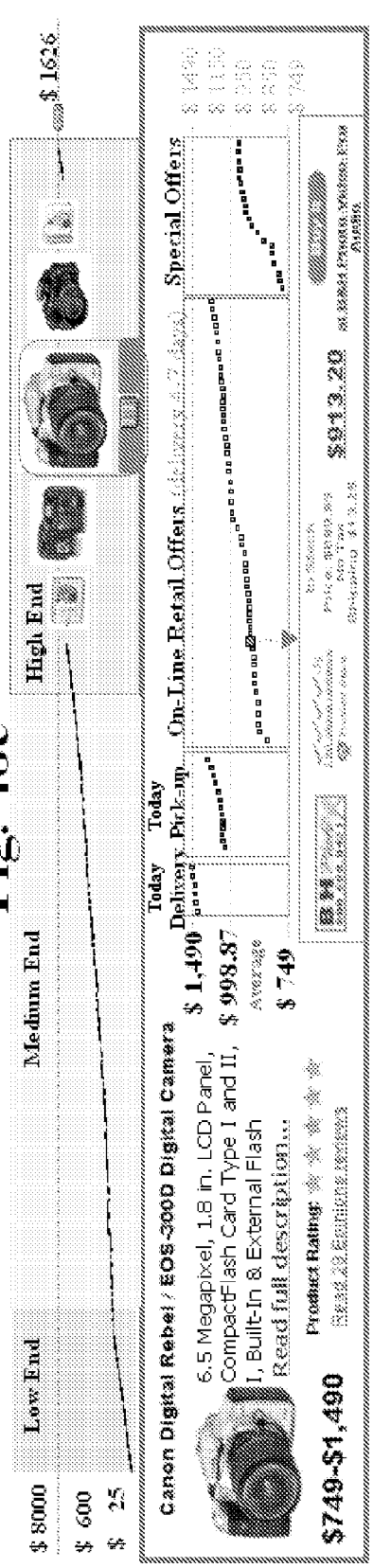

METHOD AND SYSTEM FOR DEMAND AND SUPPLY MAP/SHOPPING PATH MODEL GRAPHICAL PLATFORM AND SUPPLYING OFFERS BASED ON PURCHASE INTENTIONS

CROSS REFERENCE TO RELATED APPLICATIONS

This application claims priority from U.S. Patent Provisional Application No. 60/780,942, entitled METHOD AND SYSTEM FOR DEMAND AND SUPPLY MAP/SHOPPING PATH MODEL GRAPHICAL PLATFORM AND SUPPLYING OFFERS BASED ON PURCHASE INTENTIONS, by Guilherme N. Leal, filed Mar. 8, 2006 and incorporated herein by reference.

COPYRIGHT NOTICE

Pursuant to 37 C.F.R. 1.71(e), Applicants note that a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

FIELD OF THE INVENTION

The present invention relates to information design, e-commerce and marketing fields. More particularly, it relates to computer systems and applications that operates or interact with a graphical platform called Demand and Supply Map/Shopping Path Model (DS/SP Model). Part of the information operated by this model is generated by a marketing method, called DIB process; where consumers can Declare their Intentions to Buy (DIB) to get improved and customized offers. Besides academic and governmental possible functions, the DS/SP model graphical platform and DIB process are mainly designed to provide supporting shopping tools for consumers and supporting enterprise/marketing tools for supply chain stakeholders (such as retailers, distributors and manufacturers).

BACKGROUND OF THE INVENTION

The discussion of any work, publications, sales, or activity anywhere in this submission, including in any documents submitted with this application, shall not be taken as an admission that any such work constitutes prior art. The discussion of any activity, work, or publication herein is not an admission that such activity, work, or publication existed or was known in any particular jurisdiction.

Some earlier work discusses or employs various methods that allow consumers to "declare what they want" in order to receive offers from sellers. The intrinsic methods and results vary a lot, for example according to: 1—how consumers "declare what they want" and how this information is processed, 2—how the "declarations" are diffused, analyzed and processed into offers by supply chain agents and 3—the context of how the results (offers) are presented to the consumers that "declared what they want".

A wide spread prior art is the "Want ads", exemplified at iWant.com patent U.S. Pat. No. 6,574,608, in this method people ad the need of a general or specific product, a central system delivers the ads to sellers, then sellers search (the list of ads), reading prospective ads and answering them (sending offers) one by one.

Another prior art method is the Request For Proposal (RFP), a standard way for buyers to request offers form sellers, in this method buyers send RFP to sellers, and sellers respond them one by one. For example, according to Fujistu Limited's patent U.S. Pat. No. 6,686,392, consumers send their RFP to an electronic shopping system, which has an electronic shopping agent (ESA), the ESA will send the RFP to respective sellers, then sellers forward proposals to the ESA, and the ESA analyze the proposals forwarding the best proposals to the requesting consumers.

Another popular prior art are the buyer-driven systems, where a good example is the conditional purchase offer (CPO) family of patents such as patent U.S. Pat. No. 6,085,169, at those methods a buyer dictates the terms of the offer and one or more sellers decide whether to accept or not, however buyers are bind to their offers by their credit card. In this method, sellers predetermined their offers' rules of acceptance, so when a CPO meets the requirement of the offers' rules (say fly destination, date and price) the system automatically fulfills the transaction. Another buyer-driven method is the reverse-auction; at www(.)freemarkets(.)com, for example sellers bid for each buyer's specific purchase/contract.

Another interesting prior art is Mark Landesmann, patent application publication No. US 2002/0052779, named serious intent mechanism and method, where sellers receive "declaration of intent to purchase a good or service" using methods to discern what consumers have higher likelihood to purchase and thus giving them more attention and better service.

Finally, a further example of prior art method that somehow makes the future demand for general or specific products transparent is the analysis of users' queries at shopping websites, assuming that increase in the number of queries of a product means increase of demand for that product. Shopping.com's consumer demand index (CDI), measures the variation (percentage) in the number of queries for products and display them by graphics and lists, shown on FIG. 3. This method only represents possible trends and a sign for potential sales; it provides neither a means of communication among sellers and buyers (like the invention's DIB process does), nor a marketing tool for sellers that allows specific segmentation, targeting and offers creation.

BRIEF DESCRIPTION OF THE DRAWINGS

FIGS. 1-2 illustrate screenshots of a tree map according to the prior art.

FIG. 5 illustrates example screenshots of an animation illustrating a user avatar going trough an example shopping process according to specific embodiments of the invention.

FIG. 6 illustrates methods using a shopping path model according to specific embodiments of the invention.

FIG. 7a-e illustrates as an example the X, Y and Z position of a user-avatar at a regional product shopping path according to specific embodiments of the invention.

FIG. 8a-b illustrate an example shopping process of a consumer at a product-shopping path according to specific embodiments of the invention.

FIG. 9 illustrates an example similar to that shown in FIG. 8a-b further illustrating a declared intention to buy (DIB) in advance of a purchase in order to get improved/customized deals according to specific embodiments of the invention.

FIG. 14 shows a block diagram that illustrates an SP-tool row displayed above product-rows that display a list of products according to specific embodiments of the invention.

FIG. 15 illustrates an SP-tool row expanding its height, moving the product-rows downward the web page according to specific embodiments of the invention.

FIG. 16 illustrates an SP-tool row with a shopping path tool at its most contracted form inside it.

FIG. 17 illustrates an expanded SP-tool row with a shopping path tool displaying its main control functions.

FIG. 18 shows a similar example shown on FIG. 17, illustrating two of its panels opened according to specific embodiments of the invention.

FIG. 21 illustrates an example screenshot of an example graphical interface showing a Product panel according to specific embodiments of the invention.

FIG. 22 follows the example shown on FIG. 21 illustrating a user selecting a different offer for the same product, by scrolling right the offer-selector until it reaches the offer with lowest price from its offer category (4 to 7 days pick-up/delivery category) according to specific embodiments of the invention.

FIG. 23 illustrates that the designated space and offers squares of the 4 to 7 days offer category contracted, and the designated space and offers squares of the today offer category expanded.

FIG. 27 follows the example shown on FIG. 25, illustrating a user minimizing the Shopping Path panel (keeping only the Product panel open), so that the SP-tool row and the shopping path tool recognize the product at the top-row of the list, according to specific embodiments of the invention.

FIG. 30 to FIG. 33a illustrate examples screenshots of an example graphical interface showing that product-bars, at the Shopping Path panel , can be displayed into different modes and into different categorizations, according to specific embodiments of the invention.

FIG. 36-40 illustrate examples screenshots of an example graphical interface showing the zoom control function, which allows users to magnify the products and offer graphical representations displayed at the Shopping Path panel, according to specific embodiments of the invention.

FIG. 47 illustrates an example screenshot of an example graphical interface showing an alternative embodiment where the networked hub added a "See Variety of Deal" button at each row of its list of products, according to specific embodiments of the invention.

FIG. 48a illustrates an example screenshot of an example graphical interface showing that the user customized the Offers panel, determining that the offers from Amazon.com, ShoppingPath.com and eBay.com would be placed side-by-side, according to specific embodiments of the invention.

FIG. 48b illustrates an example screenshot of an example graphical interface showing that the user customized the Offers panel, determining that the offers belonging to different categories would be placed side-by-side as squares not bars, according to specific embodiments of the invention.

FIG. 48c illustrates an example screenshot of an example graphical interface showing that the user customized the Shopping Path panel, determining that small product pictures are placed above their respective product-bars; and the selected product-bars (and the product-bars close by the selected one) have their product-pictures magnified, according to specific embodiments of the invention.

FIG. 48d follows the example shown on FIG. 48c, illustrating that the user determined that the small product pictures are placed at the average price of their respective product-bars; and the selected product-bars (and the product-bars close by the selected one) have their product-pictures magnified above their respective product-bars, according to specific embodiments of the invention.

FIG. 48e follows the example shown on FIG. 48d, illustrating that the user determined that no product-bars are displayed, and only small product pictures are displayed at their average price; and the selected product-pictures (and the pictures close by the selected one) have their product-pictures magnified, according to specific embodiments of the invention.

FIG. 67 illustrates an example screenshot of an example graphical interface showing a shopping path tool with a DIB-section opened and displaying a few DIB options for the consumer to choose according to specific embodiments of the invention.

FIG. 70 and FIG. 71 illustrate an SP-MKT tool row expanding its height to accommodate the marketing shopping path tool different panels and control functions according to specific embodiments of the invention.

FIG. 72 illustrates an example screenshots of an example graphical interface showing that the marketing shopping path tool (located above a list of products) can interact with the list of products, when the seller scrolls down/up the browser scroll button. The marketing shopping path tool interacts with the list of products identically to how the shopping path tool interacts the list of products, as explained on FIG. 24 to FIG. 27.

FIG. 75 illustrates an example screenshot of an example graphical interface showing a marketing shopping path tool displaying information about DIB-segments (at US territory), as well as details of the seller's DIB-offers for a specific product; allowing a seller to change an existing DIB-offer according to specific embodiments of the invention.

FIG. 76 illustrates an example screenshot of an example graphical interface showing a marketing shopping path tool displaying the product offers and DIB-information according to specific embodiments of the invention.

SUMMARY

Figure 1:
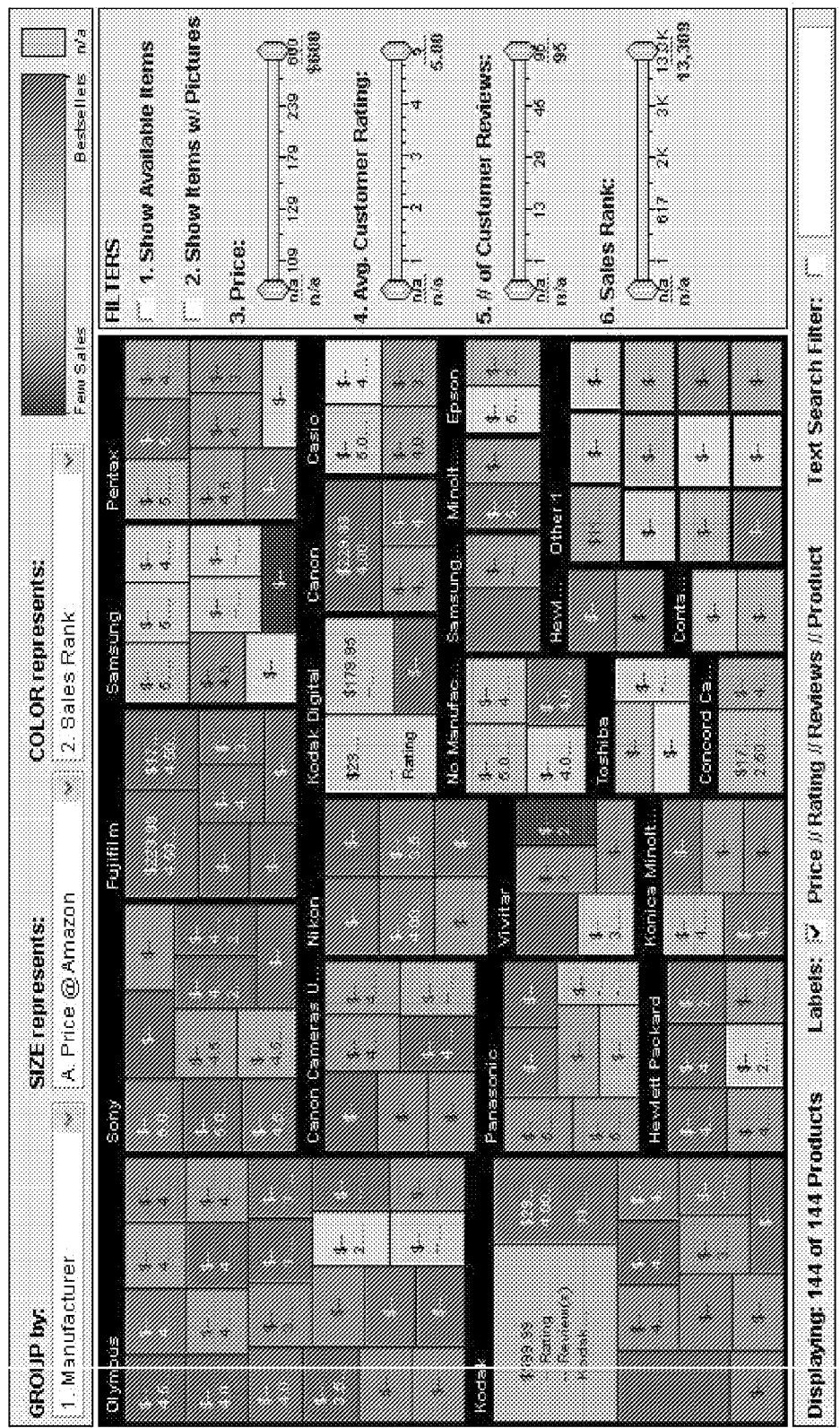
Figure 3:
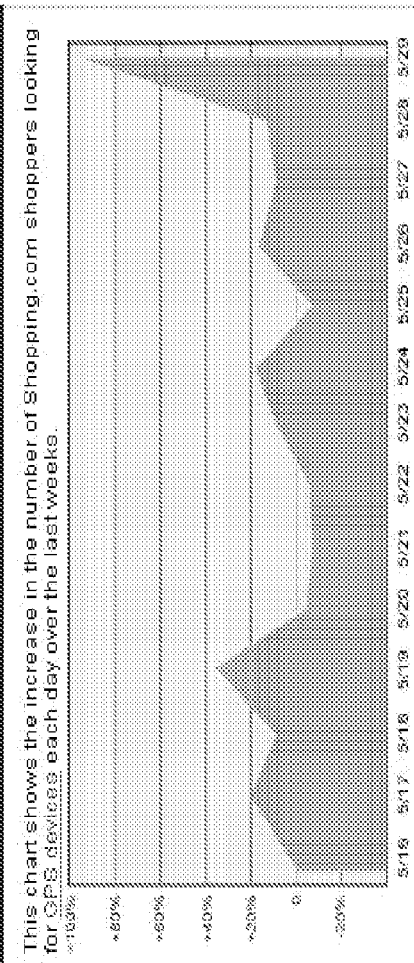
FIG. 3 illustrates an example screenshot of a consumer demand index display according to the prior art.

According to specific embodiments, the present invention is involved with methods and/or systems and/or devices that can be used together or independently to improve a consumers shopping experience and/or to provide information to vendors to improve or customize deals offered by vendors.

In specific embodiments, the present invention can be understood as involving new business methods related to purchasing or selling goods or services, particularly on network computer systems.

Various embodiments of the present invention provide methods and/or systems for shopping and sales transactions over a communications network. According to specific embodiments of the invention, a client system is provided with a set of interfaces that allow a user to browse and select offers for goods or services. The consumer client system displays information that is representative of one or more offers for sale of a good or services and displays an indication of an action that a user is to perform to request a particular offer, to browse offers, or to make declared intentions to buy. In response to a user input, the client system sends to a server system the necessary information to access data regarding products or services that potentially originates on a large number of vendor information systems. The server system uses the request data, and optionally one or more sets of server data, to process the request. According to specific embodiments of the present invention, a client system is, or has previously been, provided with an executable code file that allows the client system to receive the data and to present relevant data and interactive indications to a user.

Thus, in further embodiments, the present invention may be understood in the context of sales transactions over a communication media. An important application for the present invention, and an independent embodiment, is in the field of providing browsing and comparing items from multiple sellers over the Internet, optionally using Internet media protocols and formats, such as HTTP, RTTP, XML, HTML, dHTML, VRML, ASP, as well as image, audio, or video formats etc. However, using the teachings provided herein, it will be understood by those of skill in the art that the methods and apparatus of the present invention could be advantageously used in other related situations where users access content over a communication channel, such as modem access systems, institution network systems, wireless systems, etc.

Specific embodiments according to the invention address three aspects related to on-line shopping:

1—The need for an improved sophisticated graphical platform (map/model) for demand and supply information.

2—The need for an improved graphical tools that promote price and choice transparency.

3—The need for efficient communication methods/tools (related to future demand) within end-consumers and the supply chain agents, which enables the creation of future demand transparency and its benefits, such as improved/customized offers to consumers and better demand-driven marketing processes (like segmentation, targeting and customization) for supply chain agents.

Graphical Platform (Map/Model) for Demand and Supply Information.

Generally speaking maps and models are representations (or approximations) of reality that emphasizes some features at expense of others. For thousands of years, people have been creating maps and models to represent landscapes, objects, events and concepts.

Maps also provide a common conceptual frame of reference. For example, when someone talks about the Earth, people readily picture the globe or the commonly used Mercator projection of 1569 (world map). The same associated "picture of the thing or process" comes in mind when the subject is the solar system, the DNA, the cycle of water, the supply and demand curve, cash flow (spreadsheets) and so on. However there are some things and processes, such as the universe or cyberspace, for which effective maps and models are either fragmented, incomplete or inexistent.

When people talk about different aspects of the dynamics of demand and supply, and related information such as the shopping process of selecting items, prices and options; as well as the analysis of the past sales and future forecasts information from relational and OLAP databases (business intelligence), they rarely have the same picture of the process (common conceptual frame of reference) in their minds. There is still no integrated graphical platform; a map/model that represents past, current and forecast sales, product/services offers and future demand (as DIBs); that are commonly used among consumers' web applications (like shopping tools) and enterprise applications (like business intelligence-BI, enterprise resource management-ERP, supply chain management-SCM and customer relationship management-CRM).

The present invention is involved with a map/model that can integrate and easily represent meaningful aspects of the demand and supply dynamics, creating a common conceptual frame of reference between its agents (mainly among consumers and the supply chain stakeholders), so to improve their communication, decision-making and results.

Efficient Graphical Tools (Man/Model) that Promote Price and Choice Transparency.

Traditionally the task of shopping and researching for the best choices of products and offers was time consuming and cumbersome. In the last decade, with the advance of the Internet, the proliferation of retailers on-line as well as shopping agents/price comparison engines, consumers have had access to an unprecedented amount of information about product choices and offers prices. This revolution of price transparency for consumers is reaching a ceiling, where the problem is not the available amount of information, but the medium where the information will be presented; in this case the medium format (the lists) becomes a bottleneck Most product search websites on the Internet, say e-retailers (like Amazon) and price comparison engines (like shopping.com) have list-based format, where the presented items are listed and viewed either in the format of rows, grid or tables. Normally these lists-based services show less than twenty detailed results per page. Because the results or options from a given search are numerous, in theory users would need to browse dozens of pages to see all alternatives; and even if the user does that, in the end he or she would not be able to recall the relationship of prices and features within all options. In practice the sequence of the lists (the first items) matters the most because usually users limit their search for a few pages, so the 40 first items of the list get most attention in the expense of the others items.

Graphics are well known tools able to display large amounts of information into a limited amount of space. A graphical map/model able to represent all list of products of a specific category at once, would not just overcome the lists-based lack of space bottleneck, but also would give users a model (common conceptual frame of reference) of "what is the picture" (the conformation) of all options of products from a specific category (like digital cameras) if they are put together.

Figure 2:
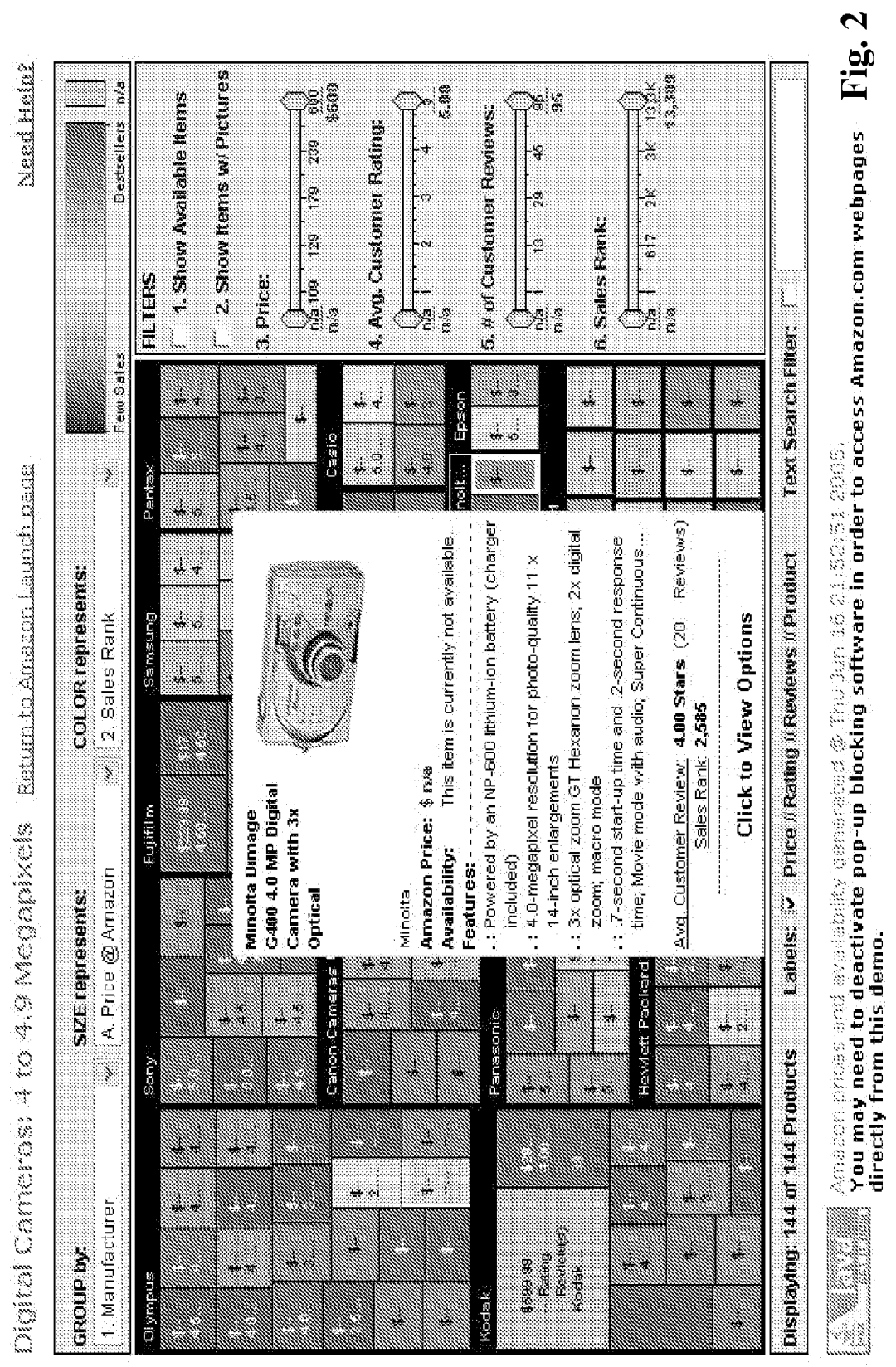

The problem then turns to be: What would be the graphical model that efficiently represents (at once) all options of products from a specific category. Examples of application of this concept (that somehow answer this question) are almost non-existent, most retailers and price comparison engines are locked at the list-based format premise. One known counter example discusses the application of tree maps for product browsing. The visual display of a tree map comprises a space that is divided into multiple rectangular regions, whereby each region is assigned to a different product. The arrangement of rectangles, sizes, and color represent attributes of the data. The example FIG. 1 shows a screenshot of a tree map produced by the Honeycomb technology (offered by the company The Hive Group). The example arranged data provided by Amazon (www(.)amazon(.)com), related to digital cameras from 4 to 4.9 megapixels; where the diagram shows groups of cameras by manufacture, the size of rectangles means the price at Amazon and the color represents sales rank FIG. 2 shows a screenshot of the same tree map, when the user selects one specific product (represented by the rectangle), an additional panel pups-up over the tree map panel, displaying detailed information about that selected product. Despite the ability of tree maps to overcome the lists-based (lack of space) bottleneck, it is still not satisfactory for product comparison. The tree map model has two main disadvantages for product comparison. First, it is not easy to clearly distinguish prices because rectangles are not displayed into an axis (so that different product prices, or price variations, can be compared in parallel side-by-side); in the tree map model prices can be displayed as different groups, and/or the size of rectangle (which can produce confusion once the rectangles doesn't have the exact same shape) and/or colors. Second, the model is not properly fitted to show price variations, if each product has a price variation (as it happens in price comparison engines), the rectangles size can't be used to represent product price, and using groups and/or color to discern product price variation would be confusing. Another limitation of the current application of tree maps for product comparison is that they neither co-exist nor interact with the related lists of products; it will become evident at the description of the invention that the list of products and the graphical model of all products are complementary entities, and should interact with each other.

One graphic model where prices are clearly displayed as a y-axis is the classical stock market chart, where the x-axis is time, and the price variation of the stock is represented by a bar or line, so that several bars are displayed side-by-side in chronological order. Those types of charts generally are not used to compare different stocks, but to access the performance and trends of one stock over time, so the charts do not suggest that the parallel arrangement of price variation bars into a increasing or decreasing pattern (arranged by product sophistication) could be used as the basis for a product price comparison tool. Typically, prior systems suggest that different entities (like different products) should be compared by methods like the tree map. An exemplary model that uses this premise, is Smart Money's patent, U.S. Pat. No. 6,583,794, where a tree map is used to compare different companies' stocks, in this case each rectangle means a company; the rectangles are divided by sector (like software), where the size each rectangle means the company's market capitalization, and the color represent characteristics of the company (like its market performance).

Another problem consumers have while they are shopping is the lack of choice transparency. It is still time consuming to compare the offers options and trade-offs of one product, like what are the delivery or pick-up, extended warranty and guarantee satisfaction choices and the combinations of it. Most of e-retailers and price comparison engines usually show only the standard 4 to 7 days delivery option to consumers, and any other choice need to be researched case by case. There is the need of a graphical shopping tool that not only enable the consumer (in a simple and easy way) to compare all product choices, but also to compare (graphically) all choices of offers and deals of one selected product.

Communication Related to Future Demand Among End-consumers and Supply Chain Agents for Future Demand Transparency Traditionally the lack of communication among end-consumers and supply chain agents (like retailers and manufacturers) makes it difficult to supply chain agents to forecast future demand as well as to create a better variety and more customized set of offers to consumers. Consumers are used to have immediate availability of products, buying without notice in advance; while sellers at the other hand, need to anticipate (making forecasts) when, where, and which products need to be "ready" for consumers. While the assumption that products need to be always ready at shelves (otherwise the seller loose the sell) is true for cheap items, where no one wants to plan in advance to buy sodas; the assumption is wrong for more expensive items (like TVs), where usually buyers do not have urgency to acquire the product and may, plan in advance and spend time shopping for different choices. With the presence of retailers on the Internet and the proliferation of price comparison engines, it is a normal task for consumers to do their homework shopping (researching options) on-line, even when they buy at off-line retail stores.

The problem is that even when consumers research options on-line in advance, in the majority of cases, the consumers do not communicate to the market their intention to buy in advance of their purchase. Assuming the premise: intention to buy precedes actual purchase; it becomes clear that the lack of consumers' intention to buy information at the marketplace derives from the lack of appropriate communication methods/tools. Particularly the lack of communication methods/tools that systematically collects, preferably in large scale, the intention to buy from consumers, being able to deliver this information in a timely manner to influence the decision-making of supply chain agents, so they could provide a better variety, improved and customized offers to consumers.

According to specific embodiments of the invention, consumers' ads or "declarations of intention to buy" are collected in a standard way, in order to be structured into a graphical model, providing the basis to make the declared-future demand (by region and time) of general and specific products transparent (through graphics). In further embodiments, the consumer's "declarations of intention to buy" are segmented, ranked and graphically structured into a model (using analytical marketing tools), so to provide to sellers marketing tools that allows searching and targeting (with offers, deals and promotions) specific (micro) or whole (macro) segments of consumers' declarations. And finally assuming a world where prices for end-consumers are already semi-transparent (through the actual price comparison engines for example), the present invention further provides a method where consumers can receive better variety/improved/customized offers on top of the already existing offers by declaring intentions to buy in advance of purchases.

Example Advantages and Benefits of the Invention

In specific embodiments, the invention is involved with a graphical platform (a map/model) for demand and supply information. For example, according to the Demand and Supply Map (DS Map) conceptual model of the invention, a graphical model maps/models several aspects of the demand and supply dynamics at the different levels of the Earth's locations, over time. The model represents the "somehow abstract" process of the demand and supply dynamics, into a dynamic graphical structure (with spatial form and dimensions related to the Earth's locations and dimensions). One novel/non-obvious aspect of the invention is to provide a common conceptual frame of reference ("the big picture") for the demand and supply dynamics, integrating information with different dimensions into one single dynamic spatial structure (called DS Map model). Examples of these integrated dimensions are: spatial location, money (as past, present and forecast sales), time, current products/offers types and their prices, products being delivered/pick-up over time, the position of consumers' avatars at their shopping process and consumer's future demand (as declaration of intention to buy-DIBs). The different elements and parts of the DS Map model (the ones described above) work together as a system, to carry on the various processes of the demand and supply dynamics.

The implementation of the whole DS Map model, or at least the regional product shopping paths and the consumers' DIBs, at computer systems/applications of enterprises and consumers marketplaces/engines/portals, have the potential to provide unprecedented levels of market transparency at the consumers' level (particularly for products prices/options and declared-future demand). For enterprises, the potential of the DS Map model resides at enterprise and marketing decision-making, by allowing the integration and cross-relation of their enterprise information (such as past, present and forecast sales) with the invention's graphical price comparison (product shopping paths) and declared-future demand (customers' DIBs) information.

In further embodiments, the invention provides efficient graphical tools that promote price and choice transparency. Important components of the DS Map model are the city's shopping path model (which will be described later) and the product shopping path model. The product Shopping Path is the graphical model used by this invention to efficiently represent all options of products' offers from a product category (like digital cameras). In one example, the model shows prices as a y-axis; and groups of product offers (from different products of the same category) are arranged side-by-side in the x-axis, where each product offer is represented by a rectangle, which is positioned at the y-axis according to its price. Assuming a city (like San Francisco) and a product category (like digital cameras), when the group of offers of each product of that product category are arranged side-by-side in order of sophistication/price, a graphical structure with a fixed pattern will be formed; and this graphical structure is called product Shopping Path (the San Francisco's digital cameras shopping path).

The invention proposes a graphical user interface for an efficient navigation of a city's product shopping path. By presenting the graphical tool by two different panels, one panel showing a city's product shopping path, and the other panel showing a product's offers information; users can easily navigate within all available options at once by selecting different products and different offers.

This shopping tool graphical user interface model is very efficient to product and offers price comparison, and particularly more efficient that the tree map model. First, because price is displayed on one clear axis of the panel (e.g., the y-axis) of the panel, and the group of product's offers are displayed side-by-side in increasing order of sophistication/price (e.g., into the x-axis); the price comparison become not just clear and precise, but its intrinsic logic is very easy and fast to grasp. Second, the side-by-side placement of product's offers allows the precise notion of what products can be purchase with the same amount of money. Third, this graphical interface makes the all products' prices (from product category like digital cameras) and all different types of offers (of a selected product), easily recognizable at once. Fourth, if the presented graphical tool is placed above a list of product, the graphical tool and the lists become interactive, so that the manipulation of the graphics can change the list, and the scrolling up/down of the list affect the graphical tool.

By combining the easy comparison features described above with zooming, filtering, coloring and division by category features; users using this graphical tool would have access to an unprecedented level of products/offers price and choice transparency. More specifically these additional tools allows users to zoom in and out at selected products and offers, to select the desired product features and offers types (filtering the irrelevant ones), to ad different color to different types of offers, to divide the group of products' offers by different categories (such as by manufacture or by selected features) and to divide the different groups of offers of one selected product by different categories (such as by pick-up/delivery date or by warranty).

In further embodiments, the invention provides an efficient communication method/tool (related to future demand) within end-consumers and the supply chain agents, which enables the creation of future demand transparency and it benefits, such as improved/customized offers to consumers and better demand-driven marketing processes (like segmentation, targeting and customization) for supply chain agents.

In an example DS/SP Map model, a DIB™ space (as in FIG. 4) is displayed above each regional shopping path. DIB™ space is the location where the consumers' Declarations Of Intentions To Buy™ (DIBs™) are located in the model. At the DS/SP Map model, consumers declare their intention to buy in order to improve/customized the available/existing offers related to the products they want. The DS Map computer system receives the consumers' DIB and plots them into the DS Map model. By having access to the DIB information, supply chain stakeholders would use analytical software to see and analyze (graphically) the regional DIBs, selecting general or specific segments of DIBs, targeting those selected DIB segments with improved/customized offers, and sending those offers only to the customers that belongs to the selected DIB segments.

By using the premise that intention to buy precedes actual purchase, a computer system (according to specific embodiments of the invention) that collects and makes regional consumers declarations to buy (DIBs) of a general and/or specific product transparent through graphics and an user interface, is the same to say that the system is making part of the future demand (for that general and/or specific product) of that regions transparent. Thus, the present invention uses the DS Map model to enable future demand transparency or, declared-future demand transparency.

The DS Map system can be implemented in network hubs/portals where end-consumers are present, such as search engines, price comparison engines, and e-commerce websites; so those entities can serve as DIB collectors and distributors. By doing that, network hubs/portals have the financial incentive related to profit from DIB related ads, for example.

The invention allows DIBs to self-segment themselves (using analytical tools), so supply chain stakeholders would be able to target specific (micro) or whole (macro) segments of consumers' declarations. Consumers for the other hand would be able to compare graphically (at the product shopping path) the previously available offers and the DIB improved/customized ones, picking the offer that best fit his or her needs.

By allowing the supply chain stakeholders' data mining and business intelligence tools (that are applied to their past and forecast sales information) to handle DIBs (potential future demand declared by customers), supply chain stakeholders are able to collaborate this "intelligent-DIB information" within different departments through different enterprise applications (like CRM, SCM and ERM) not only to create improved/customized offers to consumers, but also to potentially improve a series of decision-making processes that are directly related to sales forecasts and end-consumers demand.

The combination of an end-consumers graphical shopping model, with a computer system that provides declared-future demand transparency, declared-demand-driven segmentation and targeting tools, makes the DS Map model a practicable graphical platform that can boost the realization of some technology trends, such as the following computer-assisted-processes: demand self-segmentation, mass customization, mass-built-to-order, micro-marketing and marketing automation.

It is important to make the discernment within the invention DIB process and the RFP; while at RFP method buyers are requesting for proposals, in the DIB process, the sellers' offers and prices are already in place (it assumes initial price transparency, provided by price comparison engines for example), when consumers DIB, they are requesting improved/customized offers on top of the existing ones. Furthermore, although the invention's DIB process and the declaration of intent to purchase of Landesmann have similarities both in the name and at the consumer declaration phase, their processes neither emulate each other nor produce the same result. It will be apparent at description of the invention; both methods can be perfectly complementary, once the distinction of the consumers with higher likelihood of purchase would add an extra layer to the segmentation and targeting process provided by this invention.

Software Implementations

Various embodiments of the present invention provide methods and/or systems for improved shopping experiences and collection of customer date that can be implemented on a general purpose or special purpose information handling appliance using a suitable programming language such as Java, C++, Cobol, C, Pascal, Fortran., PL1, LISP, assembly, etc., and any suitable data or formatting specifications, such as HTML, XML, dHTML, TIFF, JPEG, tab-delimited text, binary, etc. In the interest of clarity, not all features of an actual implementation are described in this specification. It will be understood that in the development of any such actual implementation (as in any software development project), numerous implementation-specific decisions must be made to achieve the developers' specific goals and subgoals, such as compliance with system-related and/or business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

Other Features & Benefits

The invention and various specific aspects and embodiments will be better understood with reference to the following drawings and detailed descriptions. For purposes of clarity, this discussion refers to devices, methods, and concepts in terms of specific examples. However, the invention and aspects thereof may have applications to a variety of types of devices and systems. It is therefore intended that the invention not be limited except as provided in the attached clams and equivalents.

Furthermore, it is well known in the art that logic systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

In some of the drawings and detailed descriptions below, the present invention is described in terms of the important independent embodiment of a system operating on a digital data network. This should not be taken to limit the invention, which, using the teachings provided herein, can be applied to other situations, such as cable television networks, wireless networks, etc. Furthermore, in some aspects, the present invention is described in terms of client/server systems. A number of computing systems and computing architectures are described in the art as client/server art. For the purposes of this description, client/server should be understood to include any architecture or configuration wherein an element acting as a client accesses a remote and/or separate program or device that is providing the desired service (e.g., a server).

All references, publications, patents, and patent applications cited herein are hereby incorporated by reference in their entirety for all purposes.

DETAILED DESCRIPTION OF SPECIFIC EMBODIMENTS

The present invention provides methods and apparatus to model and represent graphically the dynamics of demand and supply information, through the application of the demand and supply map/shopping path models. In one embodiment of the presented invention, a networked hub at the Internet (such as e-retailer, a search or price comparison engine) runs a DS/SP model software system, which can graphically represent part or all of network information into the dynamic DS/SP model. The DS/SP model software system provides a graphical user interface (GUI) that includes a number of features for navigation, selection, categorizing, filtering and zooming information displayed according to the DS/SP model. In one embodiment, the GUI provides functionality as a shopping tool for consumers, and a marketing tool for sellers. In one embodiment, the DS/SP model software system allows consumers to declare their intention to buy (DIB), inputting the DIBs information into the DS/SP model. The result is that sellers gain declared demand information of the market and a segmentation/targeting tool, as the same time consumers gain a mechanism that help to create improved/customized deals for them.

Although the present invention is deployed with certain system architecture with certain data processes, it will be appreciated that the invention may also be used in a variety of environments, with various types of data processing systems having a number of different types of architectures. And although the present invention is described into an e-commerce context (at e-retailers websites or price comparison engines), and as a system that provides shopping tools for consumers and marketing tools for sellers; it will be appreciated that the invention (the DS/SP model and the DIB process) may also be used in conjunction with other enterprise applications (such as business intelligence-BI, enterprise resource management-ERP, supply chain management-SCM and customer relationship management-CRM), and with various types of functions (like non-e-commerce functions at enterprises or academic and governmental purposes). Thus, the invention should not be limited to the systems, architectures, and e-commerce purposes disclosed herein, which are meant only to provide an understanding of the invention, whose scope is defined by the clams which follow.

The Demand and Supply Map (DS Map) and the Shopping Path Model

FIG. 4 to FIG. 11 exemplify and explain the demand and supply map (DS Map) model and the shopping path model. FIG. 4 to FIG. 11 do not show details about the models spatial form, proportions and dimensions, which are related to the Earth's locations/dimensions, time and money. The DS map and Shopping Path models spatial form, proportions and dimensions are detailed at the appendix of this patent file.

Figure 4:
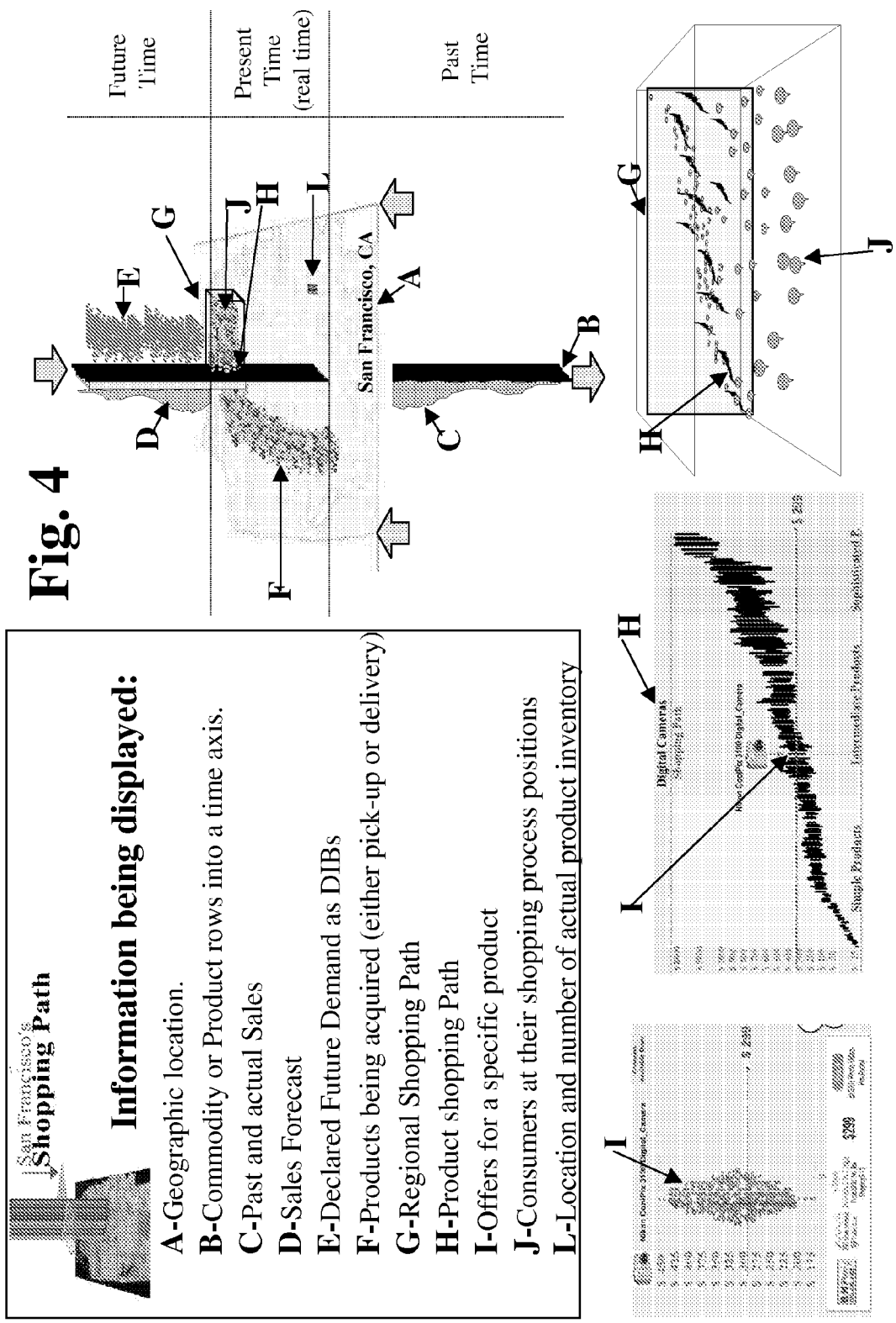
FIG. 4 illustrates various aspects of a San Francisco Shopping Path according to specific embodiments of the invention.

FIG. 4 shows the types of information that can be displayed at the dynamic spatial structure of a San Francisco Shopping Path. The model can integrate the following information: (A) Geographical location, (B) Commodity or Product rows displayed at a time axis, (C) Past and actual Sales (as money units), (D) Sales Forecast (as money units), (E) Declared Future Demand as DIBs, (F) Flow of products being acquired by consumers (either pick up or delivery) over time, (G) The regional shopping path, (H) Product Shopping Paths (as prices), (I) The specific offers for the products offered at that region (as prices), (J) The position of consumers at their shopping process (represented at the shopping path), and (L) the geographic location and number of actual product inventory.

FIG. 5 to FIG. 10 are shown only for purposes of illustration of the DS/SP model dynamics. In particular, these figures explain/illustrate the position of users/consumers at their regional shopping path; which is a graphical representation of the position users/consumers are at their on-line shopping process. These figures doesn't illustrate the GUI provided by the invention's tools; or the experience consumer have, while they proceed at their shopping processes.

FIG. 5 illustrates several screenshots of an animation where, for purposes of illustration, a user avatar (a graphical image of a user) goes through the shopping process of searching for the offers of a specific digital camera. First the user avatar selects its location, going on the direction and entering the San Francisco shopping path (at screenshot 5.1), then it selects a product category, going on the direction of the digital cameras shopping path (at screenshot 5.2), then it selects the desired product (at screenshot 5.3), going on the direction of the Canon Digital Rebel/EOS-300D digital camera group of offers (at screenshot 5.4), and then it reaches the group of offers for that digital camera, comparing the available offers (at screenshot 5.5).

FIG. 6 exemplifies and explains the shopping path model. FIG. 7a explains the X, Y and Z position of a user-avatar in an example of a regional product shopping path. FIG. 7b illustrates a user-avatar at the beginning of the shopping process of a product category (such as digital cameras) considering all available products; X corresponds to the distance of all available digital cameras and X/2 is the user-avatar X position; Y corresponds to the distance (price range) of all offers and Y/2 ($1487.5) is the user-avatar Y position; Z corresponds to the number of product being considered (356 products) so 356 is the user-avatar Z position. FIG. 7c to FIG. 7e illustrates that as the user keeps selecting product and offers features (during its shopping process), the number of product options (and their distance at the product shopping path) as well as the price range of offers keeps decreasing, until the user-avatar selects/considers only one product (at FIG. 7e), where X is the location of the considered product (its group of offers) at the regional product shopping path, Z is 1 and Y is $106 ($481-$269/2).

Figure 8B:
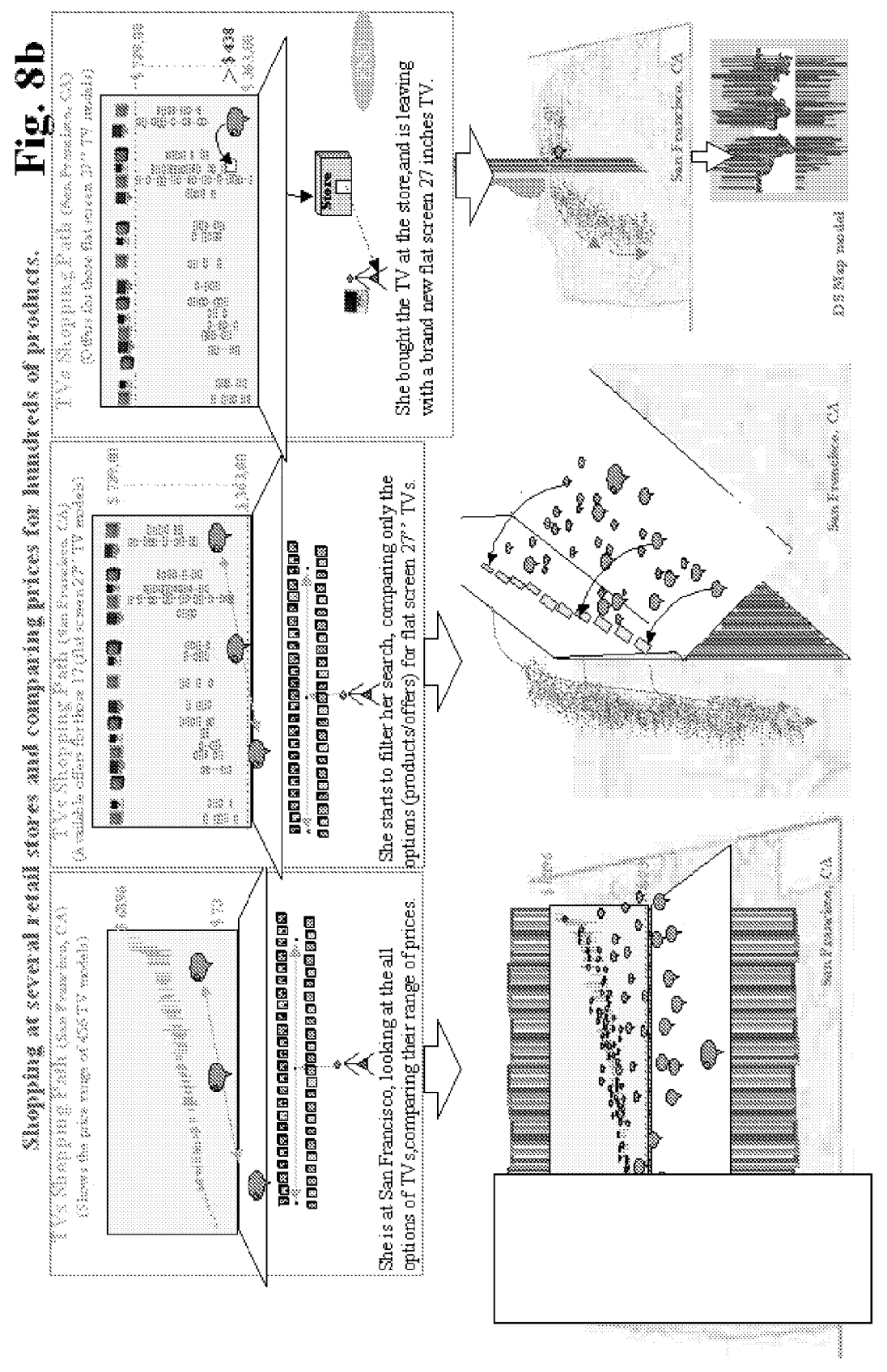

FIG. 8a illustrates the shopping process of a consumer at a product-shopping path. FIG. 8b presents the same example shown in FIG. 8a, but also illustrating the process happening at the regional (San Francisco) Shopping Path.

Figure 9:
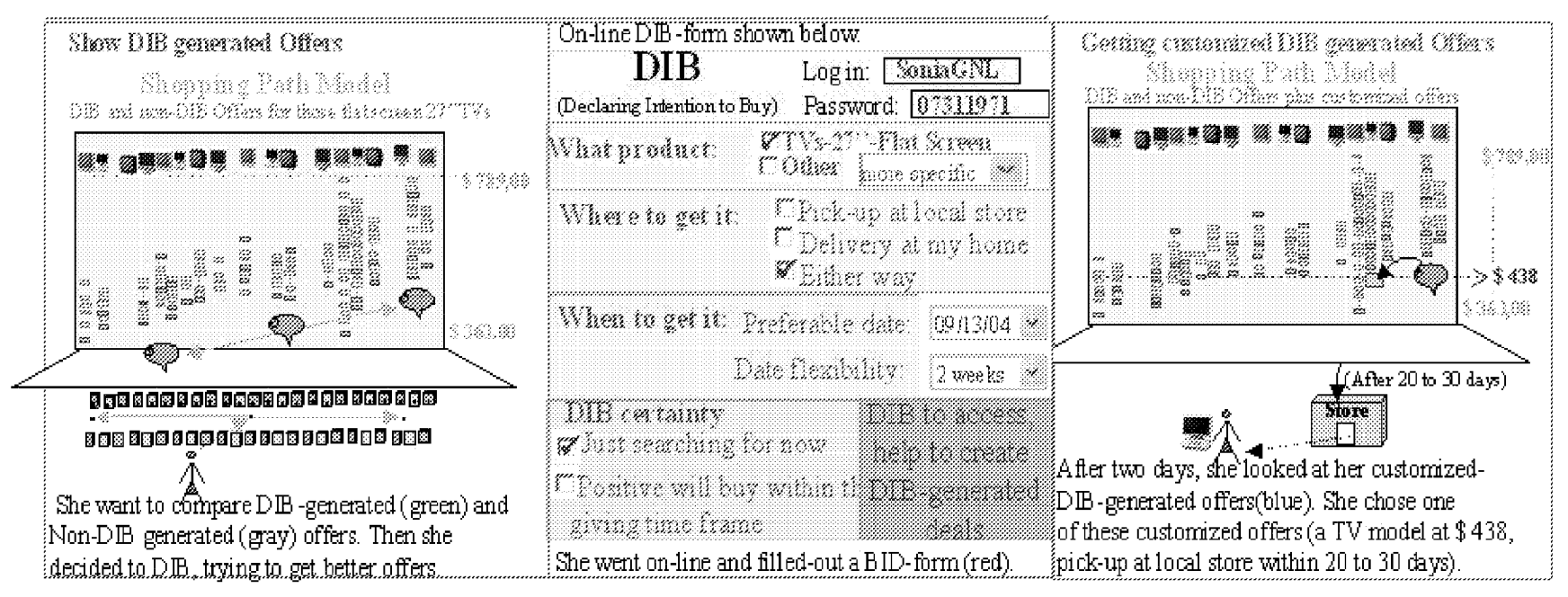

FIG. 9 presents a similar example shown on FIG. 8a and 8b; where the consumer in addition to compare her options of products, she declares her intention to buy (DIB), in advance her purchase, to get improved/customized deals.

Figure 10:
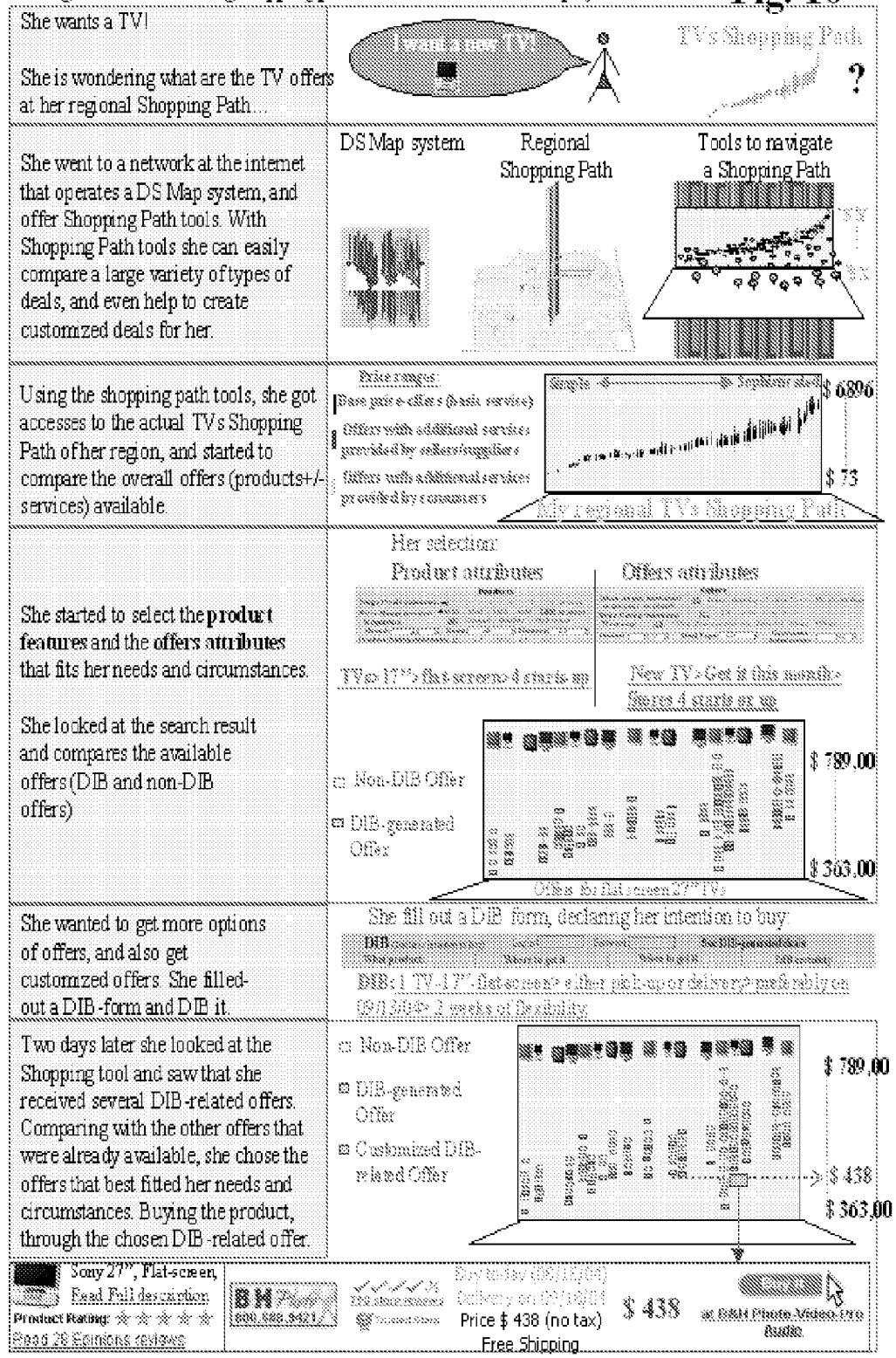
FIG. 10 illustrates a further example showing a consumer comparing options of products and declaring and intention to buy (DIB) to get improved/customized deals according to specific embodiments of the invention.

FIG. 10 examples in another way the consumer comparing her options of products and then declaring her intention to buy (DIB) to get improved/customized deals.

1. System Architecture Overview

Figure 11:
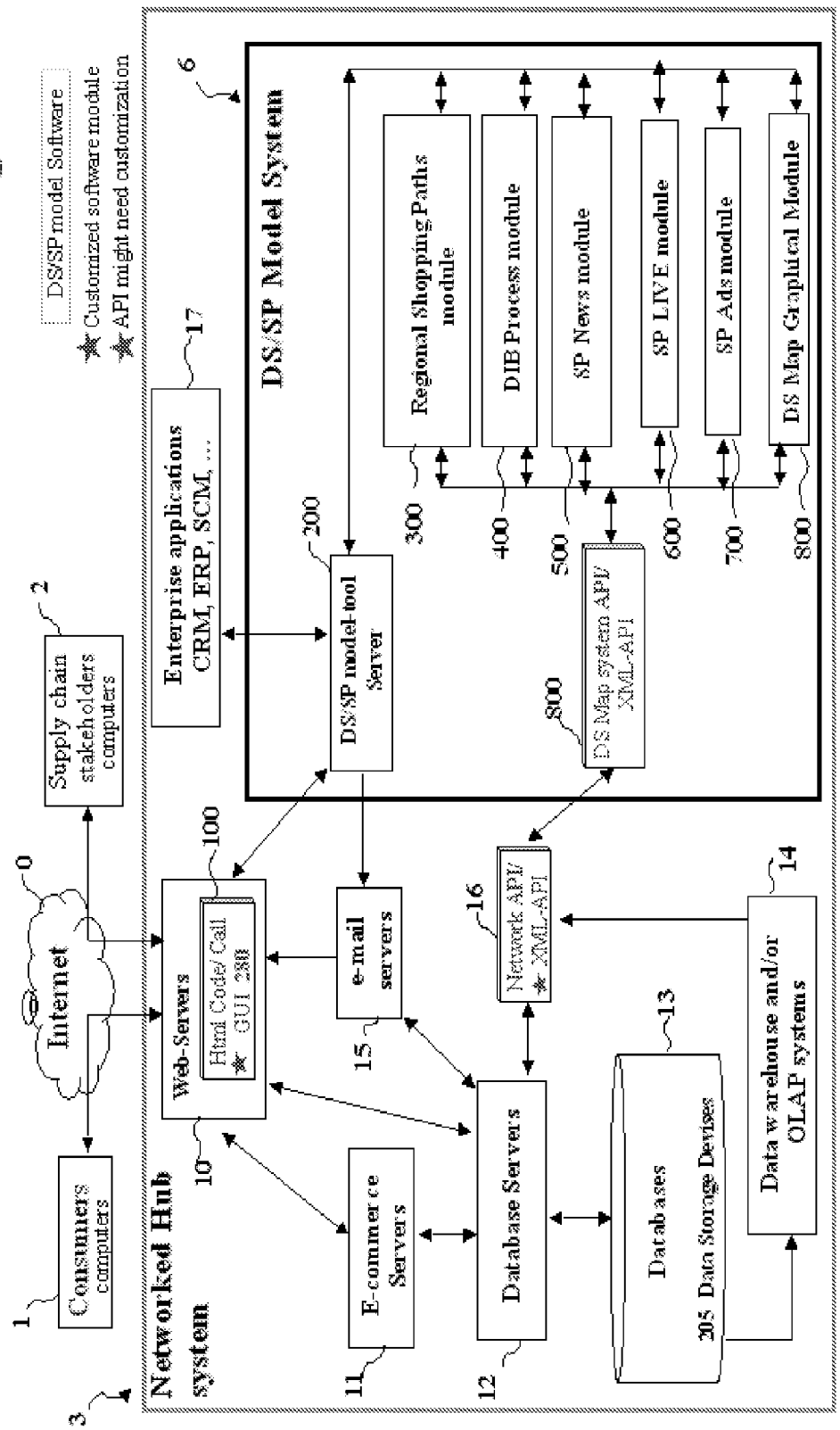
FIG. 11 is a block diagram of an example network of computer systems in which different types of data (including demand and supply information) is processed, according to one embodiment of the present invention.

FIG. 11 is a diagram of a network of computer systems in which different types of data (including demand and supply information) is processed, according to one example embodiment of the present invention. As shown in FIG. 11, a networked hub system 3 (such as e-retailer, search engine or price comparison engine) connects through the Internet 0 to several participants using computers running a browser, including consumers' computers 1 and supply chain stakeholders computers 2 (such as sellers, wholesalers and manufactures). The networked hub system 3 executes its functions, processing several types of data through a network of computer systems, which may include Web-servers 10, E-commerce servers 11, Database servers 12, databases at Data storage devises 13, Data warehouses and/or OLAP systems 14 and Enterprise applications 17 (such as CRM, ERP, SCM).

A demand and supply map/shopping path model system (DS/SP model system) 6, is installed at the networked hub system 3, and is composed by several software modules, according to one embodiment of the present invention. Network application program interface (API) 16, which can be provided by the networked hub 3, and DS/SP model application program interface (API) 800 are used to communicate and collect information from databases 13 and data warehouse 14 to DS/SP model system 6 databases, which are going to be named further. DS/SP-API 800 communicates and distributes the information (collected from the networked hub) among regional shopping paths module 300, DIB process module 400, SP news module 500, SP Live module 600, SP Ads module 700 and DS Map graphical module 800, where each of these modules may be responsible for a separate set of well-defined tasks. Each of these modules may also interact and communicate between each other. DS/SP modeltool Server 200 communicates and collects information from the DS/SP system modules described above (300, 400, 500, 600, 700 and 800), communicating and sending requested information to Web-servers 100 and enterprise applications 17. DS/SP model-tool Server 200 also interacts with e-mal server 15. Html Code/call GUI module 100 is installed at web-server 10, which interacts with DS/SP model-tool Server 200. Details about the data processes of each mentioned DS/SP module are further presented in this document.

Figure 12:
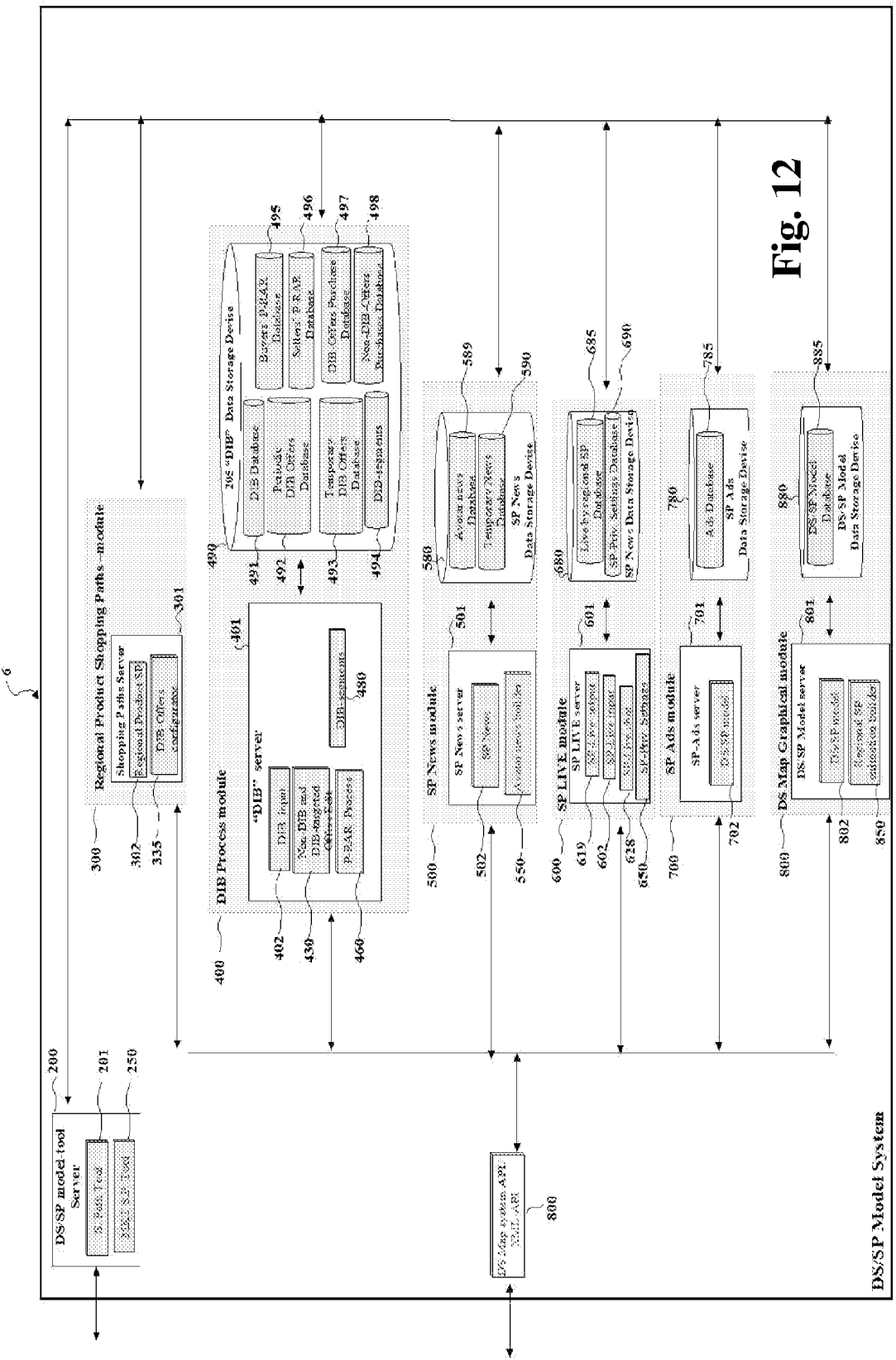
FIG. 12 is a block diagram illustrating different software components of DS/SP modules according to specific embodiments of the invention.

FIG. 12 is a diagram that illustrates the different software components of DS/SP modules. Details of the data processes of each software component shown in FIG. 12 are further presented at the explanations of each DS/SP module. In one particular embodiment of this invention the DS/SP modeltool Server 200 is a Java application server that has a Flex Presentation server, from Macromedia Inc. (www(.)macromedia(.)com) deployed on it. In this particular embodiment the application that executes the Shopping Path tool process 201 and the Marketing Shopping Path tool process 250 shown in FIG. 12, is a Flex application. The Flex Presentation server uses Java objects and WebServices to access data on remote systems. So in this particular embodiment the communication between the DS/SP model-tool Server 200 and the others DS/SP system modules (300, 400, 500, 600, 700 and 800), and the communication among those DS/SP system modules, including the DS/SP-API 800 take place using Java objects and/or WebServices. In another particular embodiment of this invention the DS/SP model-tool Server 200 is a Java application server that has a open-Laszlos server, from Laszlos Inc. (www(.)laszlos(.)com) deployed on it. In this particular embodiment the application that executes the Shopping Path tool process 201 and the Marketing Shopping Path tool process 250 shown in FIG. 12, is a open-Laszlos application.

2. Overview of an Example Shopping Path Tool

According to one embodiment of this invention, a DS/SP model system is deployed to support e-commerce functions at networked hub systems (such as e-retailers or price comparison engines), providing supporting shopping tools for consumers and marketing tools for sellers. In one embodiment, a networked hub website (such as e-retailers or price comparison engines) displays an interactive shopping tool (that can be deployed either in Java, Macromedia's Flash or AJAX-Asynchronous JavaScript+XML) inserted at the HTML website's list of products. Consumers accesses and uses the networked hub's website, navigating over the lists of products as they are used to, and if they wish they are able to use the interactive shopping tool. When a user opens the interactive shopping tool, he or she no longer needs evaluate their product options by going through several pages, they just interact with the product shopping path, comparing the price variation of all options of available products (of a certain product category) at a glance. The interactive tool visually displays all product options together making the comparison, of what products (from simpler to more sophisticated products) can be bought for the same amount of money, immediate. The shopping tool allows users to see (at a glance) what is the price position of a specific offer (for a specific product) in comparison with all offers for the same product, and in comparison to all offers for all available products (that belong to the same category). The shopping process becomes more efficient, and the price comparison much faster, clear and precise.

The presented embodiment of the invention allows networked hubs websites to offer the interactive shopping tool to their users without drastic changes in their website layout, providing a seamless integration of the traditional comparison method (the lists of products) users are already familiar, with the new graphical price comparison method.

In one embodiment of the present invention, an animated assistant or host avatar (e.g., the SP mascot 2626) is displayed along the shopping path tool, so that the SP mascot 2626 can assist users (if they wish) with explanations and tips about the shopping path tool, while they proceed at their shopping process. The prior art of the deployment of application assistants (like the office assistant from Microsoft Corporation, for example) are well know in the computer field, so it will not be detailed at this discussion.

Figure 13:
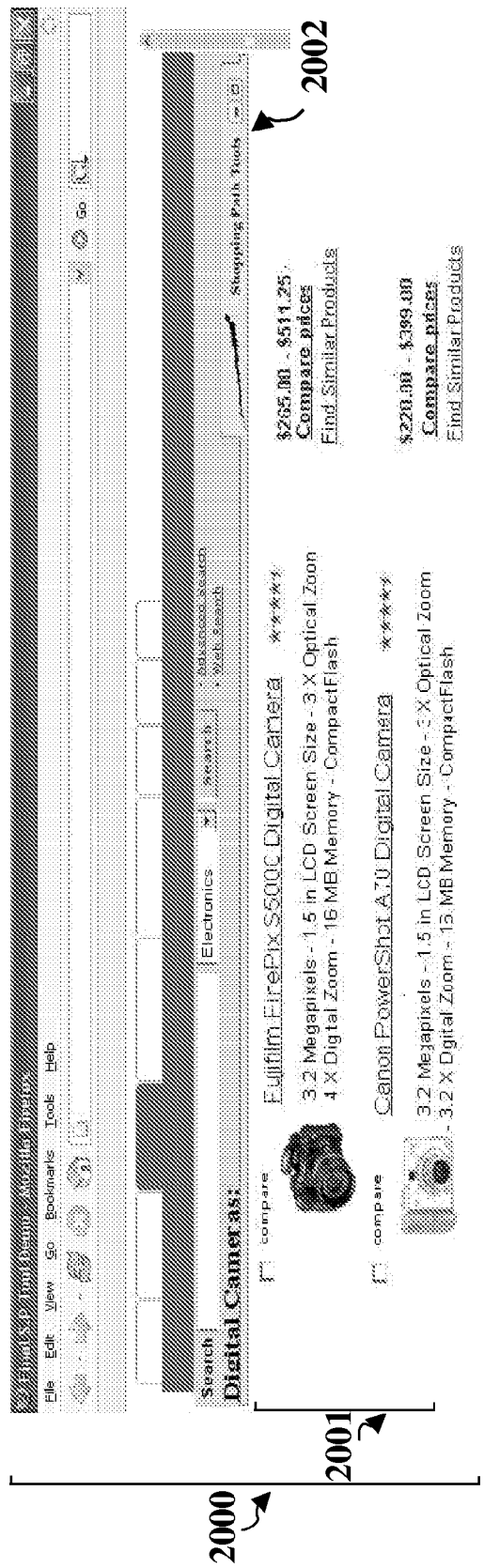
FIG. 13 illustrates an example graphical interface with an interactive graphical shopping/price comparison tool located above a list of products provided by a networked hub website according to specific embodiments of the invention.

FIG. 13 illustrates an example graphical interface, and in particular, an Internet browser (Mozilla-Firefox) with a display window 2000, where an interactive graphical shopping/price comparison tool 2002 (called shopping path tool) is located above a list of products 2001 (a list of digital cameras) provided by a networked hub website (such as e-retailers or price comparison engines). The shopping path tool 2002 can include a standard Minimize button and standard Maximize button. The shopping path tool 2002 is shown at FIG. 13 at its most contracted form, and as a user click the Maximize button, the tool expands its size to showing a number of panels, control functions and displays.

The shopping path tool (that can be deployed either in Java, Macromedia's Flash or AJAX-Asynchronous JavaScript+XML) is a Rich Internet Application that is displayed inside one interactive row (SP-tool row) displayed among other rows that compose the HTML website's list of products. FIG. 14 shows a block diagram that illustrates said SP-tool row 2003 displayed above the rows (product-rows) that display the website's list of products 2001. FIG. 15 shows the same block diagram shown on FIG. 14, illustrating a SP-tool row expanding its height, moving the product-rows downward the web page.

FIG. 16 to FIG. 18 illustrate the SP-tool row expanding its height to accommodate the shopping path tool different panels and control functions. FIG. 16 illustrates the SP-tool row with a shopping path tool at its most contracted form inside it. FIG. 17 illustrates an expanded SP-tool row with a shopping path tool displaying its main control functions, which includes Shop (for shopping), DIB (for declaring the intention to buy), News (for products and offers news/reports), Live (for three dimensional navigation and live chatting at regional shopping paths) and Privacy settings (to manage privacy issues). As it shown in FIG. 17, the Shop control function is selected, displaying its related panels; say the Select/Filter-products-and-deals panel, Interactive Shopping Path panel and Product panel Product Panel(shown as Product Panel). FIG. 18 shows a similar example shown on FIG. 17, illustrating two of its panels opened, particularly the Shopping Path panel 2004 and Product panel 2005; which are going to be described in detail at the following figures.

Figure 19:
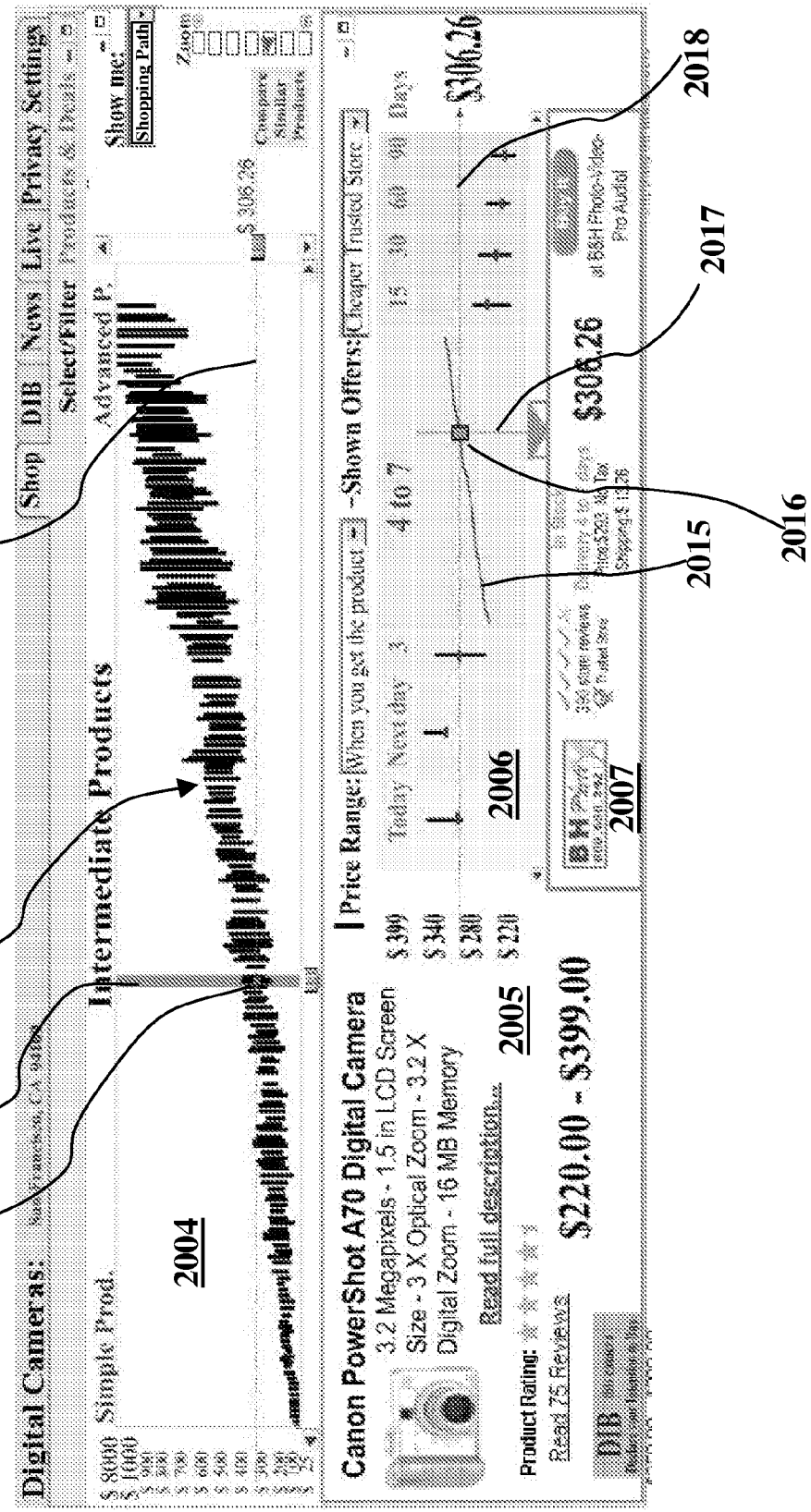
FIG. 19 illustrates an example screenshot of an example graphical interface showing a shopping path tool, which displays products and offers information with the shopping path tool Shop control function selected according to specific embodiments of the invention.

FIG. 19 illustrates an example screenshot of an example graphical interface showing a shopping path tool, which displays products and offers information. At the shopping path tool, the Shop control function is selected, and the Shopping Path panel 2004 and Product panel 2005 are opened. The Shopping Path panel 2004 displays an interactive product-shopping path 2013 (the San Francisco's digital cameras shopping path). The product-shopping path is a graphical pattern formed, (assuming prices as y-axis and groups of offers for products as x-axis), when the group of offers of each product of a product category is arranged side-by-side in order of low to high end (or vice-versa); where (at the distant view) the group of offers of each product is shown as a bar (a product-bar) 2011, wherein the size of each product-bar 2011 corresponds the price variation of the product offers. A product-selector 2012, that is attached at a parallel-scroll button, recognizes the product-bar 2011 it touches, so when a user scroll the button either left or right, the product-selector 2012 highlights the touched product-bar 2011, and information (like product features and offers details) related to that selected product is displayed at the Product panel 2005. The product-selector 2012 highlights the product-bar 2011 by changing its color, and increasing the distance from the bars of both sides (the group of bars of both sides move sideways). When the product-bar 2011 is highlighted, one specific offer related to that selected product (like the lowest price, delivery four to seven days from a trusted store) is highlighted, displayed as a small square over the product-bar 2011, at its respective price position at the y-axis. A product-price bar 2014, is displayed at the y-axis position where the specific offer is highlighted, showing at its right end the price of said specific offer. The product-price bar 2014 is attached at a vertical-scroll button, that also recognizes the price at product-bar 2011 it touches; so when a user scroll the button either up or down, the product-price bar 2014 highlights the touched price position at the product-bar 2011, and the position of the deal is displayed at the offers panel 2006 and related information (the offers details) is displayed at the specific offer panel 2007. In this particular case, shown at FIG. 19, the selected product-bar 2011 represents the price variation of the Canon Powershot A70 digital camera.

The Product panel 2005 displays information (like product features and offers details) related to the selected product (product-bar 2011), in this particular case the Canon Powershot A70 digital camera. The panel 2005 displays at its right side product information like name, product features and price variation. Two additional panels are displayed at the left side of the Product Panel 2005, particularly the Offers panel 2006, and the specific offer panel 2007. The Offers panel 2006 displays in more detail the offers of the selected product (product-bar 2011), in this case, it shows the variety of offers for the Canon Powershot A70 digital camera. Similar to the Shopping Path panel 2004, the Offers panel 2006 has prices as y-axis and groups of offers for products as x axis; where groups of categories of offers are arranged side-by-side; where the group of offers of each offer category is shown as a bar, wherein the size of each bar corresponds the price variation of the offer category; in this particular case, the bars (offers category) are arranged by pick-up/delivery date (when the consumers get the product). One offer category (like four to seven days pick-up/delivery) is highlighted, displaying/ representing its specific offers by objects, like squares or rectangles, displayed side-by-side, either at increasing or decreasing order. The size of each one of these squares is automatically adjusted to fit all displayed offers at the designated category space at the offers panel 2006. In the particular example shown at FIG. 19, the group of offers 2015 (displayed side-by-side) are so small that they look like a continuous line. One specific offer 2016 is highlighted, (the lowest price, delivery four to seven days from a trusted store), by increasing the size of its square and changing its color. A offer-selector 2017, that is attached at a parallel-scroll button, recognizes the offer square it touches, so when a user scroll the button either left or right, the offer-selector 2017 highlights the touched offer square, and the information (offers details) related to the selected offer is displayed at the specific-offer panel 2007. The specific-offer panel 2007 displays specific information about the highlighted specific offer, such as the name of vendor, the vendor rating, characteristics of the offer and its price. An offer-price bar 2018, is displayed at the y-axis position where specific offer is highlighted, showing, at its right end, the price of that specific offer. Notice that the same offer highlighted at Shopping Path panel 2004, is also highlighted at the Offers panel 2006, and detailed at specific-offer panel 2007; in this particular case, the highlighted offer is provided by B&H Photo, offering a Canon Powershot A70 digital camera, to be delivered (at San Francisco-Calif.) within 4 to 7 days at $306.26.

Figure 20:
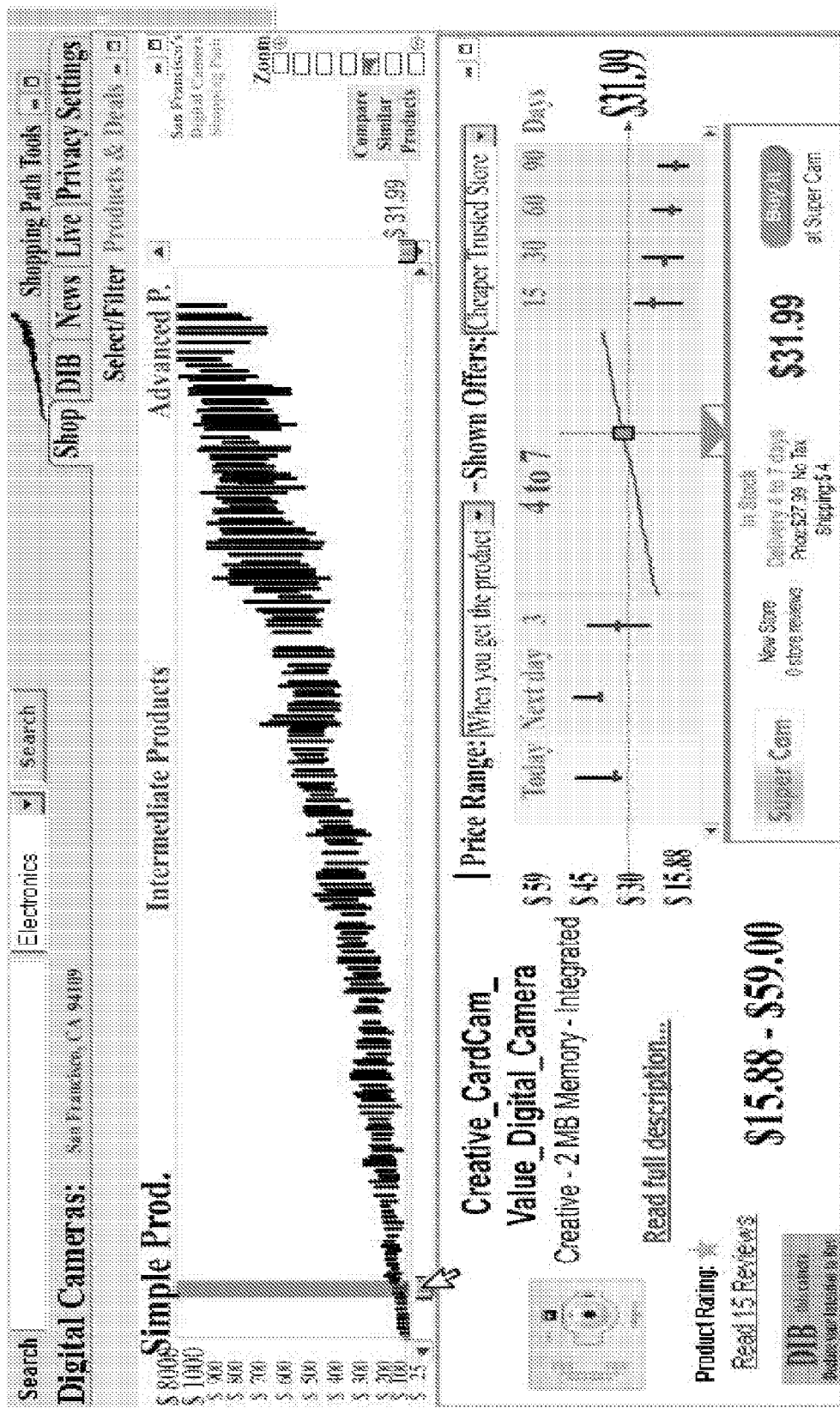
FIG. 20 illustrates an example screenshot illustrating a user selecting products, by scrolling the product-selector; in this particular case, the Shopping Path tool is set up to automatically show the lowest price, delivery four to seven days from a trusted store (the $31.99 offer); where the selected offers is depicted at the Shopping Path panel, the Offers panel and the specific-offer panel, according to specific embodiments of the invention.

FIG. 20 illustrates an example screenshot of an example graphical interface showing a user scrolling the product-selector 2012 to the right side, until it reaches the product-bar representing the Creative CamCard Value Digital Camera. This example screenshot follows the example of FIG. 19, illustrating a user selecting products, by scrolling the product-selector. Notice that, in this particular case, the Shopping Path tool is set up to automatically show the lowest price, delivery four to seven days from a trusted store (the $31.99 offer); where the selected offers is depicted at the Shopping Path panel, the Offers panel and the specific-offer panel.

Figures 21, 22, 23:
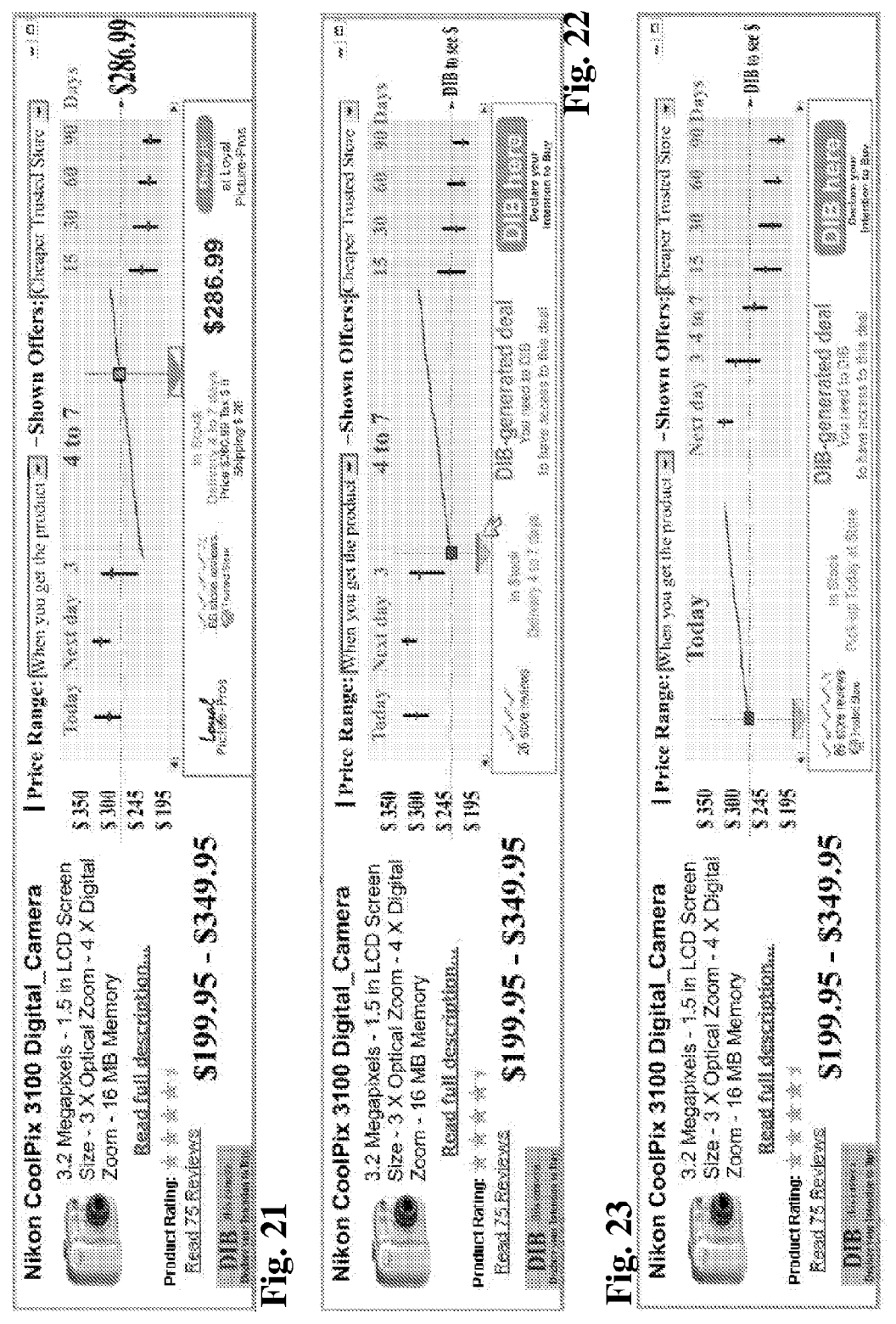

FIG. 21 to FIG. 23 illustrate examples screenshots of an example graphical interface showing a user selecting different offers for the same product, by scrolling right or left the offer-selector. FIG. 21 illustrates an example screenshots of an example graphical interface showing a Product panel, which displays product and offers information about the (assumed) selected product (Nikon CoolPix 3100 Digital Camera). FIG. 22 follows the example shown on FIG. 21, illustrating a user selecting a different offer for the same product, by scrolling left the offer-selector until it reaches the offer with lowest price from its offer category (4 to 7 days pick-up/delivery category). FIG. 23 follows the example shown on FIG. 22, illustrating a user selecting a different offer for the same product, by scrolling left the offer-selector to a different offer category (particularly the today pick-up/delivery category). When a user scrolls right or left the offer-selector selecting another offer category, the offers squares of the previously highlighted offer category contract into a bar and its designated space also contracts; while the designated space of the newly selected offer category expands and its offer bar expands into offers squares. FIG. 23 illustrates that the designated space and offers squares of the 4 to 7 days offer category contracted, and the designated space and offers squares of the today offer category expanded.

Figure 24:
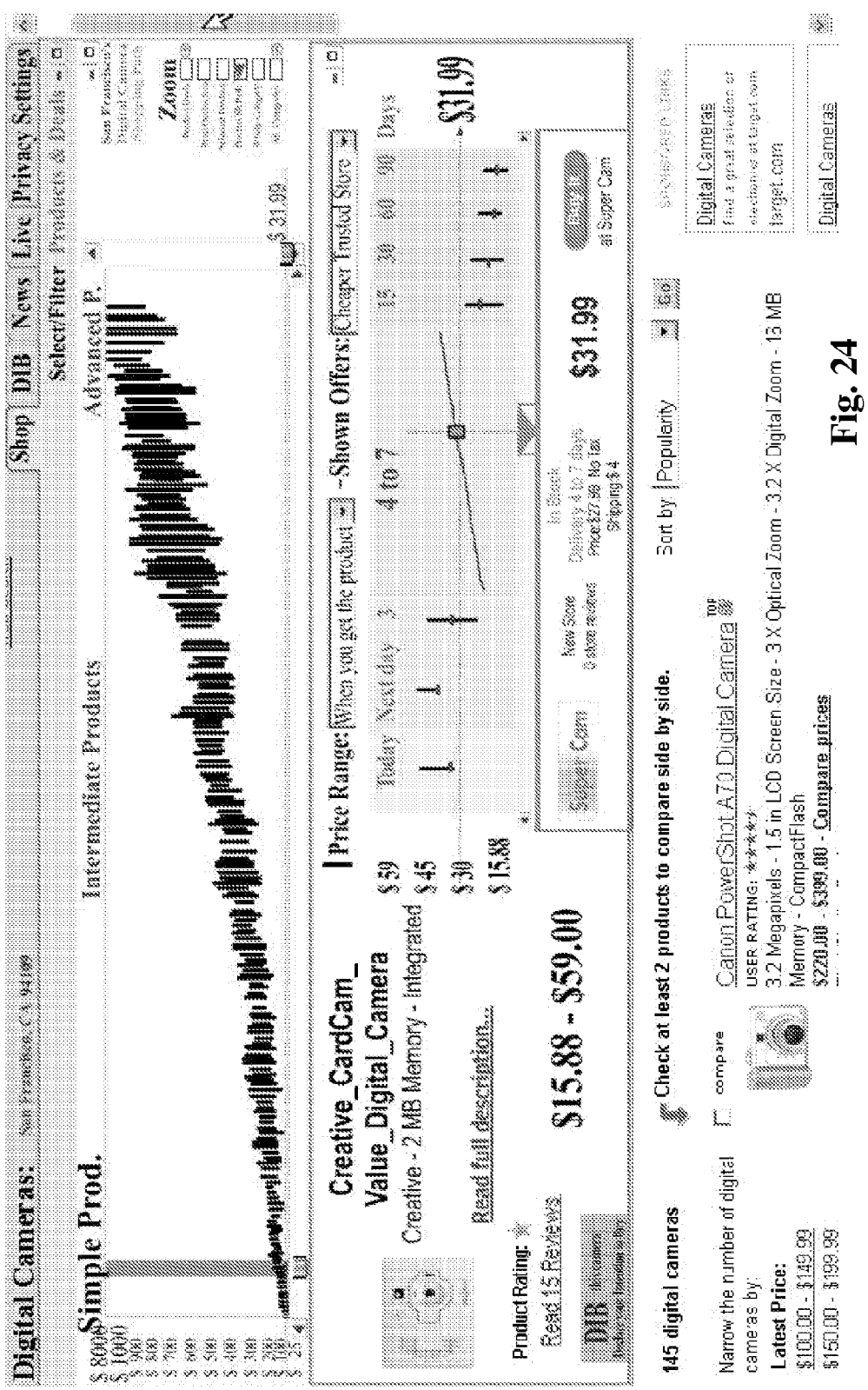
FIG. 24 illustrates an example screenshots of an example graphical interface showing a shopping path tool displaying product and offers information of a specific product according to specific embodiments of the invention.

FIG. 24 to FIG. 27 illustrate examples screenshots of an example graphical interface showing different modes of how the shopping path tool located above a list of products) can interact with the list of products, when a user scrolls down/up the browser scroll button. FIG. 24 illustrates an example screenshots of an example graphical interface showing a shopping path tool displaying product and offers information of a specific product, particularly the Creative CamCard Value Digital Camera. Notice that there is a list of products below the shopping path tool, and the first displayed product (at its product-row) is the Canon Powershot A70 digital camera.

Figure 25:
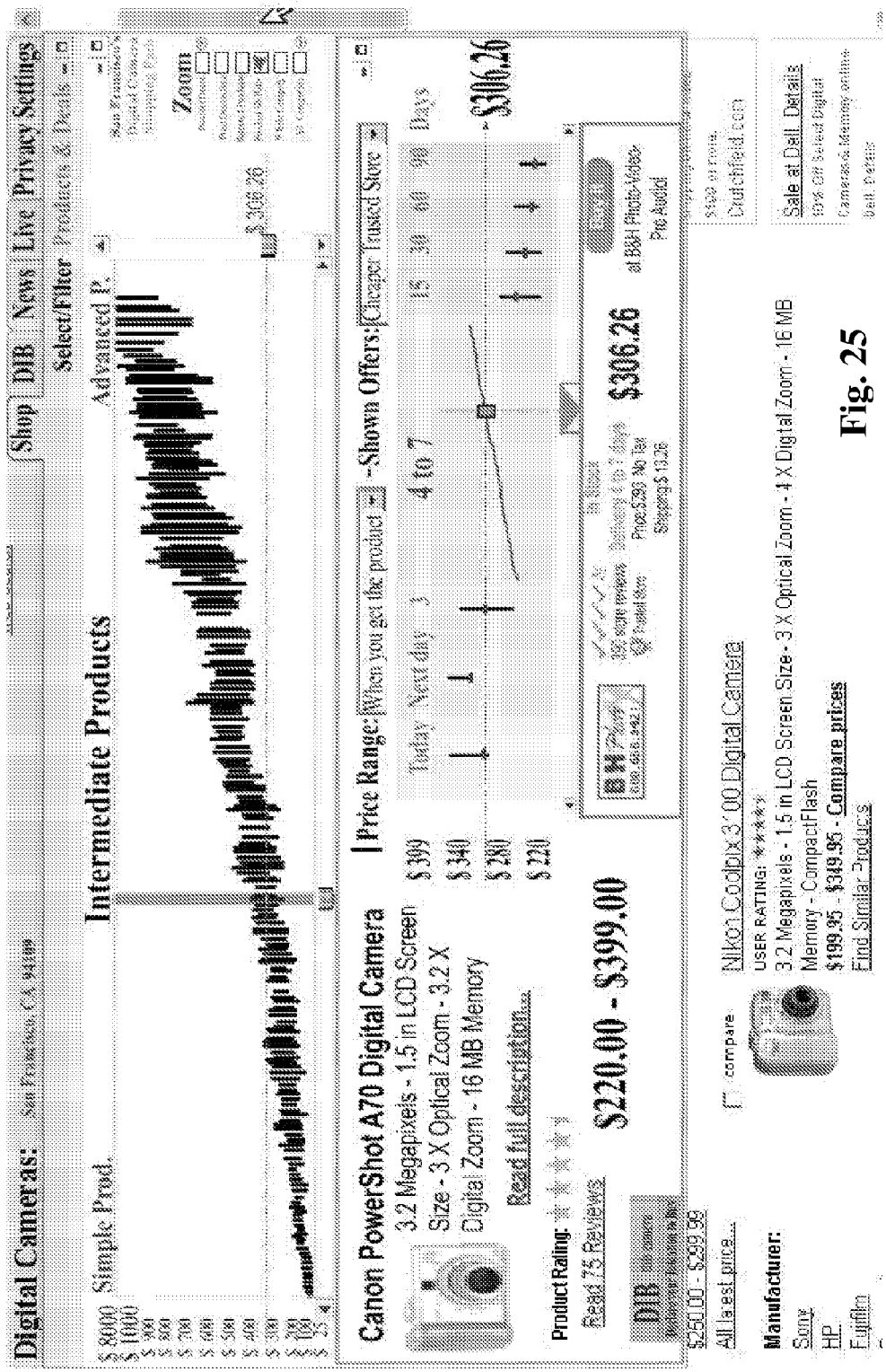
FIG. 25 follows the example shown on FIG. 24, illustrating that as the user scroll down, and the top-rows of the list of products goes up, the shopping path tool recognized the product information displayed at the product-row according to specific embodiments of the invention.

FIG. 25 follows the example shown on FIG. 24, illustrating that as the user scroll down, and the top-rows of the list of products goes up, the shopping path tool recognized that Canon Powershot A70 digital camera information was displayed at the product-row (of the list of products) that touched the bottom of the SP-tool row, so that the shopping path tool displays at its opened panels, say the Shopping Path panel and the Product Panel, product and offers information related to Canon Powershot A70 digital camera.

As the user scrolls down, the SP-tool row (and the shopping path tool) remains at the top of the page, so as the product or item displayed at the top-row of the list of products touches the bottom of the SP-tool row, the SP-tool row in combination with the shopping path tool recognizes the product information displayed at that top-row, displaying information about the selected product (at the opened panels of the shopping path tool). The same action happens when the user is scrolling up, as the top-rows of the list of products go down, one-by-one, they touch the bottom of the SP-tool row, then the shopping path tool recognize it one-by-one, displaying information about the selected product at its opened panels. Notice that if no panel of the shopping path is open, even thought the SP-tool row and the shopping path tool remains at the top of the page and recognize the product row it is touching the bottom of the SP-tool row, nothing will change from the familiar scroll drown of lists, because (as the panels are closed) no graphical information is displayed. In one embodiment of invention networked hubs insert a product-marker (such as a transparent Flash object) inside each product row of its list of products, along with their product information such as description and picture. When the user scrolls up or down, the shopping path tool (flash application) recognizes the product-marker (the transparent Flash object) that is touching the shopping path tool, displaying that product's information on its opened panels.

Figure 26:
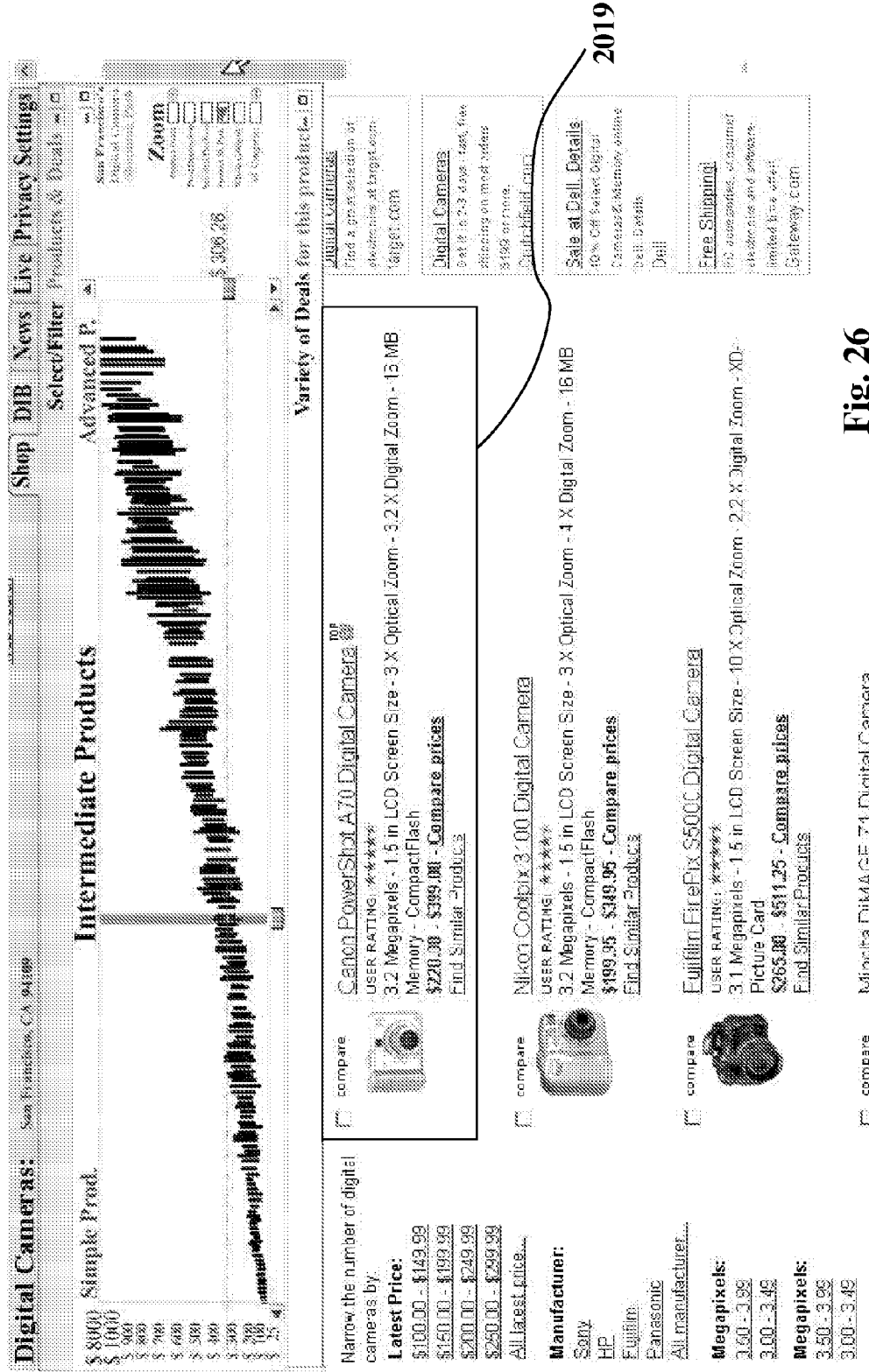
FIG. 26 follows the example shown on FIG. 25, illustrating a user minimizing the Product panel, so that the SP-tool row and the shopping path tool recognize the product at the top-row of the list, which is touching the bottom of the SP-tool row, according to specific embodiments of the invention.

FIG. 26 follows the example shown on FIG. 25, illustrating a user minimizing the Product Panel, so that the SP-tool row and the shopping path tool recognize the product at the top-row of the list, which is touching the bottom of the SP-tool row, embracing the top-row with a colored square or rectangle 2019, and showing the position of that selected product at the interactive shopping path displayed at the opened Shopping Path panel. In the particular case, the embraced row is related to the Canon Powershot A70 digital camera. If the user keeps scrolling down one more row, for example, the Nikon Coolpix 3100 digital camera row would be embraced, and the position of this product at the shopping path panel would be highlighted.

Figure 27:
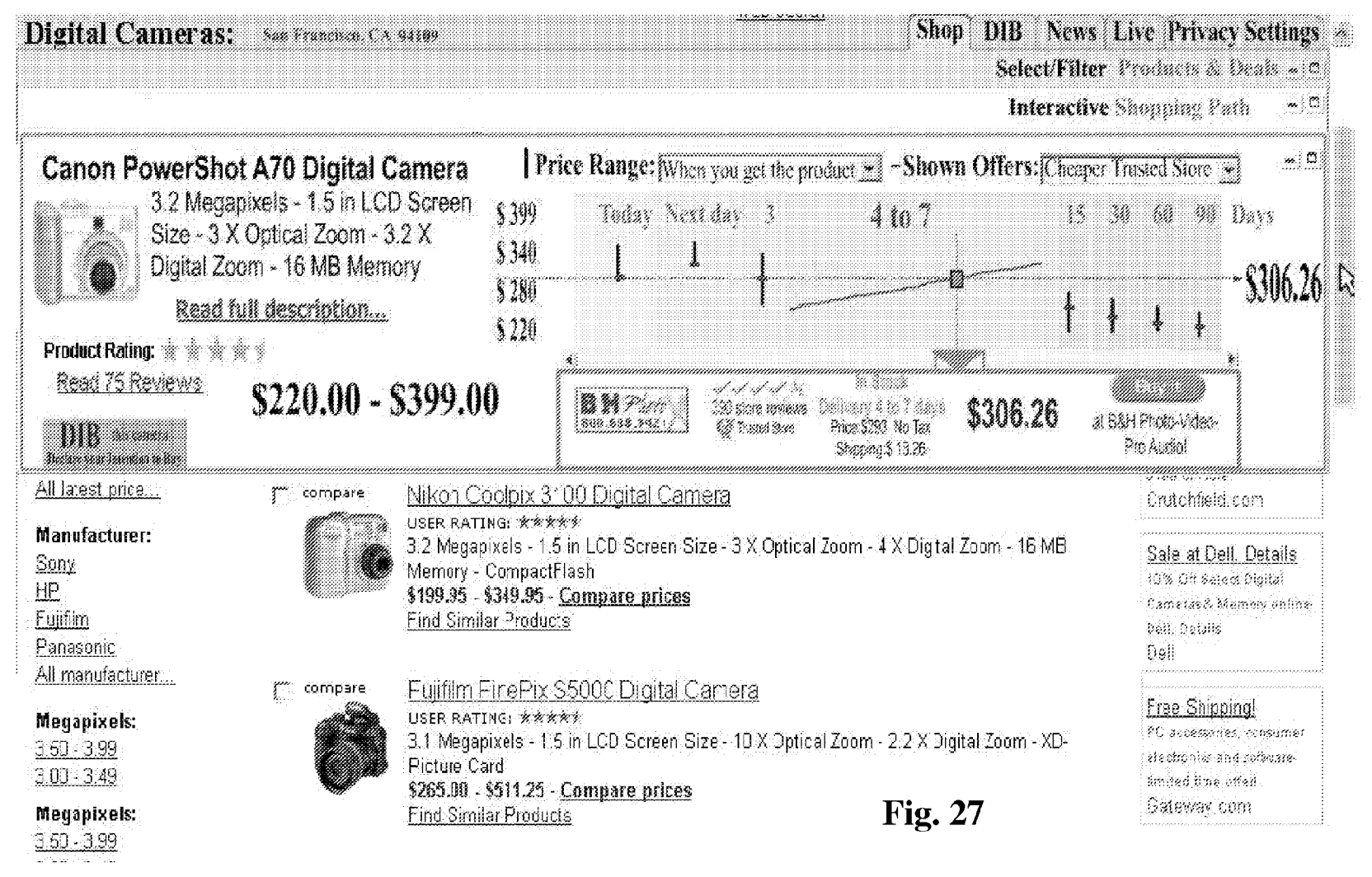

FIG. 27 follows the example shown on FIG. 25, illustrating a user minimizing the Shopping Path panel, so that the SP-tool row and the shopping path tool recognize the product at the top-row of the list, which is touching the bottom of the SP-tool row, displaying at the Product Panel information related to Canon Powershot A70 digital camera. If the user keeps scrolling down one more row, for example, information about the Nikon Coolpix 3100 digital camera would be displayed at the Product Panel.

Figure 28:
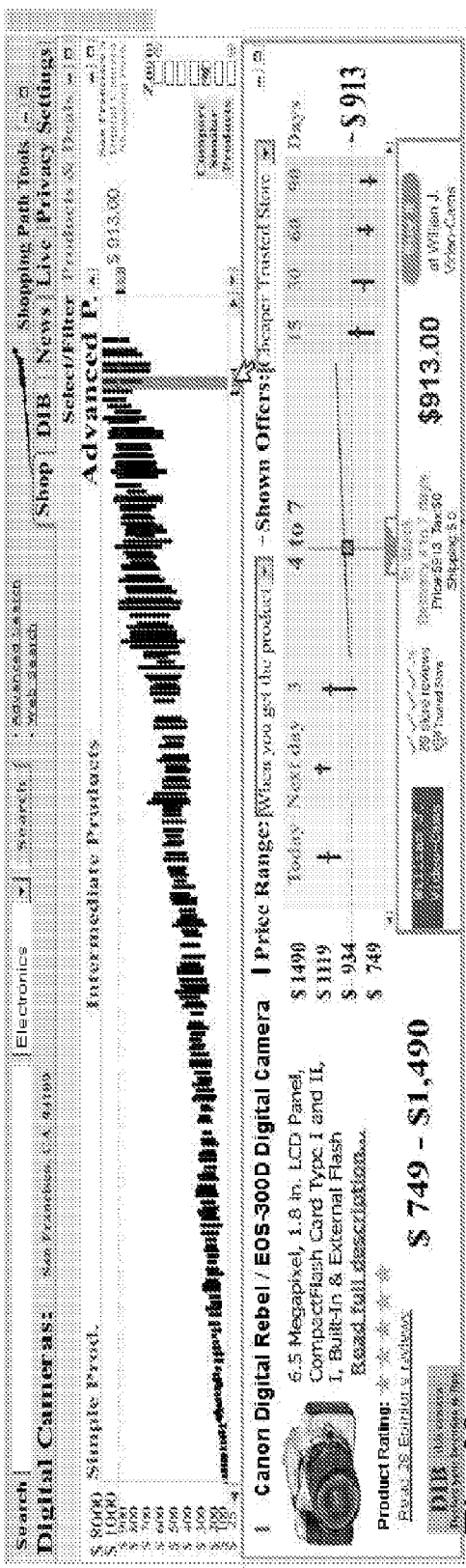
FIG. 28 illustrates an example screenshot of an example graphical interface showing the shopping path tool displaying product and offers information of a specific product, particularly the Canon Digital Rebel/EOS 300D Digital Camera, according to specific embodiments of the invention.
Figure 29:
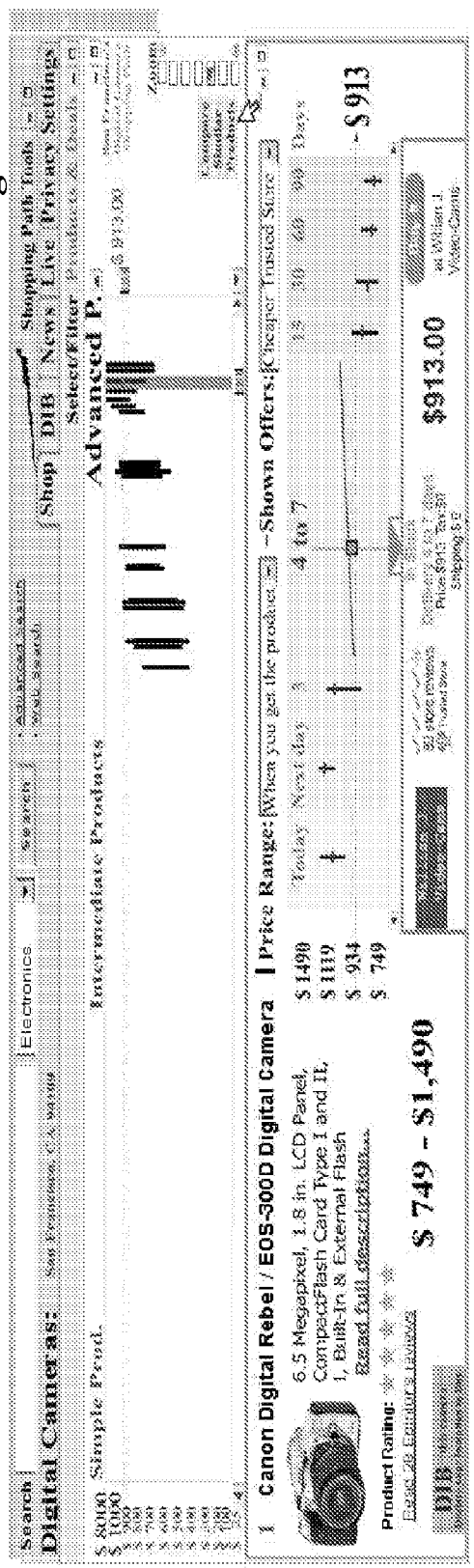
FIG. 29 follows the example shown on FIG. 28 illustrating an user clicking at the compare similar products button, so that only the product-bars representing products with similar features of the Canon Digital Rebel/EOS 300D Digital Camera remain displayed at the interactive shopping path, according to specific embodiments of the invention.
Figure 33B:
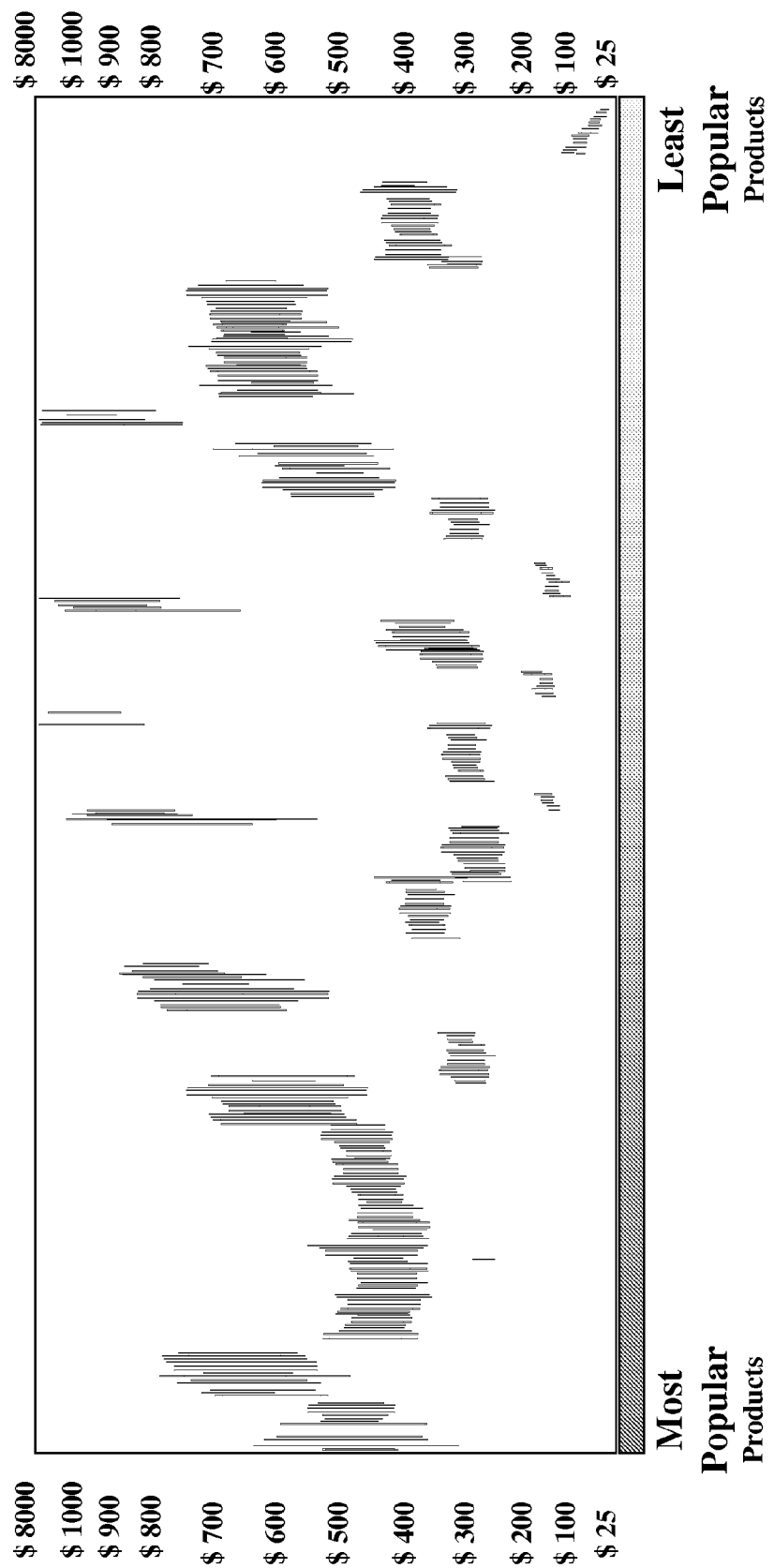
FIG. 33b illustrates an example screenshot of an example graphical interface showing product-bars being displayed side-by-side, from the most popular product to the least popular product; this example screenshot illustrates the fact that if the product-bars are not arranged in a increasing or decreasing pattern, the pattern arrangement becomes unpleasant/unfriendly.

FIG. 28 and FIG. 29 illustrate examples screenshots of an example graphical interface showing a control function (a button) that allows users to compare a specific product with only products with similar features. FIG. 28 illustrates an example screenshot of an example graphical interface showing the shopping path tool displaying product and offers information of a specific product, particularly the Canon Digital Rebel/EOS 300D Digital Camera. FIG. 29 follows the example shown on FIG. 28, illustrating a user clicking at the compare similar products button, so that only the product-bars representing products with similar features of the Canon Digital Rebel/EOS 300D Digital Camera remain displayed at the shopping path panel.

FIG. 30 to FIG. 33 illustrate examples screenshots of an example graphical interface showing that product-bars at the shopping path panel can be displayed into different modes and into different categorizations. FIG. 30 illustrates an example screenshot of an example graphical interface showing the show me drop down menu, which determines that the product-bars are arranged according the product shopping path model. FIG. 31 follows the example shown on FIG. 30, illustrating a user selecting show me drop down menu to arrange the product-bars by feature, particularly the cameras mega-pixels. FIG. 32 follows the example shown on FIG. 30, illustrating a user selecting show me drop down menu to arrange the product-bars by brand. FIG. 33a follows the example shown on FIG. 30, illustrating a user selecting show me drop down menu to arrange the product-bars by users types. Notice that even though the product-bars can be displayed into different modes and into different categorizations at the Shopping path panel, it is recommended that they should be arranged by a method that provides a sense of either increasing or decreasing order; otherwise the display gets confusing or unpleasing. Because there is a direct relation between product price and product sophistication, whichever the categorization the product-bars are arranged, if they are either in increasing or decreasing order, users immediately perceive a logical pattern within lower and higher end products. FIG. 33b illustrates a pattern formed when the product-bars are arranged by their popularity, from most to least popular products. The pattern may provide some insight, however there is not immediate recognizable pattern, which may be unpleasing for users. In this particular case it is more appropriate to organize the product-bars into either increasing or decreasing order, and arrange the list of products according to product popularity; so users have the perspective of the position of the most popular products (of the list) within the graphical pattern of products from low to high sophistication.

Figure 34:
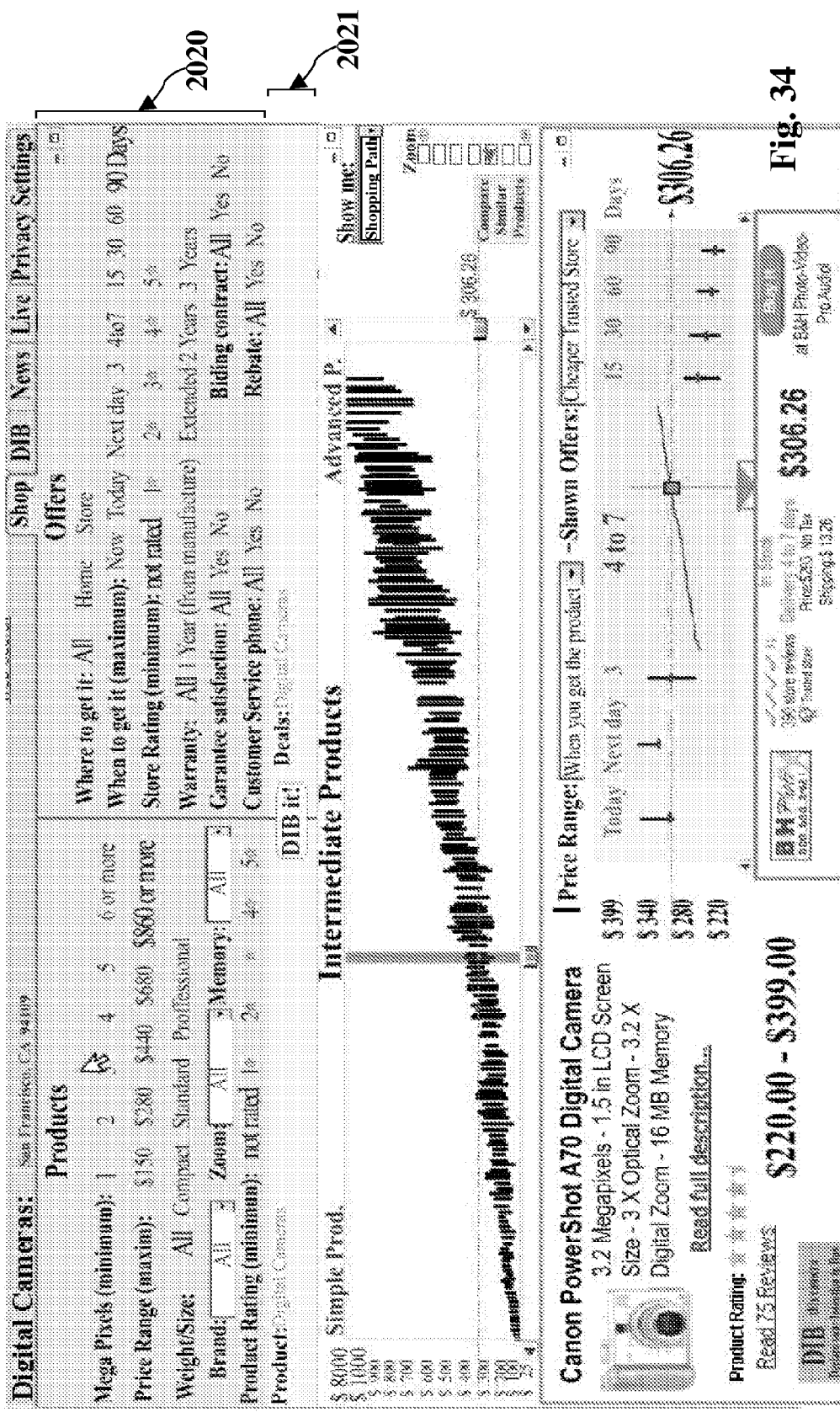
FIG. 34 and FIG. 35 illustrate examples screenshots of an example graphical interface showing the Select/Filter-products-and-deals panel functions, which allows users to filter and select product and offers with features that fits their needs.
Figure 35:
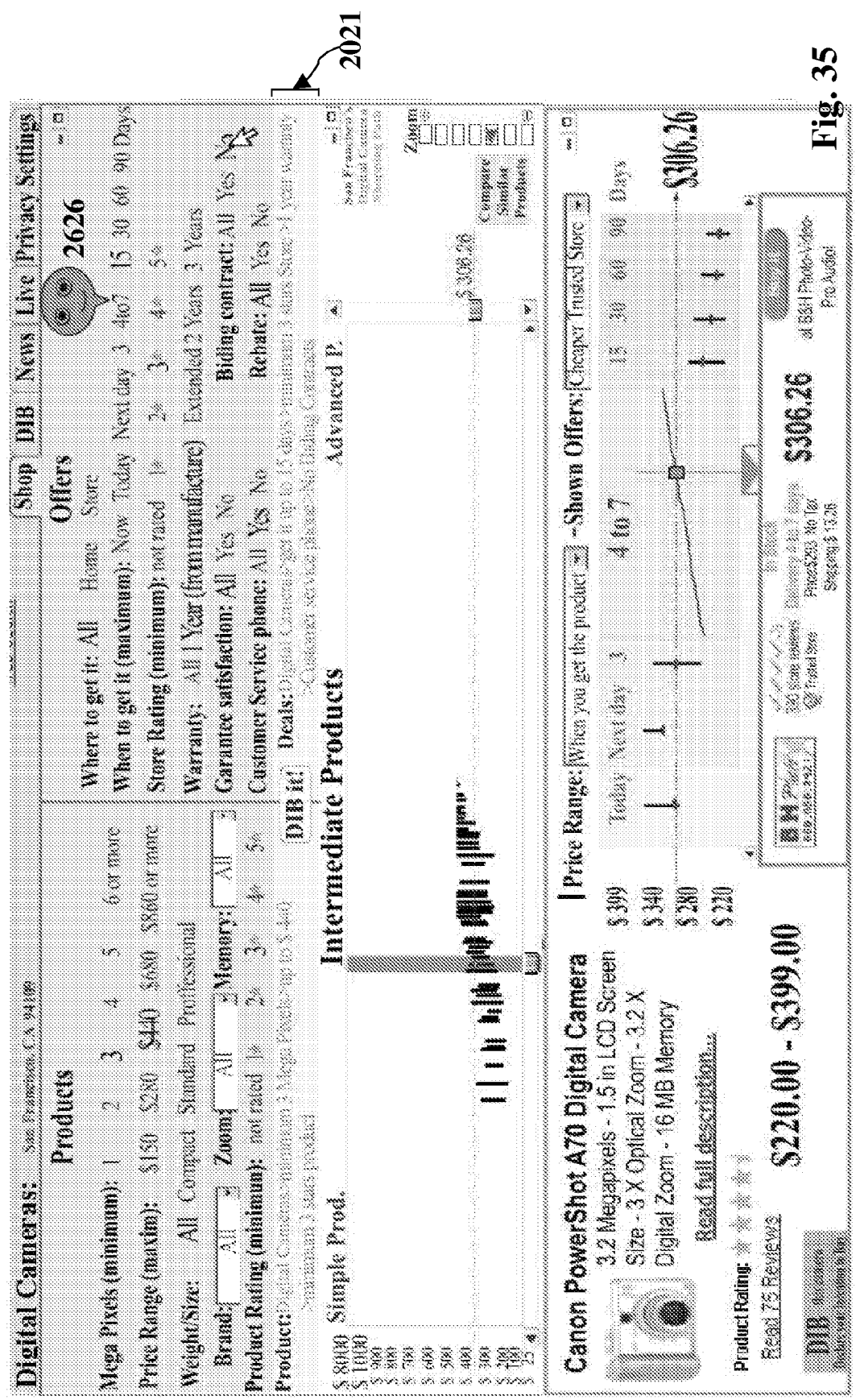

FIG. 34 and FIG. 35 illustrate examples screenshots of an example graphical interface showing the Select/Filter-products-and-deals panel functions, which allows users to filter and select product and offers with features that fits their needs. FIG. 34 illustrates an example screenshot of an example graphical interface showing the shopping path tool displaying product and offers information of a specific product, particularly the Canon Powershot A70 digital camera. The shopping path tool has the Select/Filter-products-and-deals panel 2020 opened, showing product and offers options that can be selected by users. A chosen-features section 2021 shows what products and offers features users selected. In this particular case, the user hasn't selected any feature. FIG. 35 follows the example shown on FIG. 34, illustrating that the user selected product and offers features at the Select/Filter-products-and-deals panel 2020, and the selected features are displayed at the chosen-features section 2021. Notice that only the products that have the selected features remains displayed at the shopping path panel.

The example screenshot shown of FIG. 35 has an animated host avatar (the SP mascot 2626), which can assist users (if they wish) with explanations and tips about the shopping path tool, while they proceed at their shopping process.

FIG. 36 to FIG. 40 illustrate examples screenshots of an example graphical interface showing the zoom control function, which allows users to magnify the products and offer graphical representations displayed at the shopping path panel. FIG. 36 illustrates an example screenshot of an example graphical interface showing a group of product bars displayed at a shopping path panel. The interactive product-bars of FIG. 36 follows the example shown on FIG. 35, where only products with the selected features remains at the shopping path panel. FIG. 37 follows the example shown on FIG. 36, illustrating a user clicking the zoom button, one zoom-level above the previous one. The product-bars seem on FIG. 36 are magnified and the y-axis (price) is adjusted. FIG. 38 follows the example shown on FIG. 37, illustrating a user clicking the zoom button, one zoom-level above the previous one. Each product-bar is substituted by its respective group of offers, where each square represents a different offer. FIG. 39 follows a similar (but different) example shown on FIG. 38, illustrating a user clicking the zoom button, one zoom-level above shown in FIG. 38. The groups of offers of the selected product are magnified, and only the surrounding products (the group of offers) are shown together with the selected product. The y-axis (price) is also adjusted. FIG. 40 follows the example shown on FIG. 39, illustrating a user clicking the zoom button, one zoom-level above the previous one. The groups of offers of the selected product are arranged and grouped into categories, more particularly pick-up/delivery date categories.

Figure 41:
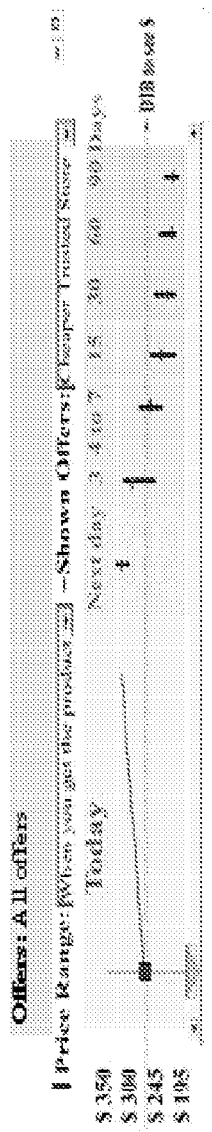
FIG. 41 to FIG. 45 illustrate examples screenshots of an example graphical interface showing that as a user selects offers features, the size of the squares representing the offers automatically adjusts to fit into its designated area, while keeping its respective position at the y-axis, according to specific embodiments of the invention.
Figure 42:
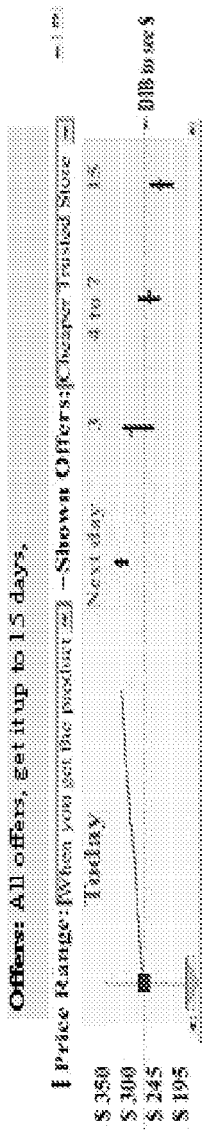
Figure 43:
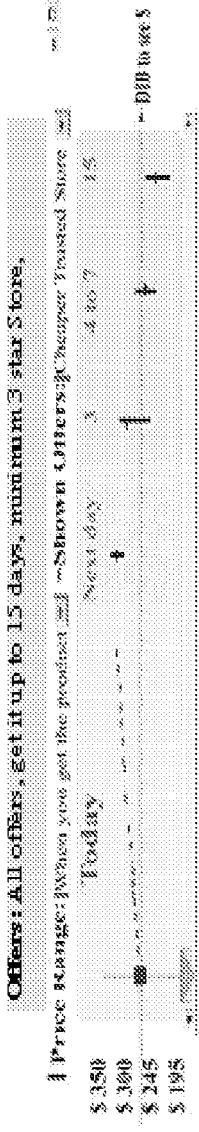
Figure 44:
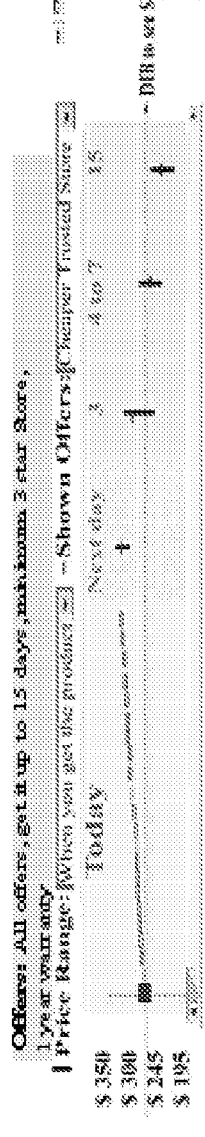
Figure 45:
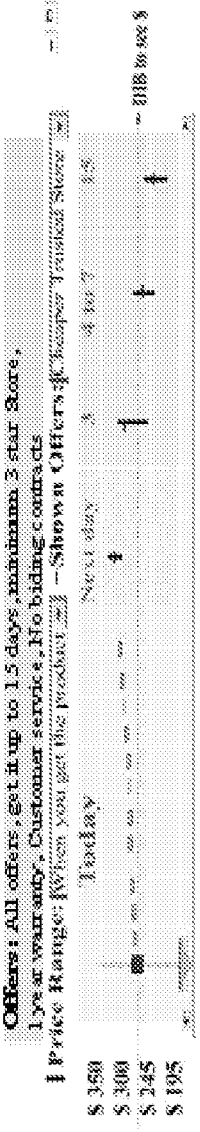

FIG. 41 to FIG. 45 illustrate examples screenshots of an example graphical interface showing that as a user selects offers features, the size of the squares (representing the offers) automatically adjusts to fit into its designated area, while keeping its respective position at the y-axis. FIG. 41 illustrates an example screenshot of an example graphical interface showing an offers panel displaying the variety of offers of a product (product not shown). At this particular example, the user haven't selected any offer feature, as show in the chosen-features section 2021. FIG. 42 follows the example shown on FIG. 41, illustrating a user selecting the offer feature "get it up to 15 days", so that offers related to 30 and 90 days were excluded. FIG. 43 follows the example shown on FIG. 42, illustrating a user selecting an additional offer feature, the "minimum 3 start stores", notice that a few offers were excluded, and the squares (representing the offers) at the Today section automatically increased their size to fit its designated space. FIG. 44 follows the example shown on FIG. 43, illustrating a user selecting an additional offer feature, the "1 year warranty", where a few offers were excluded and the remaining squares at the Today section automatically adjusted their size. FIG. 45 follows the example shown on FIG. 44, illustrating a user selecting two additional offer features, the "Customer service and No bid-ing contracts", where a few offers were excluded and the remaining squares at the Today section automatically adjusted their size.

Figure 46:
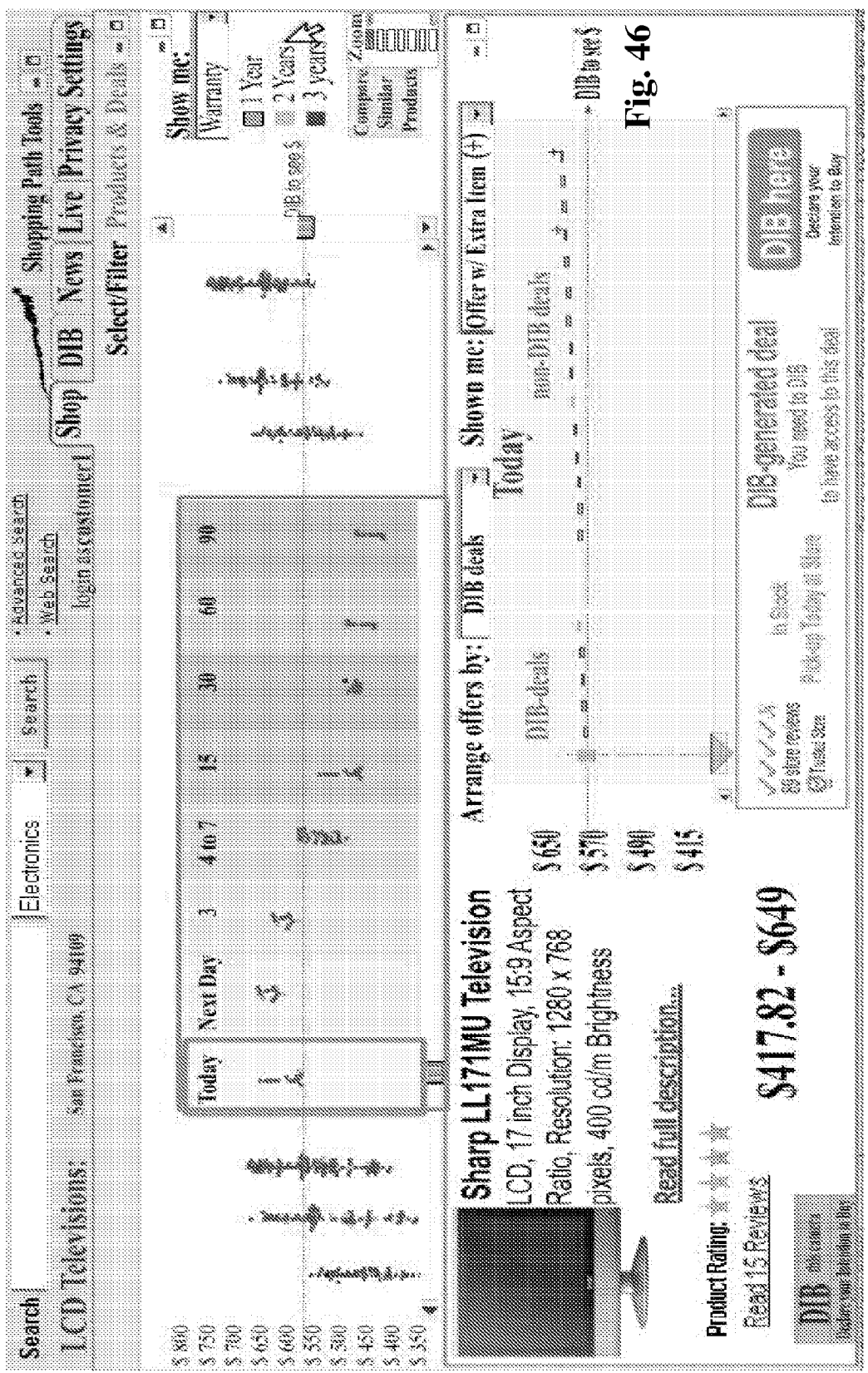
FIG. 46 illustrates an example screenshot of an example graphical interface showing the Shopping Path tool displaying (at the offers panel) an extra layer of categorization for one selected offer category according to specific embodiments of the invention.

FIG. 46 illustrates an example screenshot of an example graphical interface showing the shopping path tool displaying (at the offers panel) an extra layer of categorization for one selected offer category displayed at the shopping path panel. As the user applied a large zoom at the shopping path panel, the group of offers of the selected product divides into categories, wherein one offer category is selected. The offers panel then displays details of the selected offer category, being able to add an extra layer of categorization to display/describe the selected offer category. In this particular case, the shopping path panel is displaying groups of offers related to different delivery/pick-up dates for a Sharp LL171MU Television, where the Today offers category is selected. The offers panel then displays details of only the Today offers category, dividing the offers into DIB-related offers and Non-DIB (public) related offers.

Figure 47:
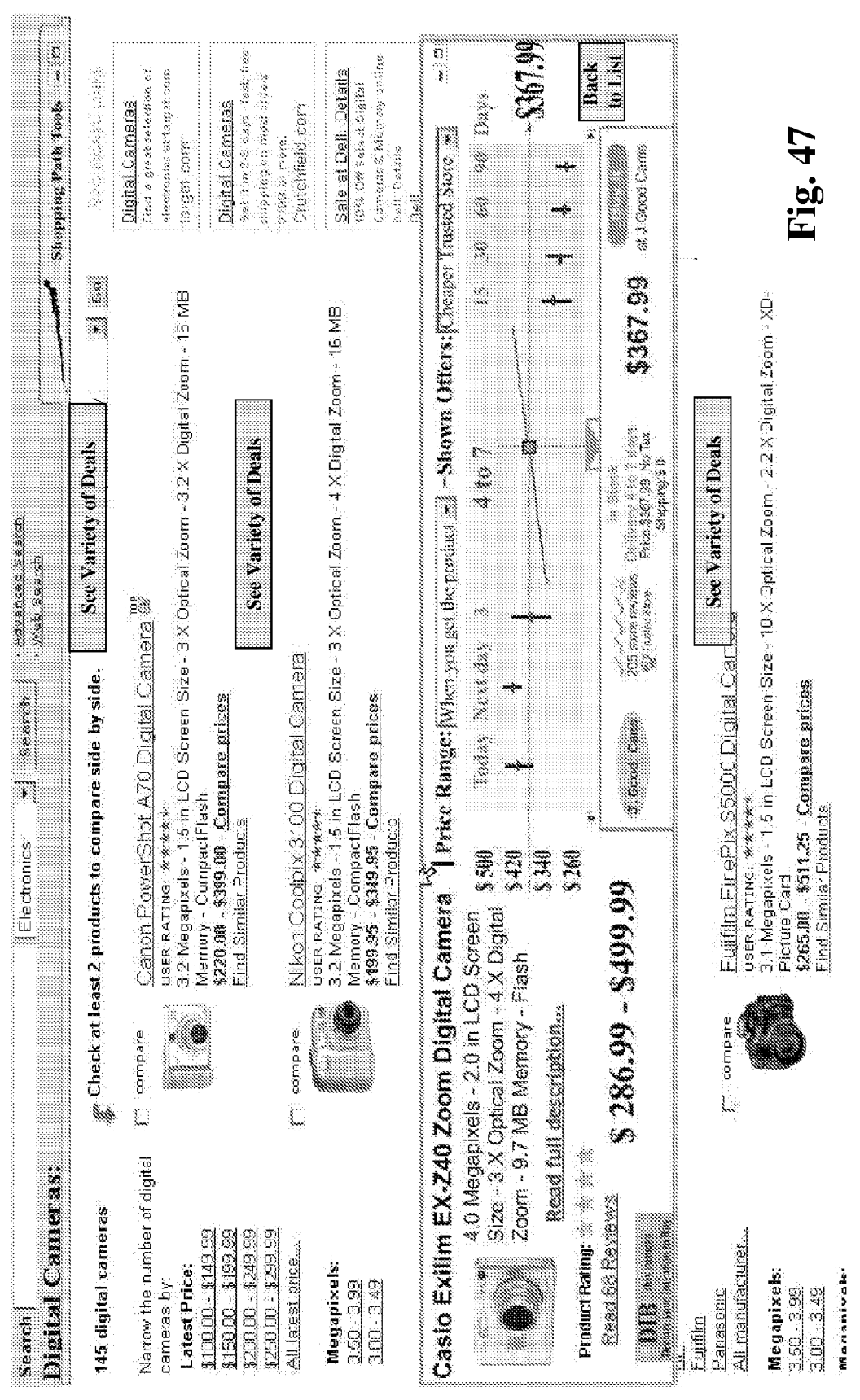

FIG. 47 illustrates an example screenshot of an example graphical interface showing an alternative embodiment where the networked hub added a "See Variety of Deal" button at each row of its list of products. When a user clicks the "See Variety of Deal" button a panel like the Product Panel opens up at the place where the product row was located, so the user can interact with it without open the shopping path tool. At another embodiment (not shown) the networked hub displays buttons or links related to the shopping path tool at each row of its list of product, so different shopping path panels can be opened at the place where the product row is located.

Figure 48:
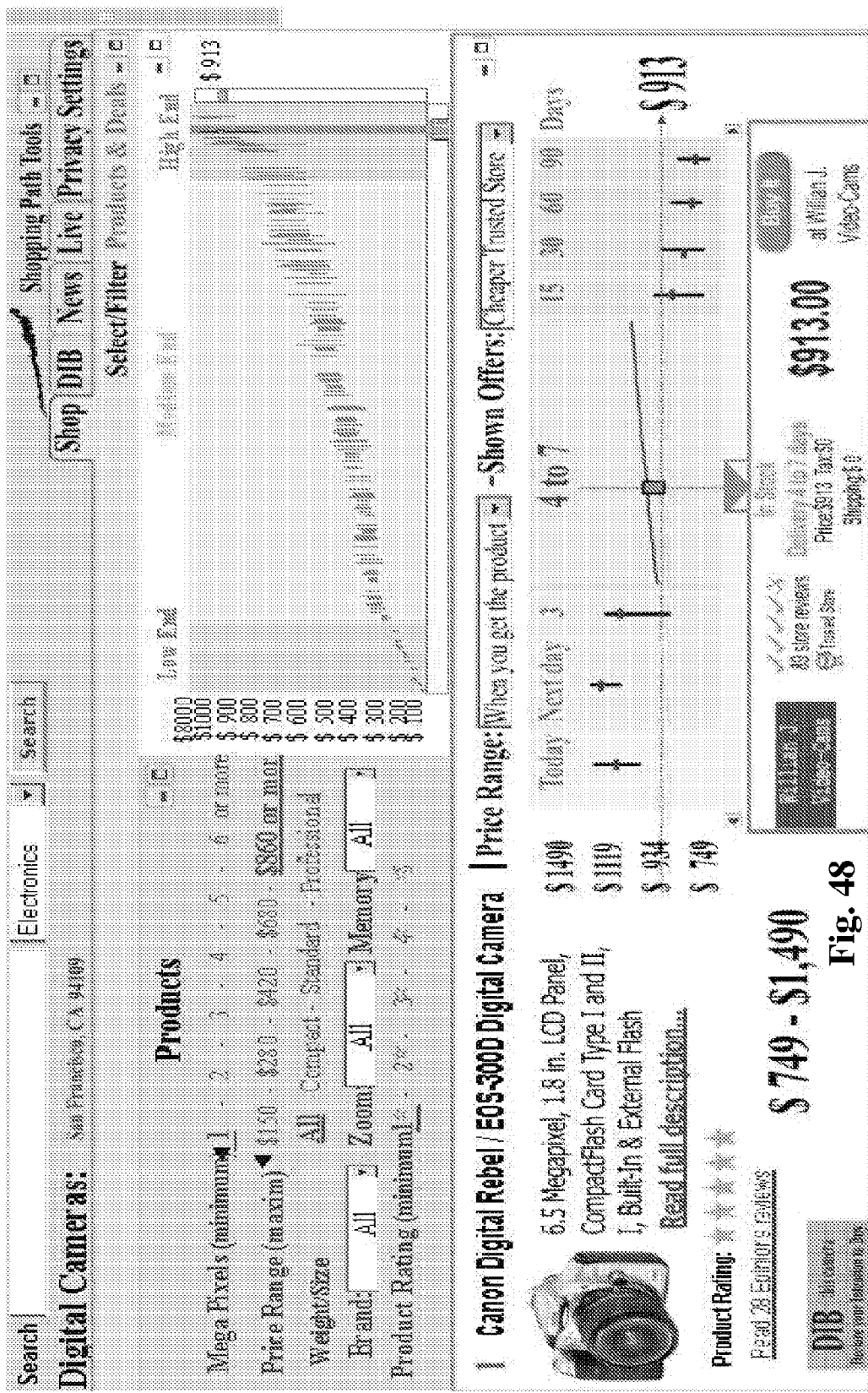
FIG. 48 illustrates an example screenshot of an example graphical interface showing that the color, size and the position of the shopping path tool panels are adjustable and can be customized by the user, according to specific embodiments of the invention.
Figures 48A, 48B:
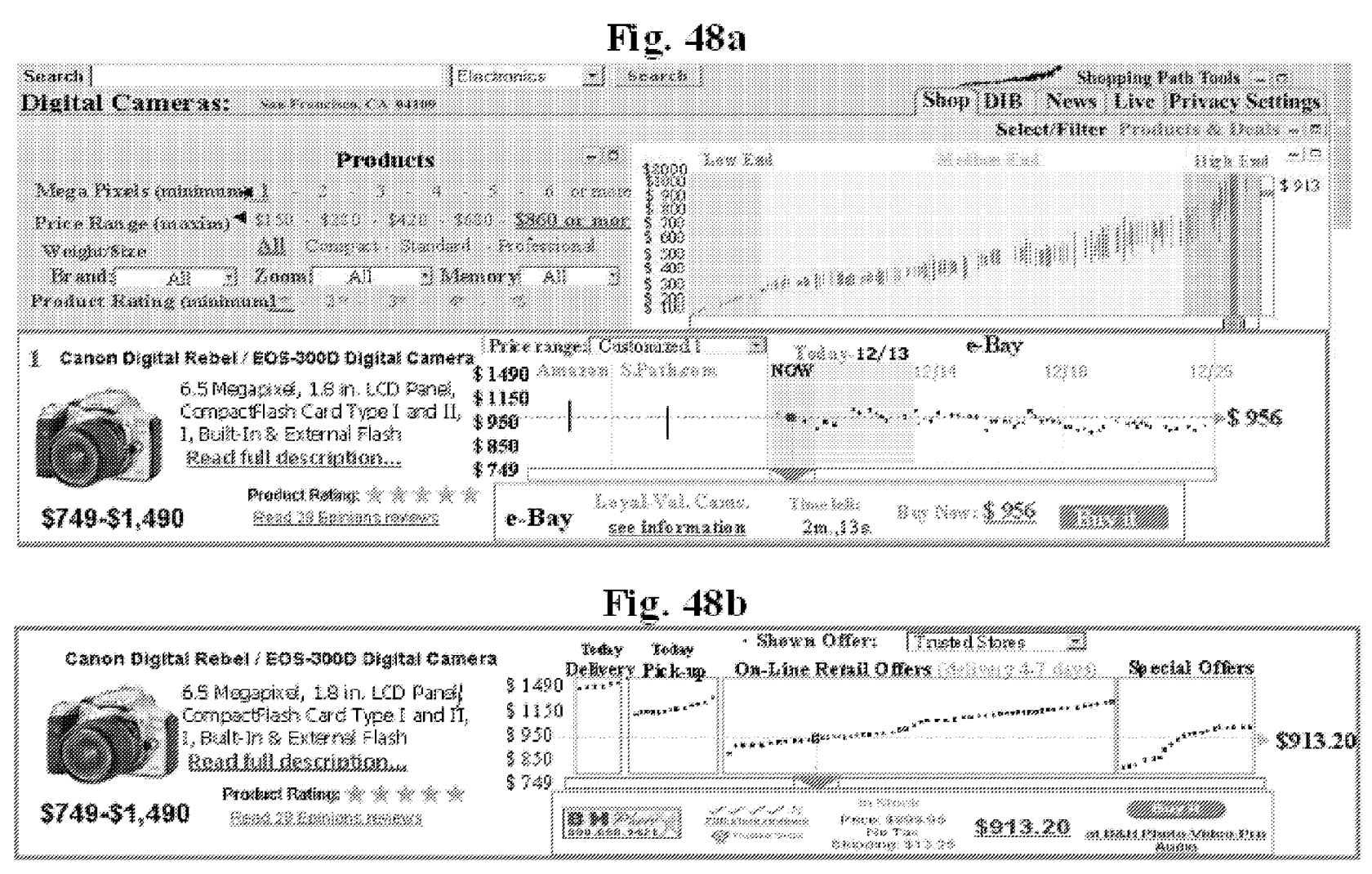
Figure 48F:
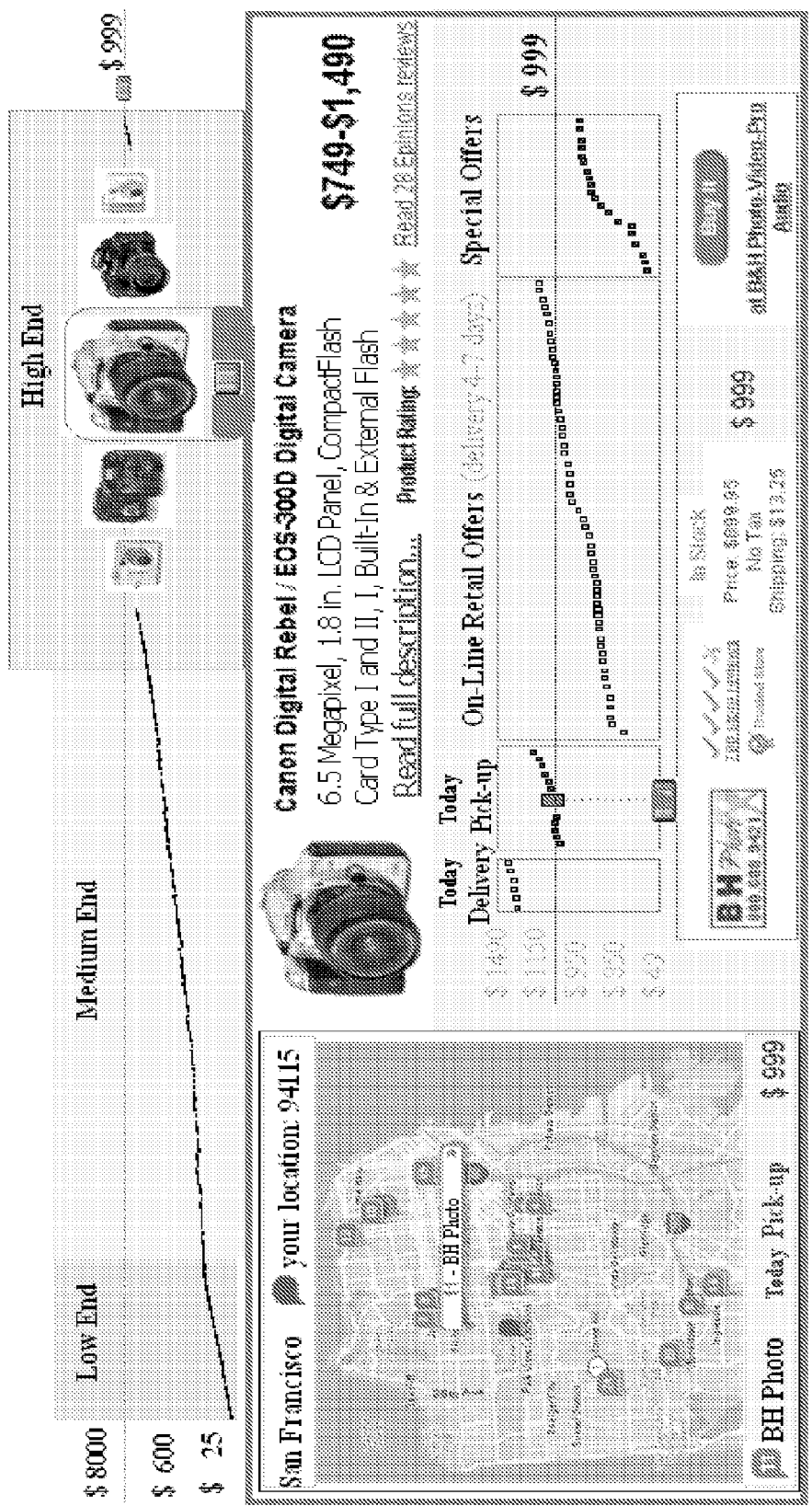
FIG. 48f follows the example shown on FIG. 48e, illustrating that the user determined that a map is displayed at the product panel, and that map indicates the location of the stores, which have today pick-up and delivery offers, according to specific embodiments of the invention.

FIG. 48 to FIG. 48f illustrate examples screenshots of an example graphical interface showing that the type of information and the format in which the information is displayed at the shopping path tool can be customized by the user. FIG. 48 illustrates an example screenshot of an example graphical interface showing that the color, size and the position of the shopping path tool panels are adjustable and can be customized by the user. In this particular case, the user decreased the size of the shopping path panel, added color to categorize its product end categories, and placed the product features section (of Select/Filter panel) at the side of the shopping path panel.

FIG. 48a illustrates an example screenshot of an example graphical interface showing adjustments and customizations made by the user. In this particular case, the user decreased the size of the shopping path panel, added color to categorize its product end categories, and placed the product features section (of Select/Filter panel) at the side of the shopping path panel. Notice that the user also customized the offers panel, determining that the offers from Amazon.com ShoppingPath-.com and eBay.com would be placed side-by-side. The e-Bay offers and bids are represented by squares; where the y-axis of each offer and bid represents its price. The x-axis represents the time-line at e-Bay, where the position of each offer or bid is determined by its future-time deadline (when the offers or bid expires); wherein present-time (now) is graphically static and future-time is graphically-dynamic, running backwards until it reaches present-time. FIG. 48b illustrates an example screenshot of an example graphical interface showing a customized offers panel, wherein the user determined that the offers belonging to different categories would be placed side-by-side (as squares not bars); and only the offers with today delivery, today pick-up, delivery 4-7 days and special offers would be displayed.

FIG. 48c illustrates an example screenshot of an example graphical interface showing that the user customized the Shopping Path panel, determining that small product pictures are placed above their respective product-bars; and the selected product-bars (and a defined number of product-bars close by the selected one) have their product-pictures magnified. Notice that in order to magnify the product-pictures above the selected product-bars, the space between the selected product-bars needs also to be enlarged. In this particular example, the selected product-bar has the most magnified product-picture, while the other two product-bars of each side have, respectively, their product-picture less magnified. As the user scrolls left or right the shopping path panel, selecting different product-bars, the space between the product-bars as well as the size of the product-pictures are dynamically rearranged.

FIG. 48d follows the example shown on FIG. 48c, illustrating that the user determined that the small product pictures are placed at the average price of their respective product-bars; and the selected product-bars (and the product-bars close by the selected one) have their product-pictures magnified above their respective product-bars.

FIG. 48e follows the example shown on FIG. 48d, illustrating that the user determined that no product-bars are displayed, and only small product pictures are displayed at their average price. The selected product-pictures (and the pictures close by the selected one) have their product-pictures magnified at the y-axis price position of their average price. Notice that in this particular example, the user no longer navigates price variations but product-pictures displayed at one price point such as its average price.

FIG. 48f follows the example shown on FIG. 48e, illustrating that the user determined that a map is displayed at the product panel, and that map indicates the location of the stores, which have today pick-up and delivery offers. As the user scrolls left or right the offers panel, selecting different offers (represented by squares), the position of the respective store is indicated at the map; conversely as the user selects a store at the map, its respective offer (s) is indicated at the offers panel and specific offers panel.

FIG. 49 to FIG. 55 show flow charts that represent one particular method describing processes for implementing a GUI such as shown in FIG. 13 to FIG. 48f. In one particular embodiment of this invention a networked hub website (such as e-retailers or price comparison engines) displays an interactive shopping tool (a Rich Internet Application that can be deployed in Java, Macromedia's Flash or AJAX) inserted at the HTML website's list of products. The Shopping Path Tool process 201, located at the DS/SP model-tool server 200 (of FIG. 12) collects at the DS/SP system modules 300 to 700 the required information to feed an interactive shopping path tool, sending to the computer of the user 1 (of FIG. 11) a Rich Internet Application (running in Macromedia's Flash) that graphically displays and interacts with said collected information. In another particular embodiment of this invention said interactive shopping tool (Rich Internet Application) runs as a Java applet or AJAX and not in Macromedia's Flash as it was cited above. The presented embodiment assumes that some requested information is already processed and stored at the modules databases ("ready" to be accessed), and some information will need to be processed on the fly by the modules 300 to 800, details of each modules processes is described below.

Figure 49:
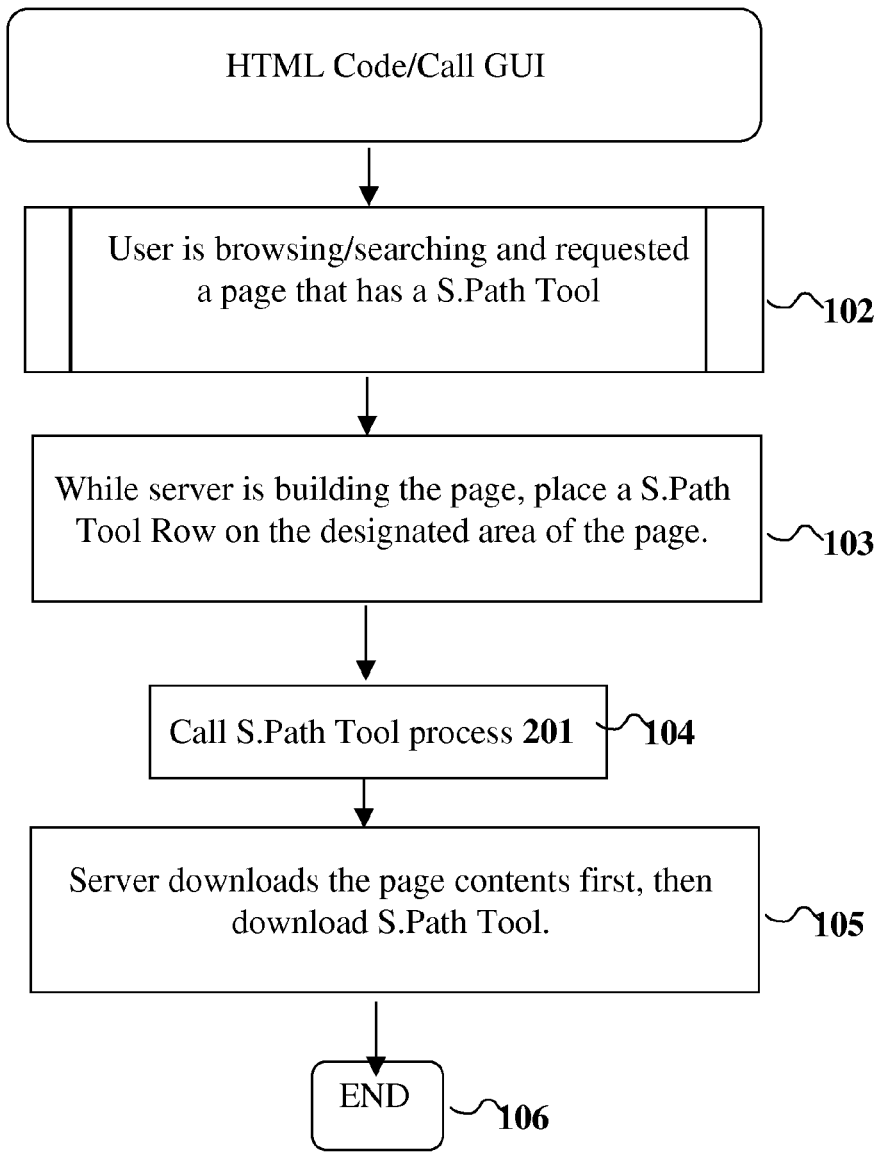
FIG. 49 to FIG. 52 show flow charts that represent one particular method describing processes (shown in FIG. 12) for implementing a GUI according to specific embodiments of the invention.

FIG. 49 is a flow chart describing the Html-code/Call-GUI process 100 implemented at the networked hub web-server 10, shown in FIG. 11. As illustrated in FIG. 49, the Html-code/Call-GUI process 100 is initiated during step 102 when a user, while is browsing/searching the pages of the networked hub website, requested a page that has a Shopping Path Tool. While the web-server 10 is building the requested page, it places a SP-tool row 2003 on the designated area of the page, during step 103. Thereafter, the web-server 10 calls Shopping Path tool 201 process, located at the DS/SP model-tool Server 200, requesting shopping path tool information related to a specific product category (like digital cameras), during step 104. Thereafter, the web-server 10 downloads the page contents first, and then downloads Shopping Path Tool, during step 105. Html-code/Call-GUI process 100 terminates during step 106.

Figure 50:
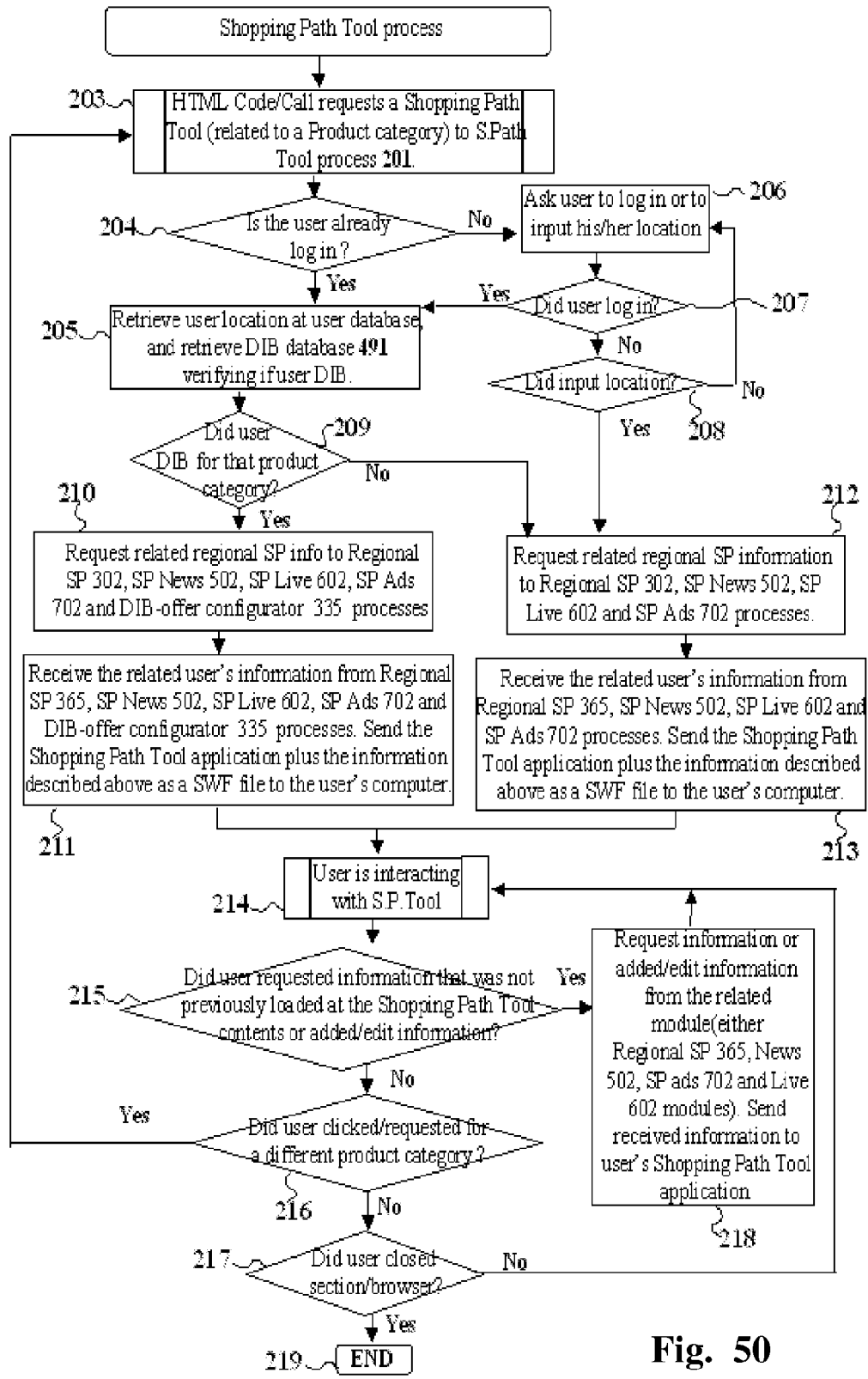

FIG. 50 is a flow chart describing the Shopping Path tool process 201, implemented at the DS/SP model-tool Server 200, shown in FIG. 12. As illustrated in FIG. 50, the Shopping Path tool process 201 is initiated during step 203 when Html-code/Call-GUI process 100 requests a Shopping Path Tool (with information of a certain Product category like digital cameras) to Shopping Path tool 201 process. A test is initially performed during step 204 to determine if the user is already log-in. if it is determined during step 204 that the user is already log-in, then DS/SP model-tool Server 200 retrieves user location at user database (not show) at the networked hub databases 13, and also retrieves DIB database 491 verifying if user DIB, during step 205. If it is determined at step 204 that the user is not log-in, the user is asked to log-in or input his or her location (like the zip-code), during step 206. Then a further test is performed at step 207, verifying if the user log-in. If the user log-in, DS/SP model-tool Server 200 proceed to step 205, retrieving user location at user database (not show) at the networked hub databases 13, and also retrieving DIB database 491 verifying if user DIB.

If it is determined at step 207 that the user didn't log-in, then a further test is performed at step 208, verifying if the user input his or her location (like the zip-code); if the user didn't input his or her location, the user is asked again to log-in or input his or her location, at step 206. If the user input his or her location, then DS/SP model-tool Server 200 requests the user's regional product shopping path information to Regional SP 302, SP-news 502, SP-Live 602, Private Settings 650 and SP-Ads 702 processes, at step 212. Thereafter DS/SP model-tool Server 200 received the related user's information from Regional SP 302, SP-news 502, SP-Live 602, Private Settings 650 and SP-Ads 702 processes, arranging this information according to Shopping Path Tool template, converting it into a macromedia flash's SWF file and sending it (the Shopping Path Tool application plus the requested information) to the user's computer, at step 213. Thereafter the user is interacting with the shopping path tool at the web-browser on his/hers computer, during step 214.

Proceeding step 205, a further test is performed at step 209, verifying if the user already DIB for that product category. If the user didn't DIB for that product category, DS/SP model-tool Server 200 proceeds as shown in step 212. If the user DIB for that product category, DS/SP model-tool Server 200 retrieves the user's DIB number (from DIB database 491) and then requests the use's regional product Shopping Path information to Regional SP 302, SP-news 502, SP-Live 602, DIB-offer configurator 335, SP Ads 702 and Private Settings 650, at step 210. Thereafter DS/SP model-tool Server 200 received the related user's information from Regional SP 302, SP-news 502, SP-Live 602, DIB-offer configurator 335, SP Ads 702 and Private Settings 650. Arranging this information according to Shopping Path Tool template, converting it into a macromedia flash's SWF file and sending it (the Shopping Path Tool application plus the requested information) to the user's computer, at step 211. Thereafter the user is interacting with the shopping path tool at the web-browser on his/hers computer, during step 214.

A further test is performed at step 215, verifying if the user requested information that was not previously loaded at the Shopping Path Tool contents or added/edit information. If the user requested new information or added/edit information, the DS/SP model-tool Server 200 requests information or added/edit information from the related software component (either Regional SP 302, SP-news 502, SP-Live 602, SP Ads 702 and Private Settings 650); sending the received information to the user computer's shopping path tool (browser-based application), at step 218. Thereafter the user is interacting with the shopping path tool at the web-browser on his/hers computer, during step 214. If the user didn't request additional information at step 215, a further test is performed at step 216, verifying if the user clicked/requested information about a different product category. If the user requested information about a different product category, DS/SP model-tool Server 200 starts the described process again, performing the process described at step 203. If the user didn't requested information about a different product category, DS/SP model-tool performs a further test, verifying if the user closed the browser, during step 217. If the user closed the browser, Shopping Path tool process 201 terminates during step 219. If the user didn't close the browser, the user keeps interacting with the shopping path tool at the web-browser on his/hers computer, during step 214.

In one particular embodiment of this invention the DS/SP model-tool Server 200 is a Java application server that has a Flex Presentation server, provided by Macromedia (www(.) macromedia(.)com), deployed on it. In this particular embodiment the application that executes the Shopping Path tool process 201 and the Marketing Shopping Path tool process 250, is a Flex application. The Flex Presentation server uses Java objects and WebServices to access data on remote systems. So in this particular embodiment the DS/SP model-tool Server 200 communicates with the others DS/SP system modules (300, 400, 500, 600 and 700) using Java objects and/or WebServices. In another particular embodiment of this invention the DS/SP model-tool Server 200 is a Java application server that has a open-Laszlos server, from Laszlos Inc. (www(.)laszlos(.)com) deployed on it. In this particular embodiment the application that executes the Shopping Path tool process 201 and the Marketing Shopping Path tool process 250 shown in FIG. 12, is an open-Laszlos application.

Figure 51:
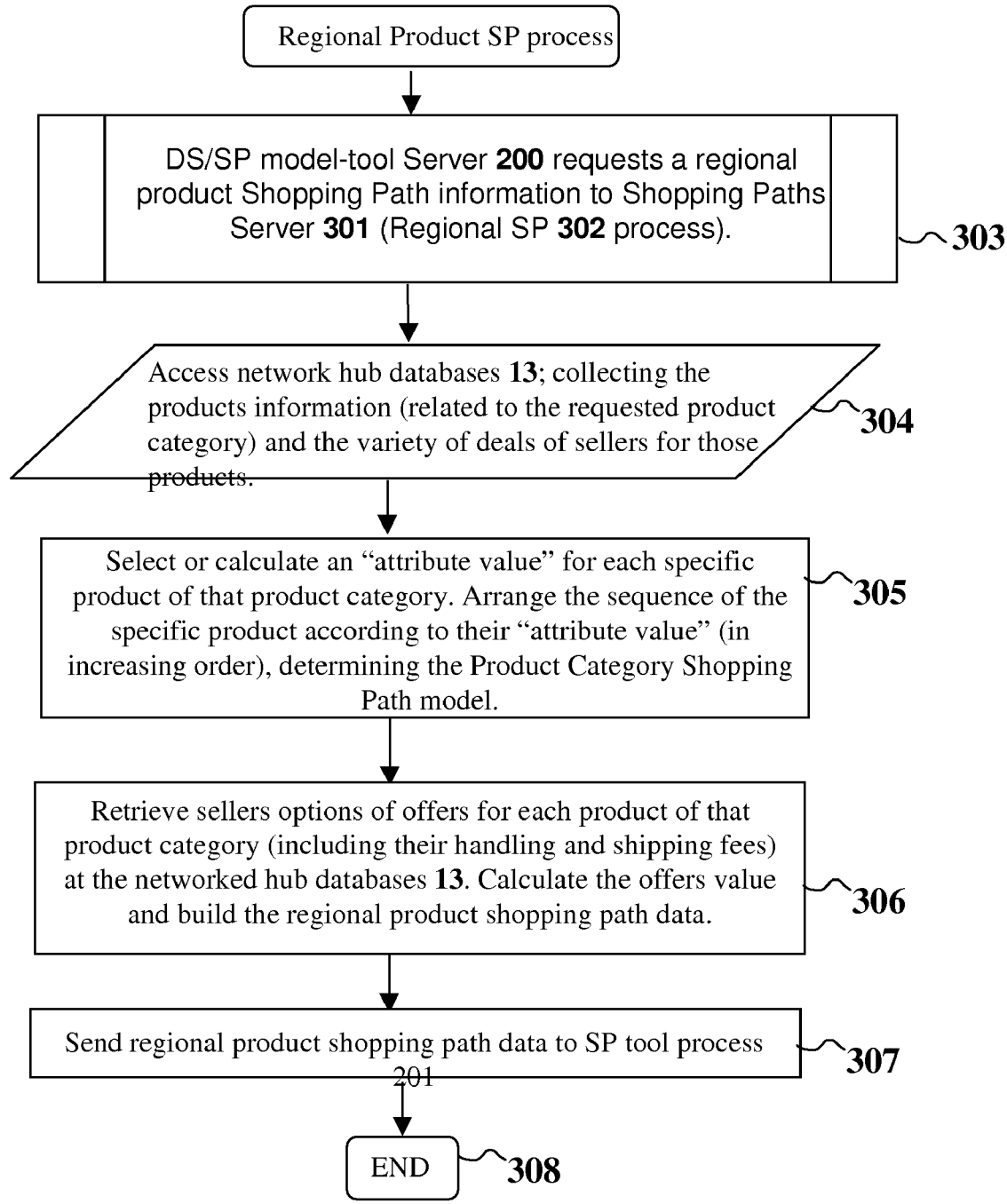

FIG. 51 is a flow chart describing the Regional-Product-SP process 302 implemented at the Shopping Paths server 301, shown in FIG. 12. As illustrated in FIG. 51, the Regional-Product-SP process 302 is initiated during step 303 when DS/SP model-tool Server 200 (shopping path tool process 201) requests a regional product Shopping Path information to Shopping Paths Server 312 (Regional SP 302 process). Thereafter, the Shopping Paths server 301 access, through the Networked hub's API 16 and the DS/SP's API 800, the network hub databases 13; selecting one product category (like digital cameras), and collecting products information of that product category, and the variety of deals of sellers for those products, during step 304. Thereafter, the Shopping Paths server 301 selects or calculates an "attribute value" for each specific product of that product category, during step 305. The attribute value of a specific product is the value used to arrange the product bars into the product shopping path pattern; by selecting or calculating an attribute value, it is easy to arrange the product bars at increasing or decreasing order. The networked hub determines this attribute value, which can be the result of several references of the offers price, such as the lowest price base for that product or the average price base. However it is recommended to use formulations or algorithms to define the attribute value, which reflect to whole configuration of offers-prices for the product, such as the mean price base of the standard deviation curve or a PERT price base value (Max.price+3most-probable-price+Min-.price/6) from all offers for that product. With the products' attribute-value defined, the Shopping Paths server 301 arranges the sequence of the specific product according to their "attribute value" (preferably in increasing order), determining the Product Category Shopping Path model. Thereafter, the Shopping Paths server 301 retrieves the sellers' options of offers for each product of that product category (including their handling and shipping fees) at the networked hub databases 13. Calculating the offers value (for each product of that product category) and building the regional product shopping path data, during step 306. Thereafter, the Shopping Paths server 301 sends the processed regional product shopping path data to Shopping Path tool 201 process, located at the DS/SP model-tool Server 200, during step 307. Regional-Product-SP process 302 terminates during step 308.

In another particular embodiment of this invention Shopping Paths server 301 builds in advance/up-dates (using the process described at steps 304 to 307 from Regional-Product-SP process 302) a selected number of regional product shopping paths (the most requested ones, for example), storing the data at a repository database (not show on FIG. 11). At this embodiment when the DS/SP model-tool Server 200 requests a regional product Shopping Path information (on step 303), and Shopping Paths server 301 would retrieve the repository database if the requested regional product shopping path data is available there; and if it is not available, the Shopping Paths server 301 would built it (proceeding with step 304).

Figure 52:
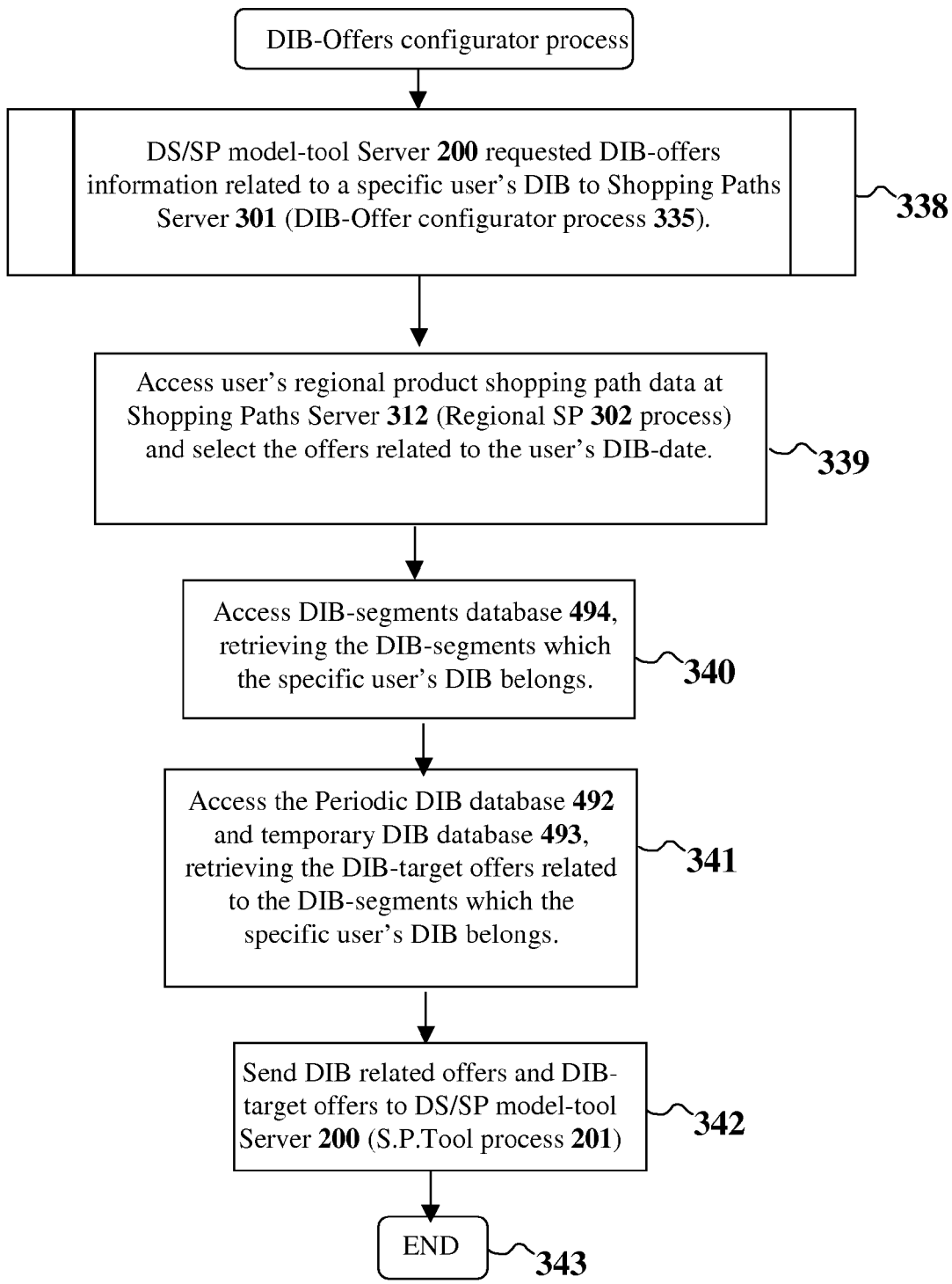

FIG. 52 is a flow chart describing the DIB-Offers configuration process 335 implemented at the Shopping Paths server 301, shown in FIG. 12. As illustrated in FIG. 52, the DIB-Offers configurator process 335 is initiated during step 338 when DS/SP model-tool Server 200 requested DIB-offers information related to a specific user's DIB to Shopping Paths Server 301 (DIB-Offer configurator process 335). Thereafter receiving the request, Shopping Paths server 301 access user's regional product shopping path data, which has been processed by the Regional SP 302 process, selecting the related offers according to the user's preferable DIB-date, during step 339. This process of selecting the offers related to the user's DIB-date, works by taking the preferable date of pick-up/delivery of the user's DIB, and selecting the available offers with the same or approximate DIB pick-up/delivery date. For example, if the users DIB (on the date of Aug. 20, 2005) and his preferable date of delivery is on Aug. 28, 2005, then the DIB-offers configurator determines which pre-defined offers from sellers fit the DIB-date, selecting the DIB related offers; in this particular case, the DIB-offers configurator would probably select the offers' prices with 4 to 7 delivery days as the offers that fit (relate) the user's DIB date.

Thereafter, Shopping Paths server 301 accesses the DIB-segments database 494, retrieving the list of DIB-segments, which the specific user's DIB belongs, during step 340. Thereafter, Shopping Paths server 301 accesses the Periodic DIB database 492 and temporary DIB database 493, retrieving the DIB-target offers related to the list of DIB-segments, which the specific user's DIB belongs, during step 341. Thereafter, Shopping Paths server 301 sends the selected DIB related offers and the DIB -target offers data to DS/SP model-tool Server 200 (shopping path tool process 201), during step 342. DIB-Offers configuration process 335 terminates during step 343.

In another embodiment of the present invention, consumers have the ability to DIB for customized products (determining their desirable customized product features as part of their DIBs). At this embodiment, sellers define rules for product configuration (different prices for different features and services) at the DIB-configurator section (shown of FIG. 75), and these rules are stored at a product configuration database (not shown at the DIB-process module 400 of FIG. 12). At this embodiment, the DIB-Offers configuration process 335, would execute the customized product configuration at step 341, particularly, while the Shopping Paths server 301 accesses the Periodic DIB database 492 and temporary DIB database 492 (to access the regional and DIB-target offers), the Shopping Paths server 301 would also access the product configuration database (not shown at the DIB-process module 400 of FIG. 12), configuring a customized product according to consumer's defined DIB product features, and defining a customized product DIB-offer. And at step 342, Shopping Paths server 301 would send the DIB related Offers and the DIB-target offers (including the customized product DIB-offers) to DS/SP model-tool Server 200 (S.P.Tool process 201). DIB-Offers configuration process 335 would terminate during step 343.

News And Reports

The product shopping path pattern as well as the shopping path tool GUI can support product-offers news/reports services, either at static mediums such as newspapers and magazines, or at animated mediums such as TV, computers (at internet) and mobile devices. According to one embodiment of this invention, the product shopping path pattern and the shopping path tool GUI support product-offers news/reports services provided by networked hubs on the Internet.

In another embodiment of this invention, networked hubs on the Internet use real people and/or animated host avatars to describe the product & offers news/reports mentioned above. In one particular embodiment of this invention, the Vhost Enterprise software, from Oddcast Inc. (www(.)oddcast(.) com) provided the animated host avatar technology. In this mentioned embodiment, the avatar-news builder process 550, implemented at the SP News Server 501, is supported by Oddcast's technology. In another embodiment of this invention, the product & offers news/reports service mentioned above is provided as a component of the shopping path tool (which is displayed at a networked hub website). The figures described bellow illustrates an example graphical interface and presents a particular method to implement this product & offers news/reports service.

Figure 53A:
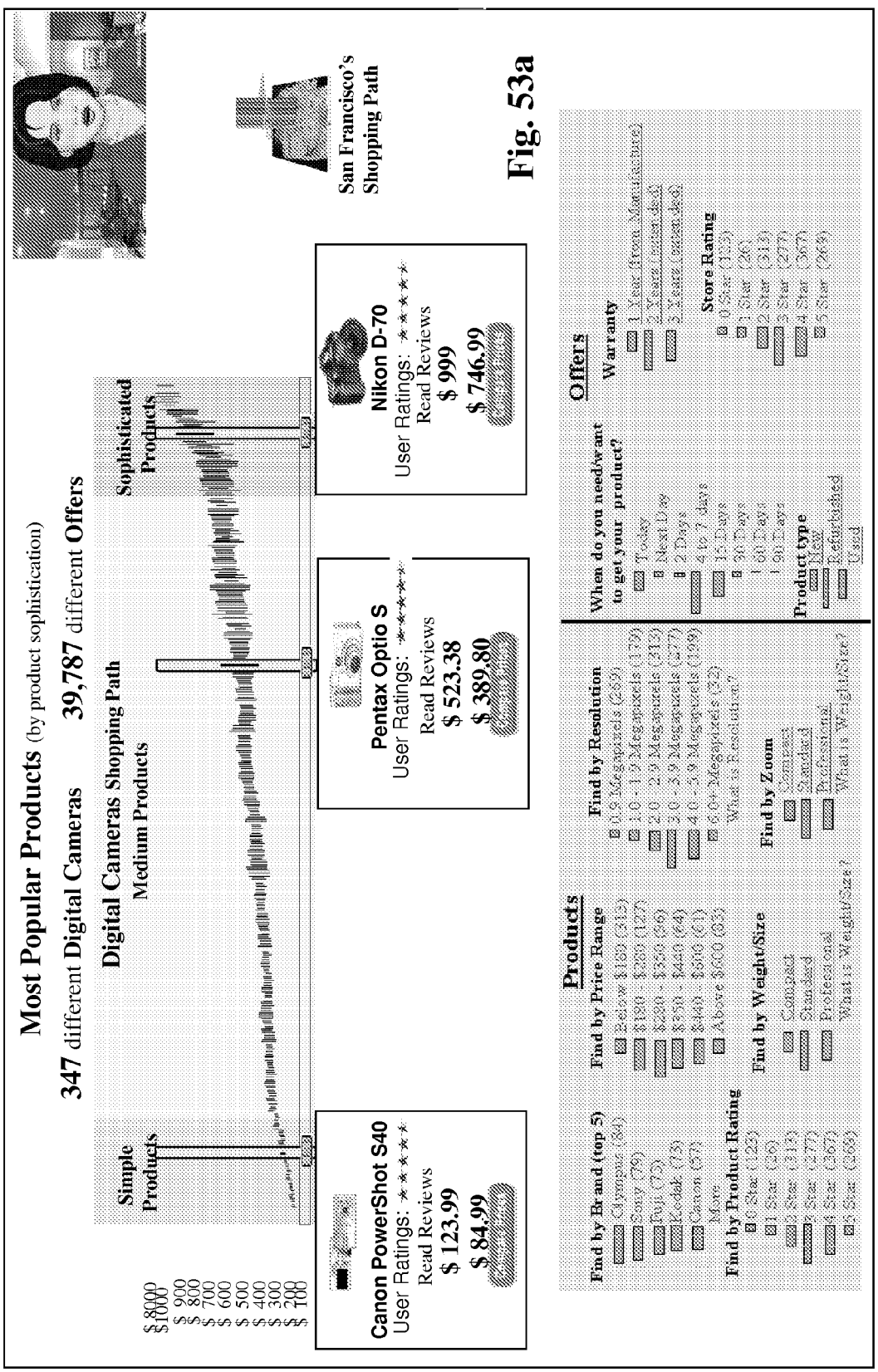
FIG. 53a and FIG. 53b illustrate examples screenshots of example graphical interfaces showing a product news/report being described by an animated host avatar according to specific embodiments of the invention.
Figure 53B:
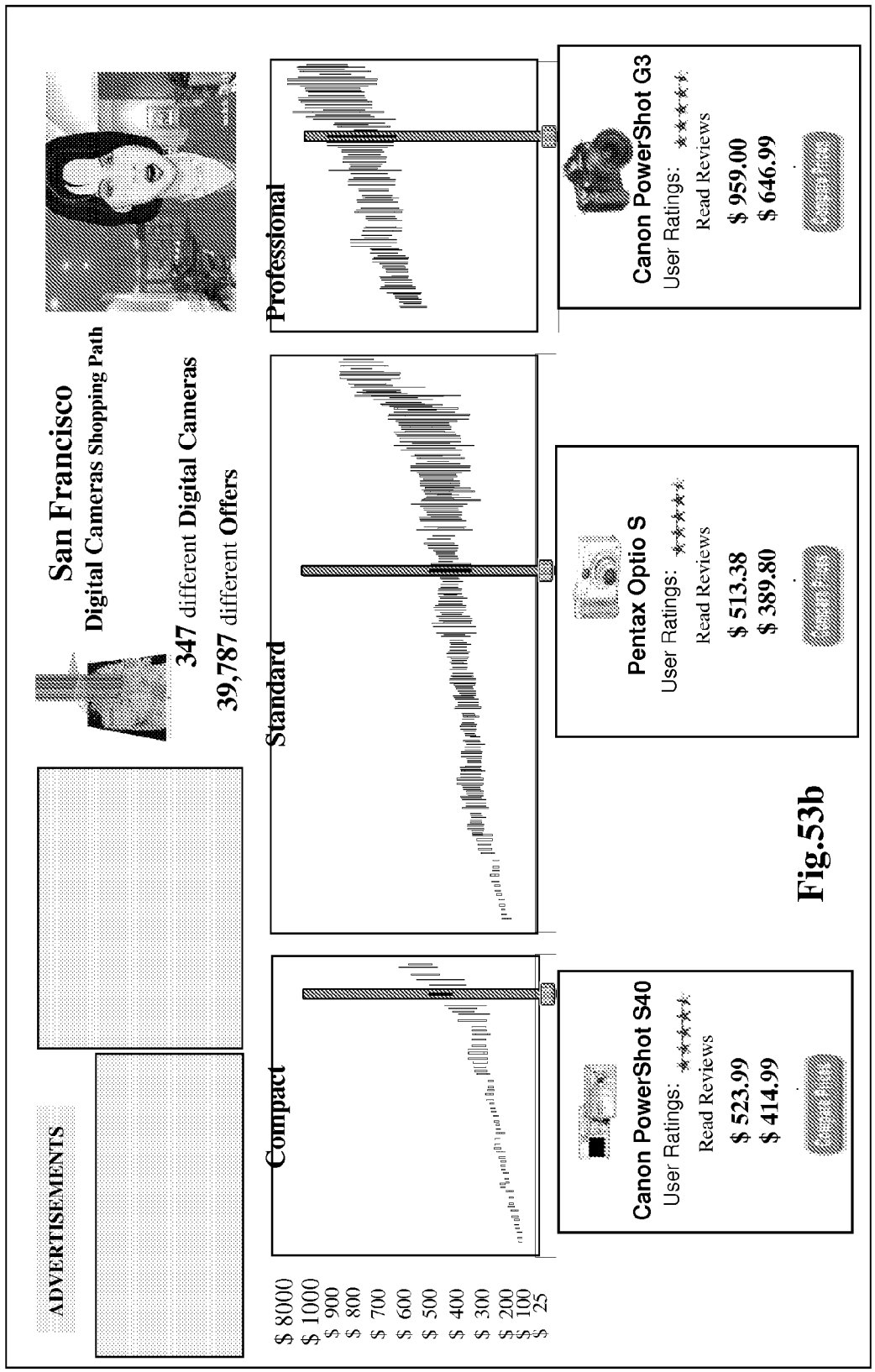

FIG. 53a and FIG. 53b illustrate examples screenshots of example graphical interfaces showing a product news/report being described by an animated host avatar. At FIG. 53a the example screenshot of the product news/report highlights the position of the most popular products among simple, medium and sophisticated product categories of digital cameras. The example screenshot also displays a panel showing the popularity-rank of products and offers features, where the length of the bars in front of the products and offers features illustrates their comparative popularity level. An animated model of the San Francisco Shopping Path is displayed below the host avatar. FIG. 53b illustrates an example screenshot of an example graphical interface showing a product news/report being described by an animated host avatar. The example screenshot of the product news/report highlights and briefly describes the most popular products among the compacts, standard and professional size categories of digital cameras.

Figure 54:
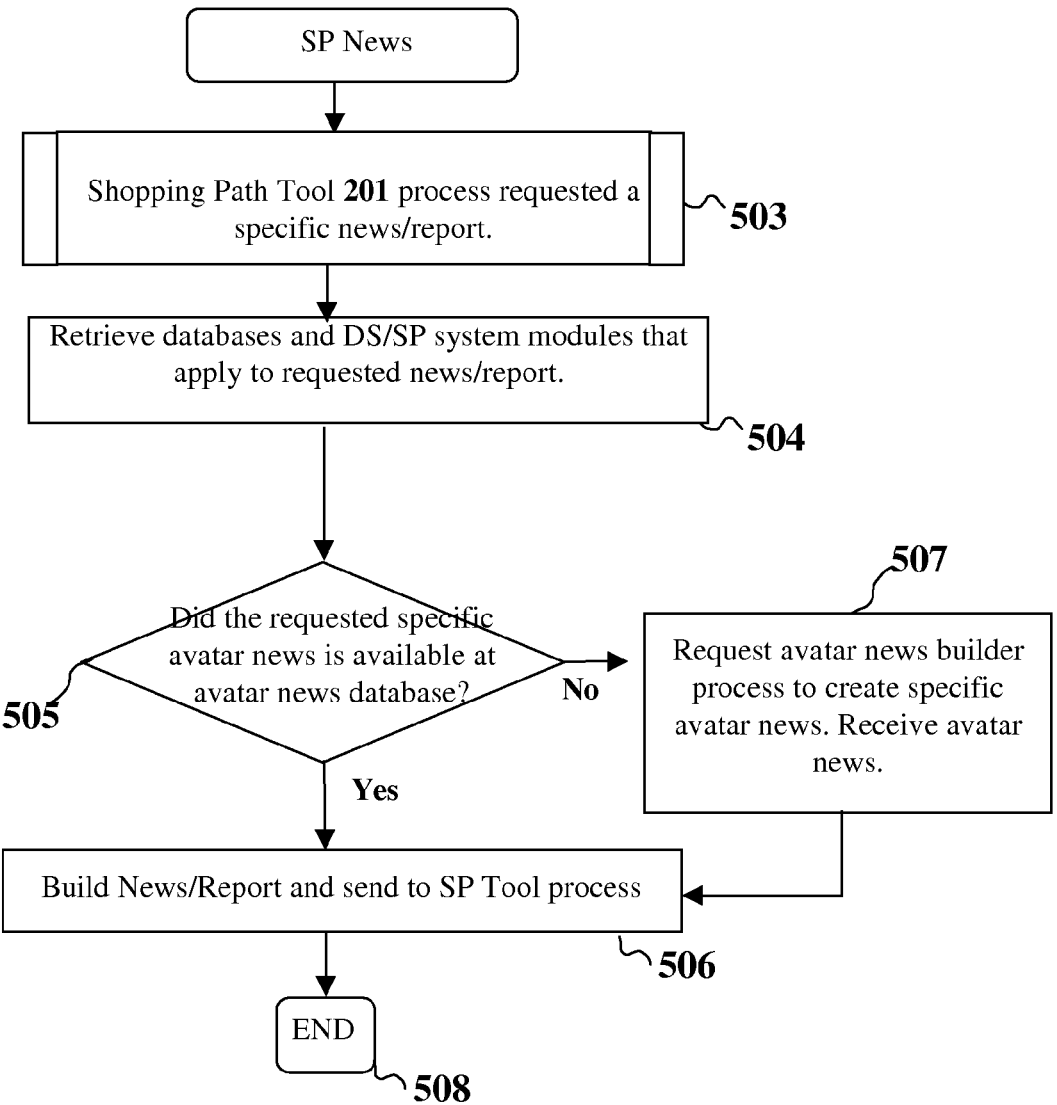
FIG. 54 to FIG. 55 show flow charts that represent one particular method describing processes (shown in FIG. 12) for implementing a GUI according to specific embodiments of the invention.

FIG. 54 is a flow chart describing the SP-News process 502, implemented at the SP News Server 501, shown in FIG. 12. As illustrated in FIG. 54, the SP-News process 502 is initiated during step 503 when Shopping Path Tool process 201 requested a specific news/report. Thereafter SP News Server 501 accesses the networked hub databases 13 and DS/SP system modules that apply to the requested news/report, retrieving the required data, during step 504. An initial test is performed at step 505 verifying if the requested specific avatar news (say the animation with video and sound) is available at avatar news database.

If the specific avatar news is available at avatar news database, SP News Server 501 builds (say format the page of) the specific News/Report and sends it to SP Tool process 201, during step 506. After SP Tool process 201 receives the specific News/Report, SP-News process 502 terminates at step 508. If the specific avatar news is not available at avatar news database, SP News Server 501 will request to avatar news builder process 550 to create the specific avatar news, during step 507.

After receiving the specific avatar news, the SP News Server 501 builds the specific News/Report and sends it to SP Tool process 201, during step 506. After SP Tool process 201 receives the specific News/Report, SP-News process 502 terminates at step 508.

Figure 55:
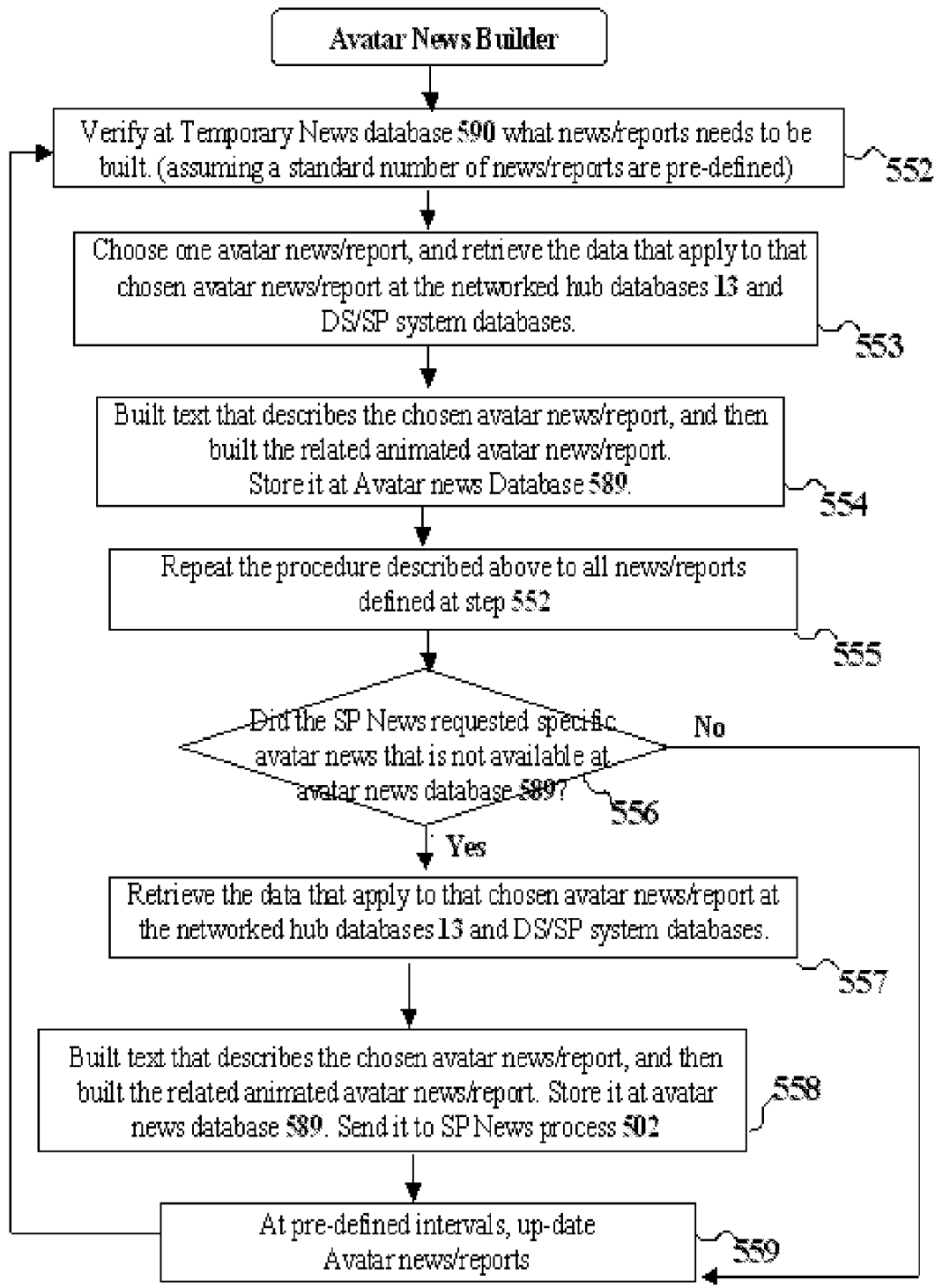

FIG. 55 is a flow chart describing the Avatar-news builder process 550, implemented at the SP News Server 501, shown in FIG. 12. As illustrated in FIG. 55, the Avatar-news builder process 550 is initiated during step 552 when SP News Server 501 verifies at Temporary News database 590 what news/reports needs to be built (assuming a standard number of news/reports are predefined). Thereafter SP News Server 501 chooses one avatar news/report, and retrieve the data that apply to that chosen avatar news/report at the networked hub databases 13 and DS/SP system databases, during step 553. Thereafter SP News Server 501 builds the text that describes the chosen avatar news/report, and then built the related animated avatar news/report (say the animation with video and sound). Storing it at Avatar News Database 589, during step 554. Thereafter, during step 555, SP News Server 501 repeats the procedure described above (steps 553 and 554) to all news/reports defined at step 552. An initial test is performed at step 556, verifying if the SP News process 502 requested specific avatar news that is not available at Avatar News Database 589. If the SP News process 502 didn't request a specific avatar news that is not available at Avatar News Database 589, then during step 559, the SP News Server 501 will up-date the avatar news/reports, at pre-defined intervals, going back to step 552. If it was determined at step 556 that the SP News process 502 requested a specific avatar news that is not available at Avatar News Database 589, then SP News Server 501 retrieves the data that apply to that chosen avatar news/report at the networked hub databases 13 and DS/SP system databases, during step 557. Thereafter News Server 501 builds the text that describes the chosen avatar news/report, and then builds the related animated avatar news/report (say the animation with video and sound). Storing it at Avatar News Database 589, and sending it to SP News process 502, during step 558. Thereafter, during step 559, SP News Server 501 will up-date the avatar news/reports, at predefined intervals, going back to step 552.

In one embodiment of this invention, the user can select the type of information presented at the product & offers news/reports service, for example the user could choose from different categories of products and offers, different regions and different ranking measures (like popularity, sales, DIBs, etc.).

Live

When a user is searching for products and offers at e-commerce website or price comparison engine, in theory, the user's shopping process can be graphically modeled by an user-avatar navigating at a regional shopping path model (as shown on FIG. 7a to FIG. 7e). Even the whole traffic (users' shopping processes) of an e-commerce website or price comparison engine can be, in theory, graphically represented by users-avatars navigating regional shopping paths at a DS/SP model. The DS/SP model and the regional shopping paths, in theory, can function as a multi-user 3-D virtual space, where as users-avatars navigate the structures of the DS/SP model (the regional product shopping paths), they automatically perform their shopping process.

In one embodiment of the present invention, a networked hub allows users to see their position at the regional shopping paths, while they perform their shopping processes either browsing lists of products and offers or by using the shopping path tool. In another embodiment of the present invention, a networked hub's determines that its regional shopping paths models (such as the San Francisco Shopping Path) are public spaces, and the users' navigation on them are, by default, invisible, anonymous and inaccessible. At this embodiment, users have privacy controls that allow them to change their status, for example, to visible, with open identity and accessible to communicate with other users. In another embodiment of the present invention, the networked hub determines that the bottom of the regional shopping paths (of the DS Map) corresponds to chat spaces, so that groups of avatars can meet and communicate at this chat spaces. In one particular embodiment of the present invention, the shopping path tool (displayed at a networked hub's website) has a Live-section graphical interface model, which is illustrated at FIG. 56.

Figure 56:
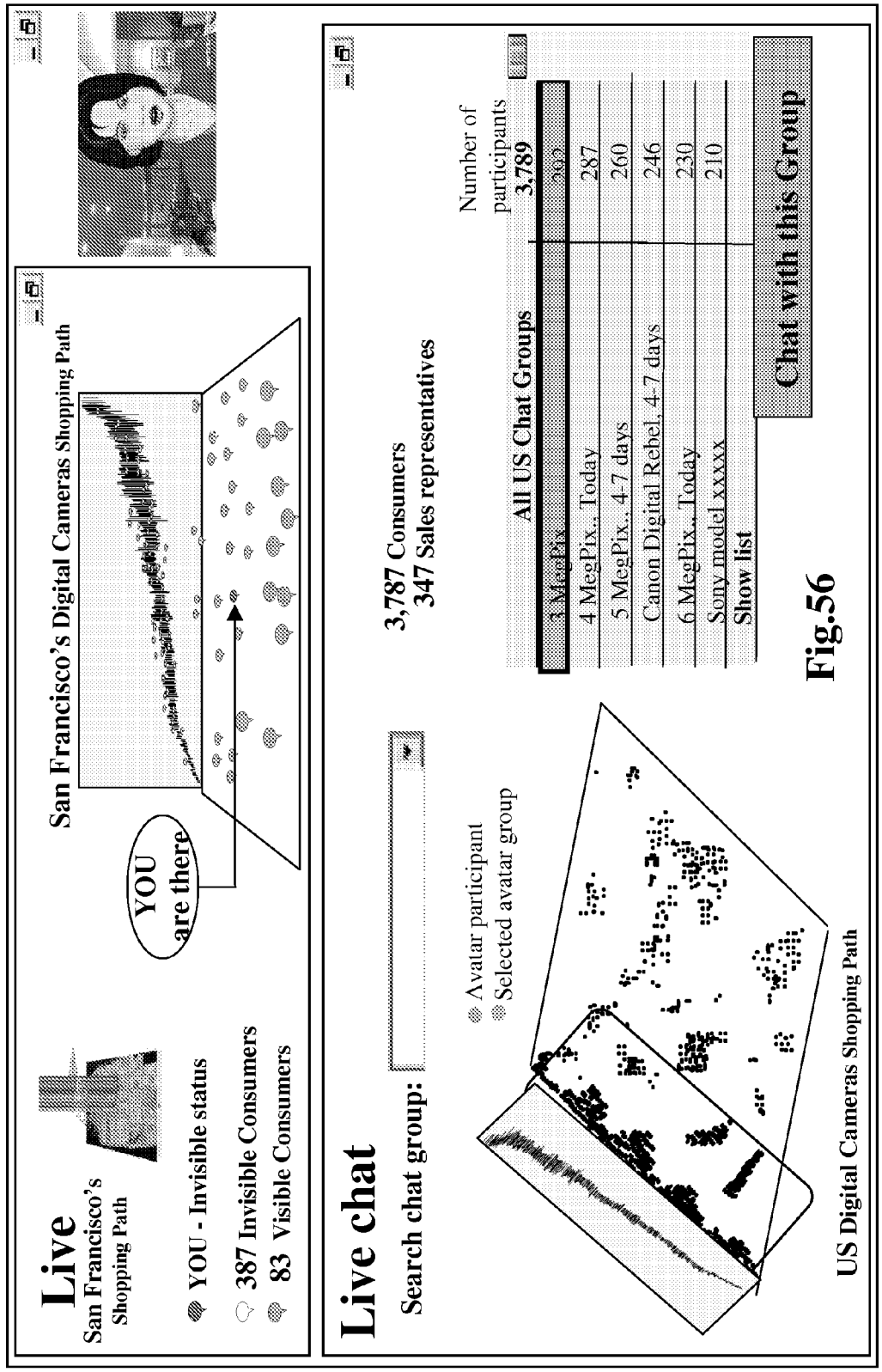
FIG. 56 illustrates an example screenshot of an example graphical interface showing the position of one user-avatar among several other users-avatars at the San Francisco digital cameras shopping path, as well as the participants of the Live-chat at the US digital cameras shopping path, both being described by an animated host avatar according to specific embodiments of the invention.

FIG. 56 illustrates an example screenshot of an example graphical interface showing the position of one user-avatar among several other users-avatars at the San Francisco digital cameras shopping path, as well as the participants of the Live-chat at the US digital cameras shopping path, both being described by an animated host avatar. The host avatar located at the right-top section of the example screenshot is describing the flow of user-avatars at the San Francisco digital cameras shopping path, and the current chat-groups at the Live-chat space (at the US digital cameras shopping path). The Live section of the screenshot shows with an arrow (at YOU are there) the actual position of the user-avatar at the San Francisco digital cameras shopping path, while the user is using the shopping path tool. Notice that the even though the user can see the position of his or her avatar, the avatar is invisible (by default), to other user's avatars, until the user change its status to visible. The Live section of the screenshot is depicting 83 animated avatar-users, which means that 83 users are proceeding at their shopping process (with visible status), while 387 other avatars proceed at their shopping processes, by default, with invisible status.

The Live-chat section of the screenshot is showing that 3,787 consumers and 347 sales representatives are participating at several chat groups. As the user scroll-down the list of chat groups, the chat group that is highlighted at the list is also highlighted at the graph. At this particular case, the screenshot illustrates that the user selected the chat group discussing about 3 mega-pixels digital cameras, highlighting the position of the group at the floor of the US digital cameras shopping path. If the user wants to participate at this chat group (about 3 mega-pixels digital cameras), he or she would need to click at the button "Chat with this group", then the chat application would appear either at the current page or as a pop-up page.

Figure 57:
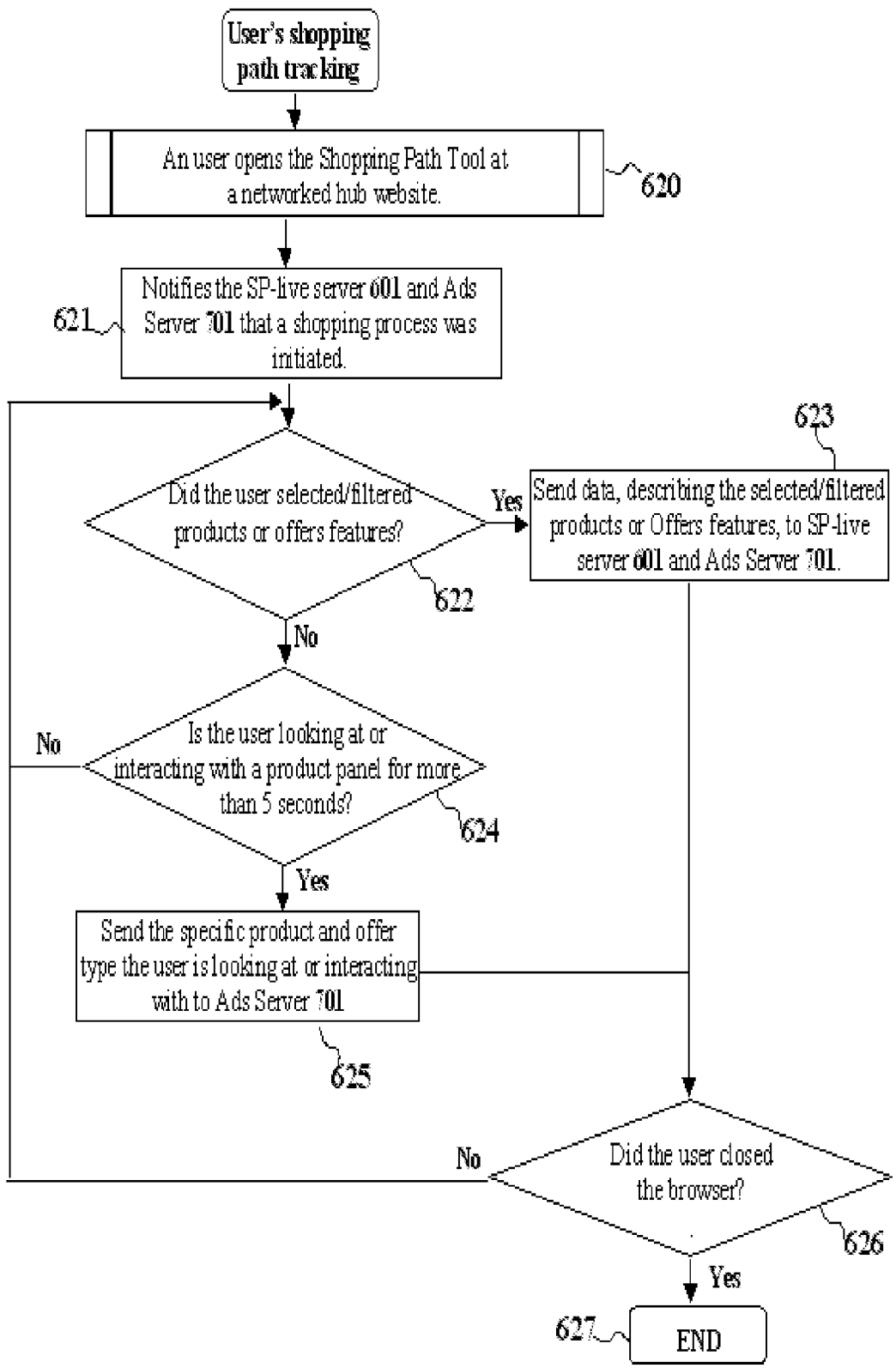
FIG. 57 is a flow chart describing the user's shopping path tracking process (not shown at FIG. 11 and 12), performed by the web-application (like a flash application) at the computer 1 of the user, shown in FIG. 11, according to specific embodiments of the invention.

FIG. 57 is a flow chart describing the user's shopping path tracking process (not shown at FIG. 11 and 12), performed by the web-application (like a flash application) at the computer 1 of the user, shown in FIG. 11. As illustrated in FIG. 57, shopping path tracking process has a pre-condition shown in step 620, where an user opens the Shopping Path Tool at a networked hub website. Thereafter the web-application, at the computer 1 of the user, notifies the SP-live server 601 and Ads Server 701 that a shopping process was initiated, during step 621.

An initial test is performed during step 622, verifying if the user selected/filtered products or offers features. If user selected/filtered products or offers features, then web-application, at the computer 1 of the user, sends data, describing the selected/filtered products or offers features, to SP-live server 601 and Ads Server 701, during step 623. Thereafter a further test is performed during step 626, verifying if the user closed the browser. If the user didn't close the browser, then the process goes back to step 622. If the user closed the browser, then user's shopping path tracking process terminates at step 627. If at step 622 it was determined that user didn't select/filter any product or offer feature, then the web-application, at the computer 1 of the user, verifies if the user is looking at or interacting with a product panel for more than 5 seconds during step 624. If the user is not looking at or interacting with a product panel for more than 5 seconds, then the process go back to step 622. If the user is looking at or interacting with a product panel for more than 5 seconds, then the web-application, at the computer 1 of the user, sends data describing the specific product and offer type the user is looking at or interacting with to Ads Server 701, during step 625. Thereafter a further test is performed during step 626, verifying if the user closed the browser. If the user didn't close the browser, then the process goes back to step 622. If the user closed the browser, then user's shopping path tracking process terminates at step 627.

Figure 58:
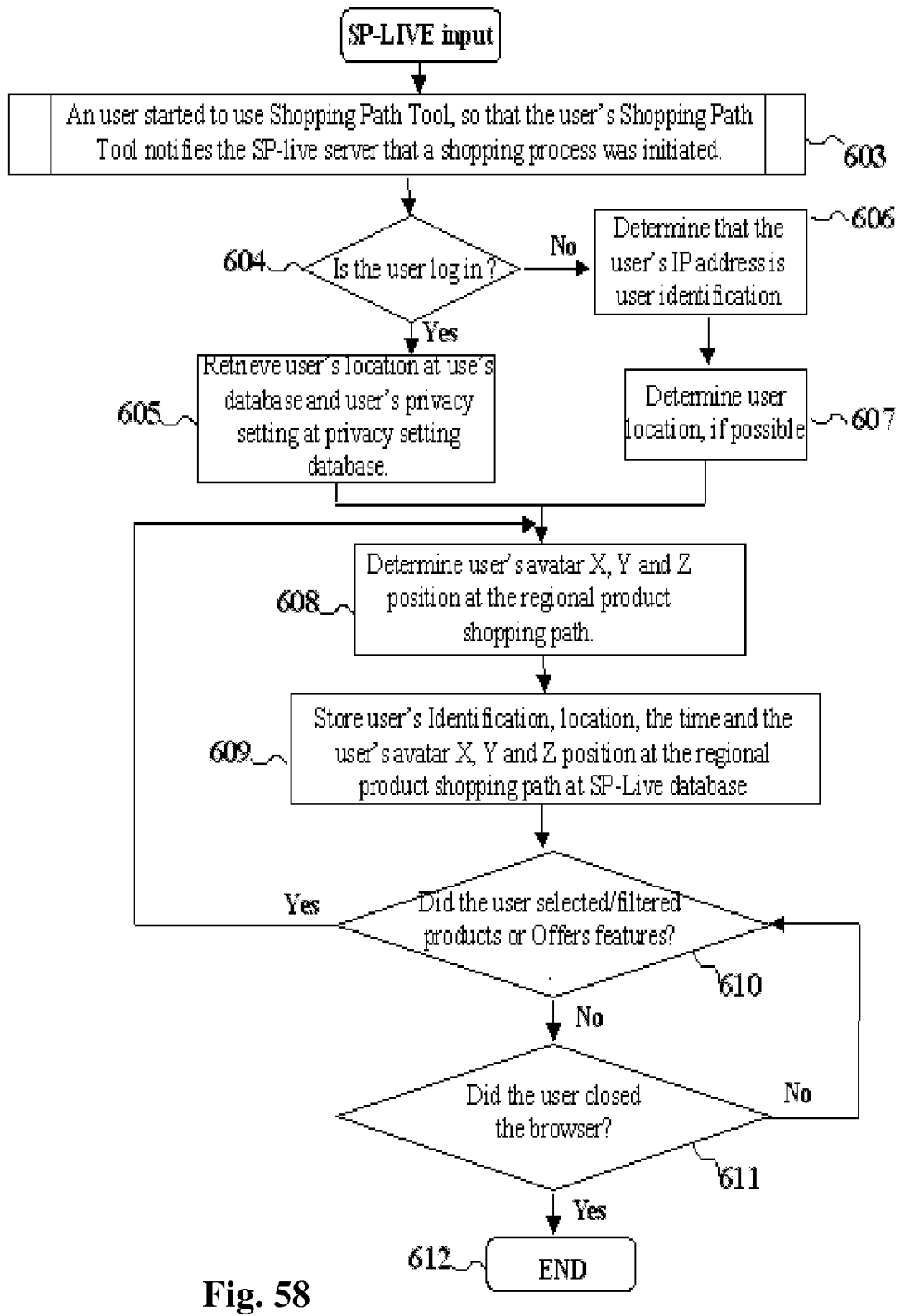
FIG. 58 is a flow chart describing the SP-Life input process 602, implemented at the SP-Live server 601, shown in FIG. 12, according to specific embodiments of the invention.

FIG. 58 is a flow chart describing the SP-Life input process 602, implemented at the SP-Live server 601, shown in FIG. 12. As illustrated in FIG. 58, SP-Life input process 619 has a precondition shown in step 603, where an user started to use his or hers Shopping Path Tool (web-application), so that the user's Shopping Path Tool notifies the SP-live server 601 that a shopping process was initiated. Thereafter the SP-Live server 601, performs an initial test during step 604, verifying if the user is log-in. If the user is not log-in SP-Live server 601 determines that the user's IP address is the user's identification, during step 606. Thereafter SP-Live server 601 determines the user location, if possible, during step 607. Thereafter, during step 608, SP-Live server 601 determines the user's avatar X, Y and Z position at a regional product shopping path (as illustrated at FIG. 7a to FIG. 7e).

If during step 604, it was verified that the user was log-in, then during step 605, SP-Live server 601 retrieves the user's location at use's database (not shown at FIG. 11 and 12) and user's privacy setting at privacy setting database 690. Thereafter, during step 608, SP-Live server 601 determines the user's avatar X, Y and Z position at a regional product shopping path (as illustrated at FIG. 7a to FIG. 7e). Thereafter SP-Live server 601 stores the user's identification, location, time and what product/offers features the user is looking at SP-Live database 685, during step 609. A further test is performed, during step 610, verifying if the user selected/filtered products/offers features or changed product category, during step 610. If the user selected/filtered products/offers features or changed product category, then the SP-Live server 601 goes back to step 608 determining the new user-avatar X, Y and Z position at a regional product shopping path, and proceeding to step 609, as shown on FIG. 58. If it was verified at step 610, that the user didn't selected/filtered products/offers features or changed product category, then SP-Live server 601 further performs a test, during step 611, verifying if the user closed the browser. If the user didn't close the browser, then the process goes back to step 610. If the user closed the browser, then SP-Life input process 602 terminates at step 612. Process 602 assumes that once the user closes the browser (end the process is terminated), SP-Live database 685 is up dated as the user avatar disappeared from the regional product shopping path.

Figure 59:
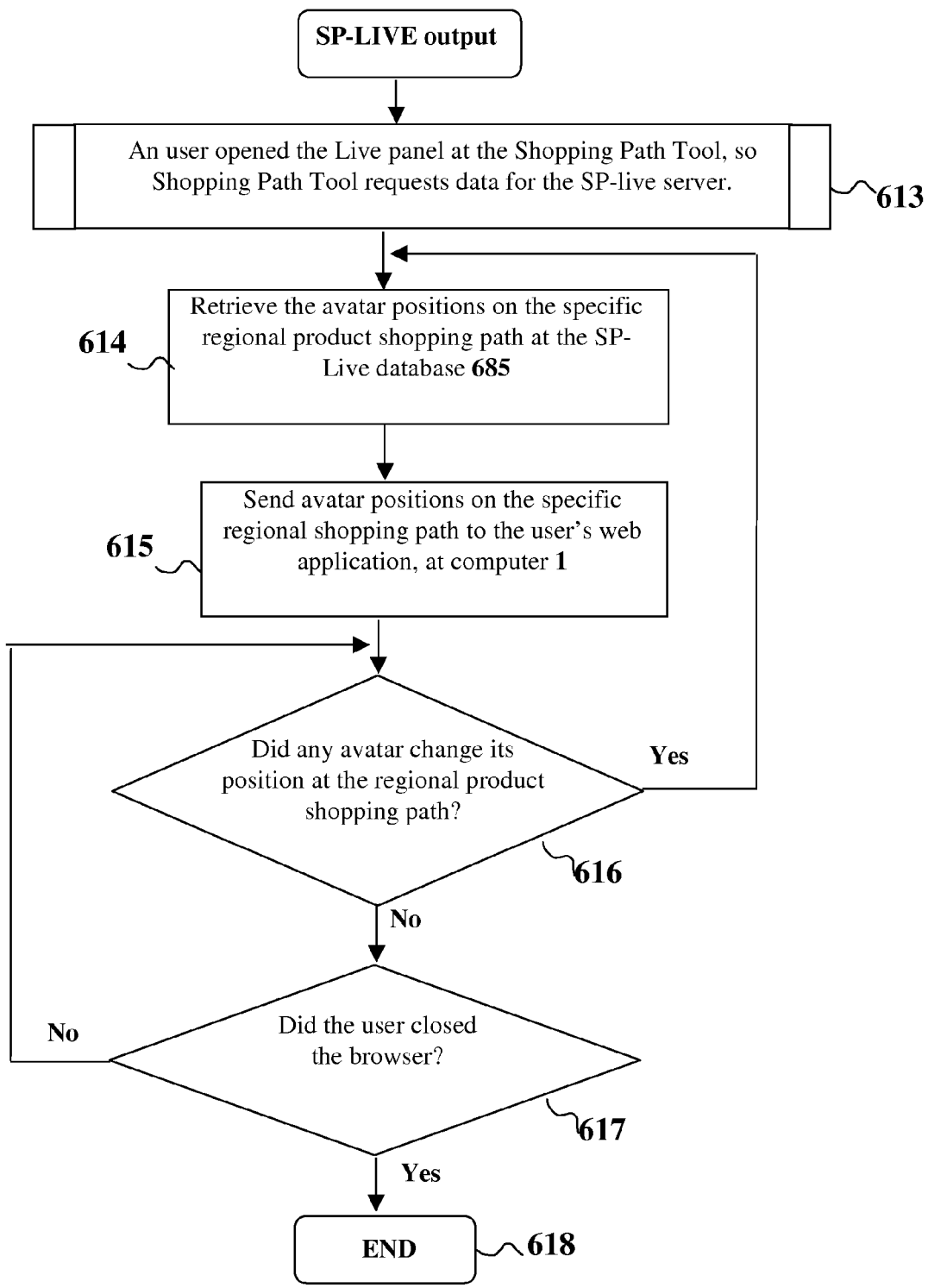
FIG. 59 is a flow chart describing the SP-Life output process 619, implemented at the SP-Live server 601, shown in FIG. 12, according to specific embodiments of the invention.

FIG. 59 is a flow chart describing the SP-Life output process 619, implemented at the SP-Live server 601, shown in FIG. 12. As illustrated in FIG. 59, SP-Life output process 619 has a pre-condition shown in step 613, where an user opened the Live panel at the Shopping Path Tool (web-application), so Shopping Path Tool requests data for the SP-live server 601. Thereafter SP-Live server 601 retrieves the avatars positions on the specific regional product shopping path at the SP-Live database 685, during step 614. Thereafter SP-Live server 601 sends the avatars positions on the specific regional shopping path to the user's web application at computer 1, during step 615. An initial test is performed at step 616, verifying if any user-avatar changed its position at the regional product shopping path. If no user-avatar changed its position at the regional product shopping path, then a further test is performed at step 617, verifying if the user closed the browser. If the user didn't close the browser, then the process goes back to step 616. If the user closed the browser, then the SP-Life output process 619 terminates at step 612. If, at step 616, it was verified that at least one user-avatar changed its position at the regional product shopping path, then the process goes back to step 614.

Figure 60:
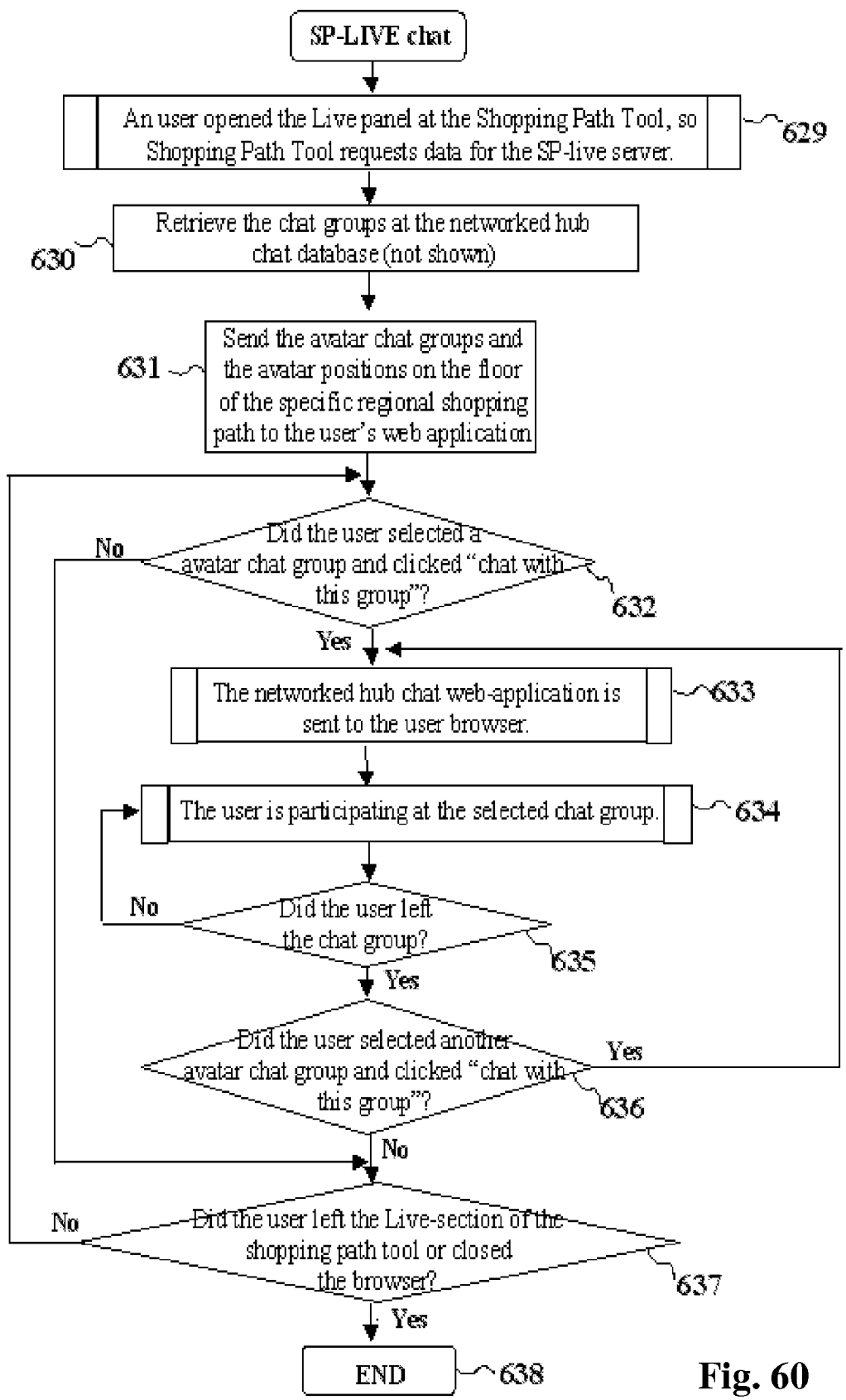
FIG. 60 is a flow chart describing the SP-Chat process 628, implemented at the SP-Live server 601, shown in FIG. 12, according to specific embodiments of the invention.

FIG. 60 is a flow chart describing the SP-Chat process 628, implemented at the SP-Live server 601, shown in FIG. 12. As illustrated in FIG. 60, SP-Chat process 628 has a pre-condition shown in step 629, where an user opened the Live panel at the Shopping Path Tool, so user's web-application (Shopping Path Tool) requests data for the SP-live server 601. Thereafter SP-Live server 601 retrieves the chat groups at the networked hub chat database (not shown at FIGS. 11 and 12), during step 630. At one particular embodiment of the invention, the DS/SP system utilizes an existing chat application and database from the networked hub, to run the SP-Live chat groups. Thereafter SP-Live server 601 sends the avatar chat groups and the avatar positions (on the floor of the specific regional shopping path) to the user's web application at computer 1, during step 631. An initial test is performed at step 632, verifying if the user selected an avatar chat group and clicked "chat with this group". If the user selected an avatar chat group and clicked "chat with this group", then the networked hub chat web-application is sent to the user browser, during step 633. Thereafter, during step 634, the user is participating at the selected chat group. A further test is performed at step 635, verifying if any avatar left the chat. If the user didn't left the chat group, then the process goes back step 634. If it was verified at step 635 that the user left the chat group, then a further test is performed at step 636, verifying if user selected another avatar chat group and clicked "chat with this group" button. If the user selected another avatar chat group, then the process goes back to step 633 (where the networked hub chat web-application is sent to the user browser). If it was verified at step 636 that user didn't select another avatar chat group, then a further test is performed at step 637, verifying if the user left the Live-section of the shopping path tool or closed the browser. If the user didn't leave the Live-section of the shopping path tool or closed the browser, then the process goes back to step 632. If the user left the Live-section or closed the browser, then the SP-Chat process 628 terminates at step 638. If, at step 632, it was verified that the user didn't select an avatar chat group and click at the "chat with this group" button, then the process goes further to step 637. If at any step of process the user leaves the LIVE-section or closes the browser then the SP-Chat process 628 is terminated.

Privacy Settings

Figure 61:
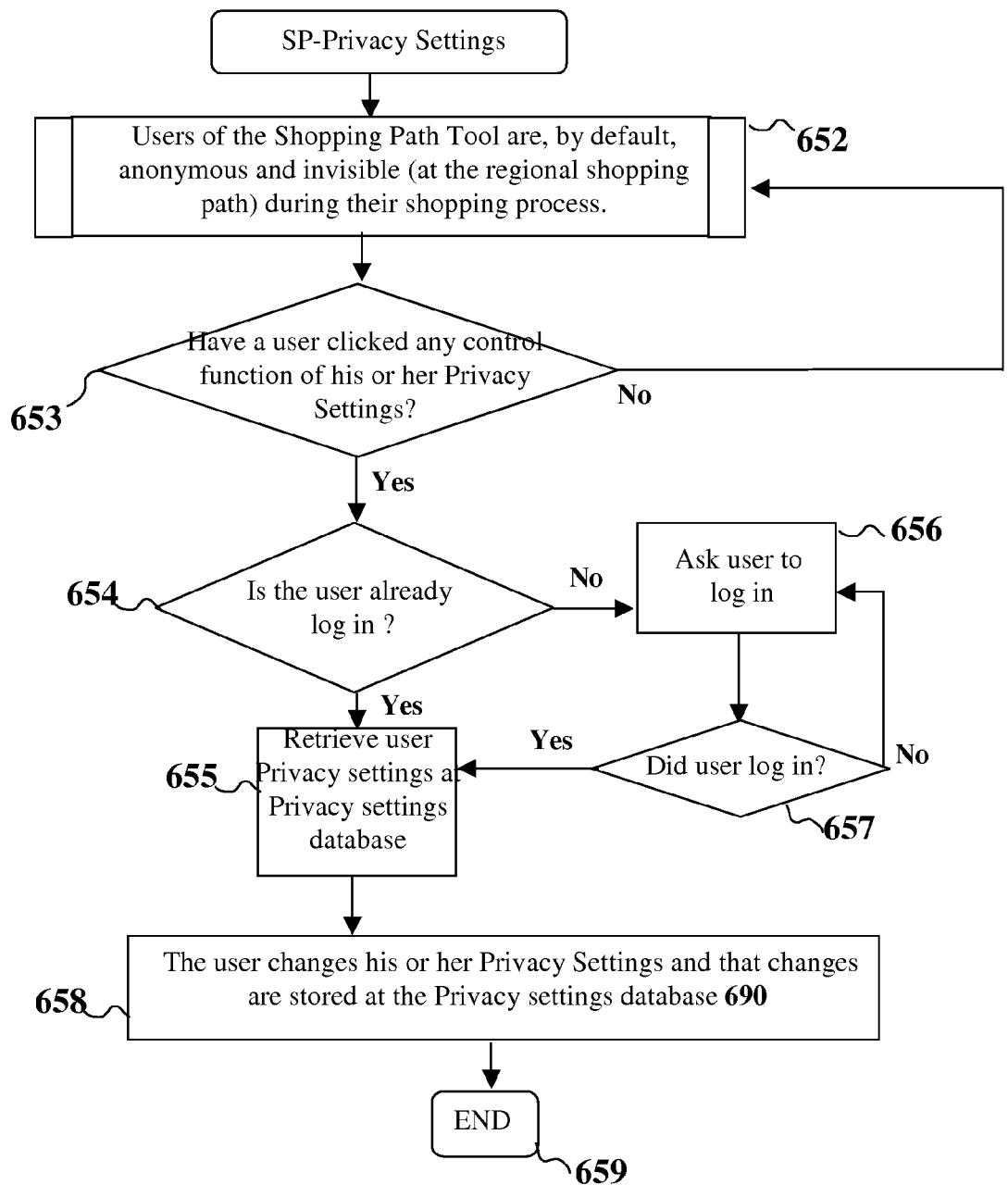
FIG. 61 is a flow chart describing an SP-Privacy Settings process according to specific embodiments of the invention.

In one embodiment of this invention, privacy setting control functions are provided as a component of the shopping path tool; so that users have control of his or hers privacy settings while using the shopping path tool. FIG. 61 is a flow chart describing the SP-Privacy Settings process 650, implemented at the SP Live Server 601, shown in FIG. 12. As illustrated in FIG. 61, SP-Privacy Settings process 650 has a precondition shown in step 652, where users of the Shopping Path Tool are, by default, anonymous and invisible (at the regional shopping path) during their shopping process. An initial test is performed during step 653, verifying if the user clicked any control function of his or her Privacy Settings. If user clicked any control function of his or her Privacy Settings, then SP Live Server 601 performs another test, during step 654, verifying if the user is log-in. If the user is log-in SP Live Server 601 retrieves user privacy settings at SP-privacy settings database 690, during step 655. Thereafter the user changes his or her privacy settings, and that changes are stored at the Privacy settings database 690, during step 658. Thereafter the user's privacy settings have been changed, SP-Privacy Settings process 650 terminates at step 659. If it was determined at step 654 that the user is not log-in, then the user is asked to log-in, during step 656. If the user log-in, then the process proceeds to step 655. If the user didn't log-in then the process goes back to step 656, as shown on FIG. 61.

3. Shopping Path Tool Ads

In one embodiment of this invention, a networked hub displays ads or panels of ads (related to products and offers) along or within the shopping path tool panels. These ads can follow the format of those static ads displayed at the right side of search engines results; or they can also be animated such as the banner ads, usually located at the top of several web pages on the Internet. In one embodiment of this invention, the ads displayed along the shopping path tool interacts with the tool, so that the product or offer information displayed at the ad can have its position highlighted at the panels of the shopping path tool. In one embodiment of this invention, when the user passes the mouse-arrow over said ad, or over a displayed show-me button inside or along said ad, then the graphical interface highlights and indicates the position of one or more products at the shopping path panel and/or the position of one or more offers at the offers panel. One characteristic of the shopping path tool is to provide unprecedented levels of price/offers transparency to consumers, so that when the position of advertised products or offers are highlighted at the shopping path tool, the comparative value of that advertised products or offers becomes instantly transparent. This feature of the shopping path tool could be useful to sellers and manufactures that want to advertise and prove (making transparent) the value of their offers; at the same time it would make more difficult to advertisers to fool uninformed consumers with ordinary or expensive offers.

In one embodiment of the present invention, advertisers display one or more panels of the shopping path tool inside their banner ads, to demonstrate the value of their products or offers. In one embodiment of this invention, sellers advertise interactive banner ads, which have identical or similar displays and functions of the shopping path tool's panels and control functions.

Figure 62:
FIG. 62 illustrates an example screenshot of an example graphical interface showing a shopping path tool displaying a panel of ads, located at the upper part of the tool according to specific embodiments of the invention.

FIG. 62 illustrates an example screenshot of an example graphical interface showing a shopping path tool displaying a panel of ads, located at the upper part of the tool. Some of these ads have a "show me" button, which interacts when the user pass the mouse-arrow over it. The example screenshot illustrates a user that was looking at the offers for the Nikon CoolPic 3100 digital camera, and an ad featuring a similar product (Canon Power Shot S40) is displayed, claiming it has more features for the same price. When the user passes the mouse-arrow over the "show me" button of the ad, the position of the product at the shopping path panel is automatically highlighted, and the product bar related to the Canon Power-shot S40 keeps flashing as long the mouse-arrow is over the "show me" button. If the user clicks or double-click at the show me" button of the ad, the shopping path and offer panels of the shopping path tool will display the Canon Powershot S40 information, and another web page is open with the link related to that ad.

Figure 63:
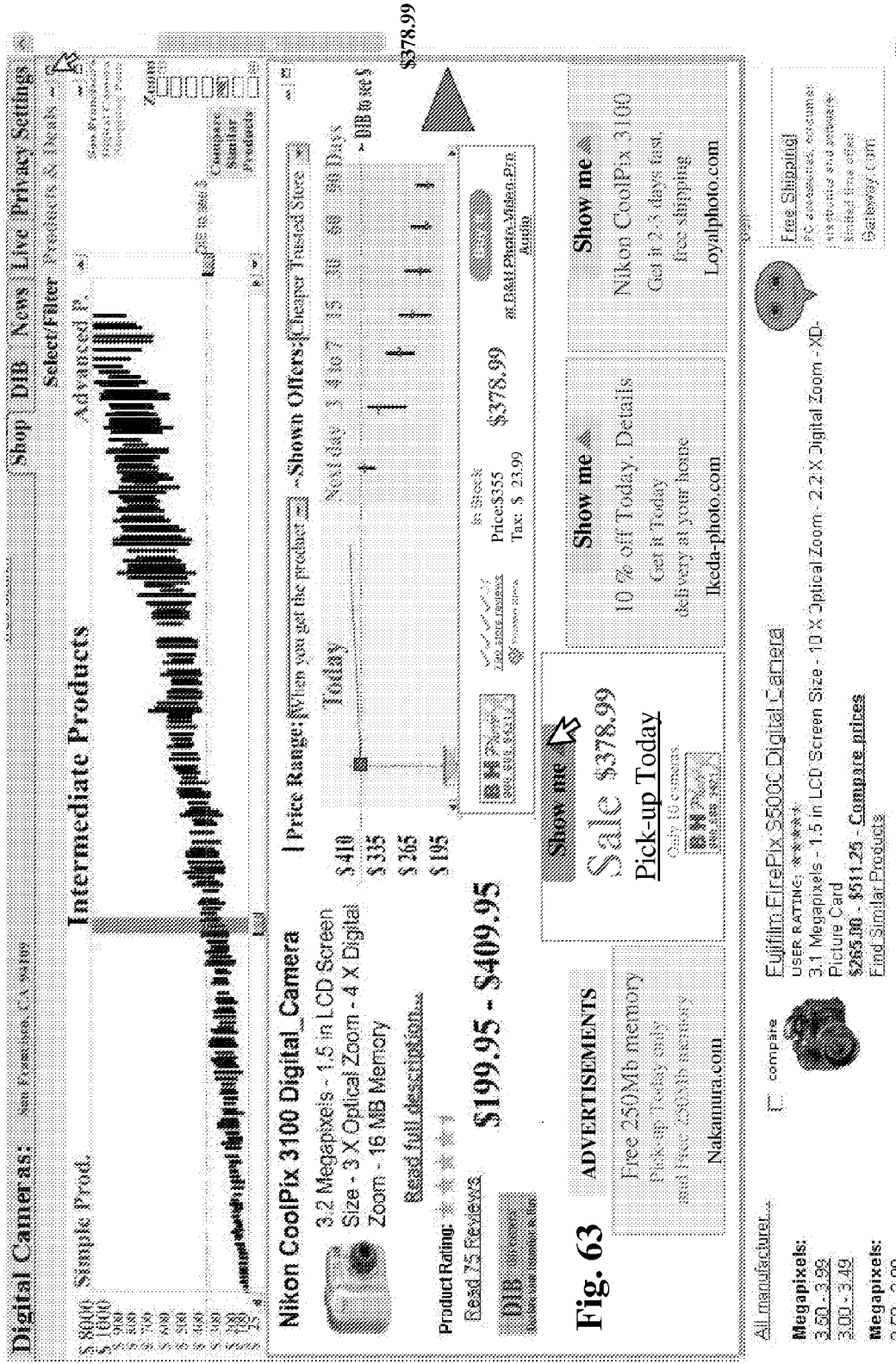
FIG. 63 illustrates an example screenshot of an example graphical interface showing a shopping path tool displaying a panel of ads, located at the bottom part of the tool according to specific embodiments of the invention.

FIG. 63 illustrates an example screenshot of an example graphical interface showing a shopping path tool displaying a panel of ads, located at the bottom part of the tool. Some of these ads have a "show me" button, which interacts when the user pass the mouse-arrow over it or click on it. The example screenshot illustrates a user that was interacting with the offers panel for the Nikon CoolPic 3100 digital camera, when an ad featuring an specific offer, was displayed, claiming a sale price of $378.99 for pick-up the camera today at the store. When the user passes the mouse-arrow over the "show me" button of the ad, the shopping path tool displays the position of the advertised offer at the offers panel and the details of the advertised offer at the specific offers panel. If the user clicks or double-click at the show me" button of the ad, offer panels of the specific offer panel will display the specific offers information, and another web page is open with the link related to that ad.

Figure 64:
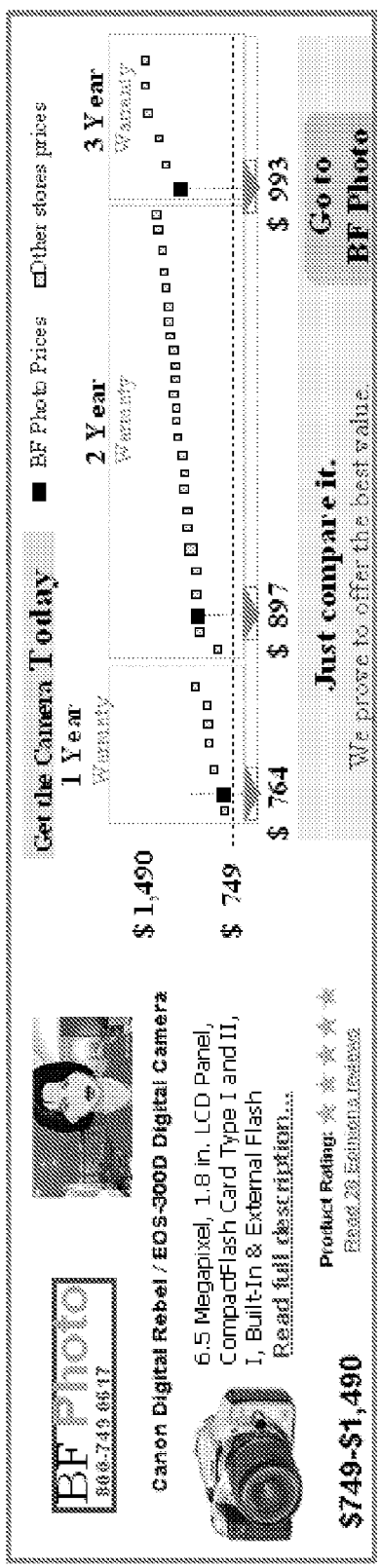
FIG. 64 illustrates an example screenshot of an example graphical interface showing a banner ad, advertising specific offers according to specific embodiments of the invention, wherein the banner ad would be placed at a giving position of a web page, such as at the top of the web page.

FIG. 64 illustrates an example screenshot of an example graphical interface showing a banner-ad, advertising specific offers, wherein the banner ad would be placed at a giving position of a web page, such as at the top of the web page. The example screenshot of the banner-ad illustrates a store advertising its pick-up today offers, with one, two and three years of warranty, for the Canon Digital Rebel EOS-digital camera. The ad uses an animated host avatar located at the upper left corner) to describe its offers, wherein the offers are displayed on a panel (resembling the offers panel of a shopping path tool) to compare its offers with the competition. Marketers and sellers will be able to create ads and banner-ads that prove the comparative value of their products using one of more elements of the shopping path tool, shown in FIGS. 13 to FIG. *f.*

Figure 65:
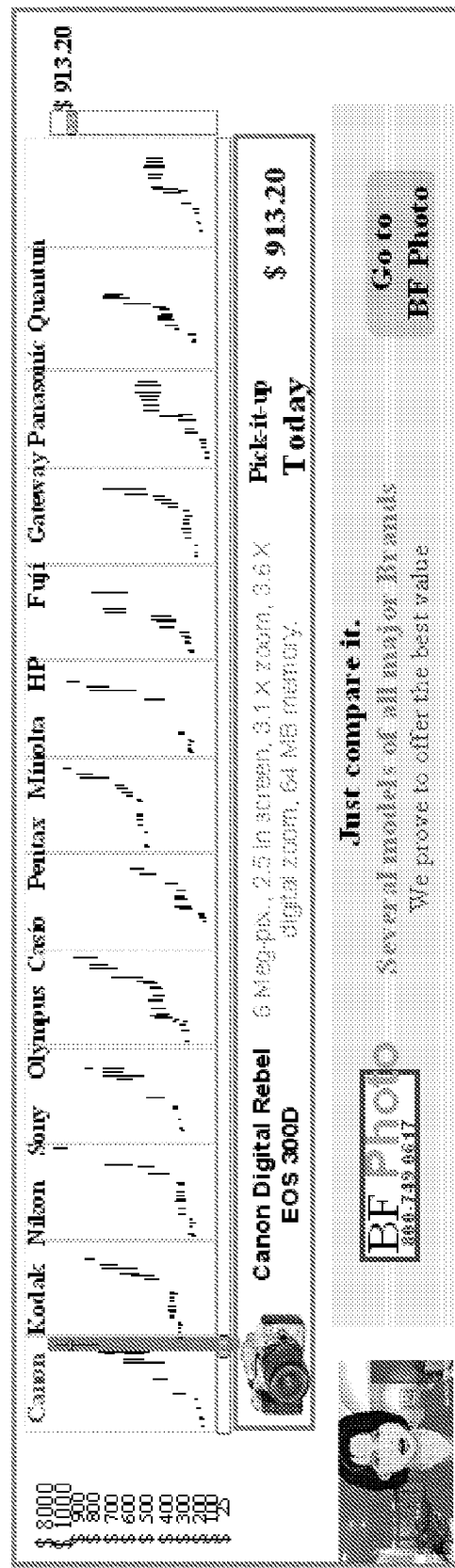
FIG. 65 illustrates an example screenshot of an example graphical interface showing a banner ad advertising a variety of available products for sale according to specific embodiments of the invention, wherein the banner ad would be placed at a giving position of a web page, such as at the top of the web page.

FIG. 65 illustrates an example screenshot of an example graphical interface showing a banner ad advertising the variety of available products for sale, wherein the banner ad would be placed at a giving position of a web page, such as at the top of the web page. The example screenshot of the banner ad illustrates a store advertising a variety of digital camera models (from different brands) for sale. The ad uses an animated host avatar (located at the bottom left corner) to describe the digital cameras it sells, where the digital cameras are displayed as product bars arranged by brand (resembling the offers panel of a shopping path tool). The ad highlights the position of the Canon Digital Rebel EOS-digital camera (product-bar), displaying a specific offer (the price for today pick-up). Sellers will be able to create ads and banner-ads that prove the comparative value of their offers using one of more elements of the shopping path tool, shown in FIGS. 13 to FIG. 48*f.*

Figure 66:
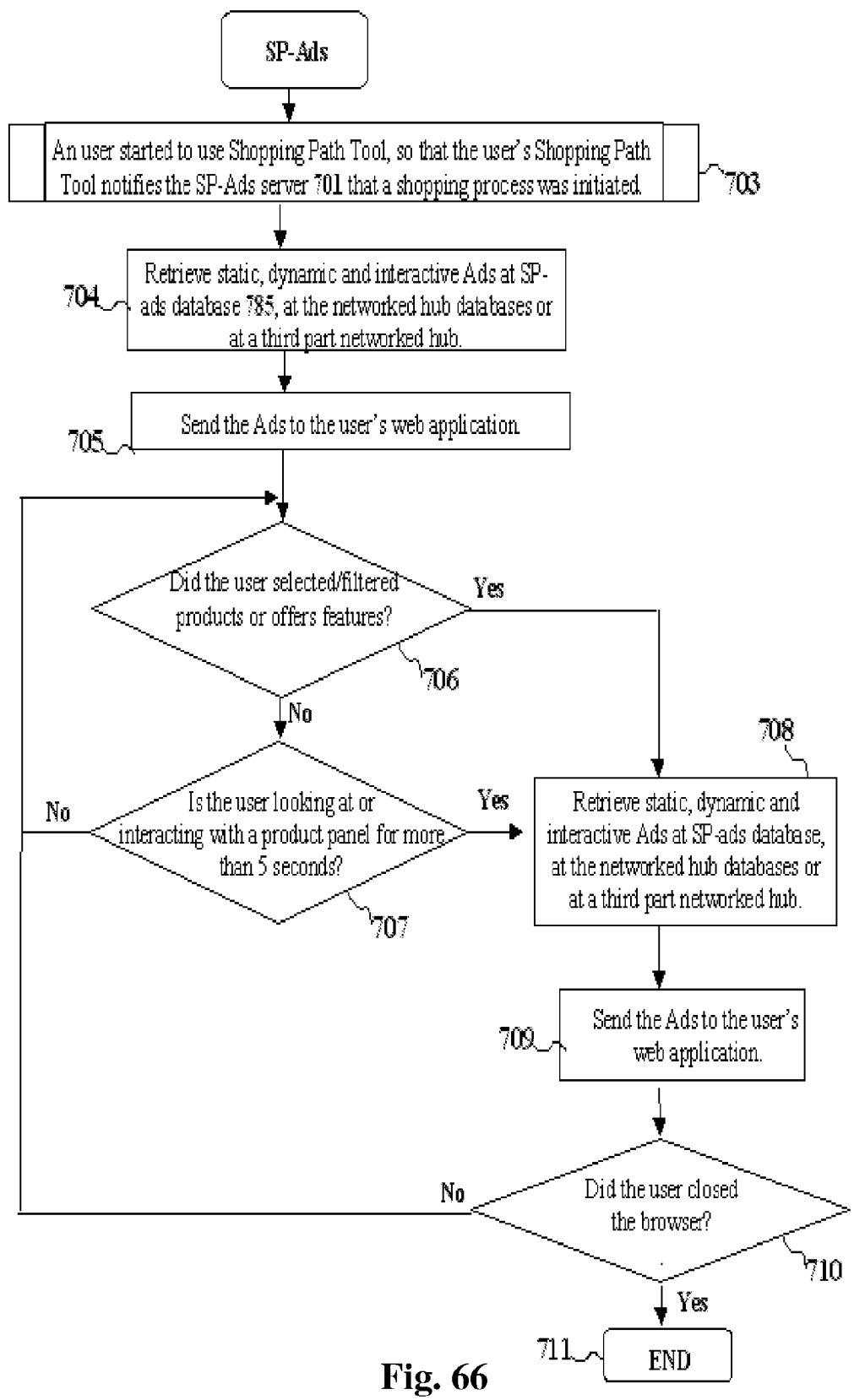
FIG. 66 is a flow chart describing the SP-Ads process according to specific embodiments of the invention

FIG. 66 is a flow chart describing the SP-Ads process 702, implemented at the SP-Ads server 701, shown in FIG. 12. As illustrated in FIG. 66, SP-Ads process 702 has a precondition shown in step 703, where an user stared to use Shopping Path Tool (the web-application), so that the user's Shopping Path Tool notifies the SP-Ads server 701 that a shopping process was initiated. Thereafter SP-Ads server 701 retrieves static, dynamic and interactive ads at SP-ads database 785, at the networked hub databases 13 or at a third part networked hub (not shown at FIGS. 11 and 12), during step 704. Thereafter SP-Ads server 701 sends ads to the user's web application, during step 705. An initial test is performed at step 706, verifying if the user selected/filtered products or offers features. If the user didn't select/filter products or offers features, then a further test is performed at step 707, verifying if the user is looking at the product panel for more than 5 seconds or interacting with the offers panel of the shopping path tool. If the user didn't keep looking at the product panel for more than 5 seconds or didn't interact with the offers panel of the shopping path tool, then the process goes back to step 706. If the user kept looking at the product panel or interacted with the offers panel of the shopping path tool for more than 5 seconds, then SP-Ads server 701 retrieves the related static, dynamic and interactive ads at SP-ads database 785, at the networked hub databases 13 or at a third part networked hub, during step 708. If at the step 706, it was determined that the user selected/filtered products or offers features, then the process goes further to step 708. Thereafter step 708, the SP-Ads server 701 sends the ads to the user's web application, during step 709. Thereafter a further test is performed at step 710, verifying if the user closed the browser. If the user didn't close the browser, then the process goes back to step 706. If the user closed the browser, then the SP-Ads process 702 terminates at step 711.

4. The DIB Process

According to specific embodiments of this invention, a DS/SP model system is deployed to support e-commerce functions at networked hub systems (such as e-retailers or price comparison engines), providing supporting shopping tools for consumers and marketing tools for sellers.

In one embodiment, the DS/SP model software system allows consumers to declare their intention to buy (DIB), graphically plotting the DIBs information into the DS/SP model. The result is that sellers gain declared demand information of the market and a segmentation/targeting tool, as the same time consumers gain a mechanism that help to create improved/customized deals for them.

Figure 67:
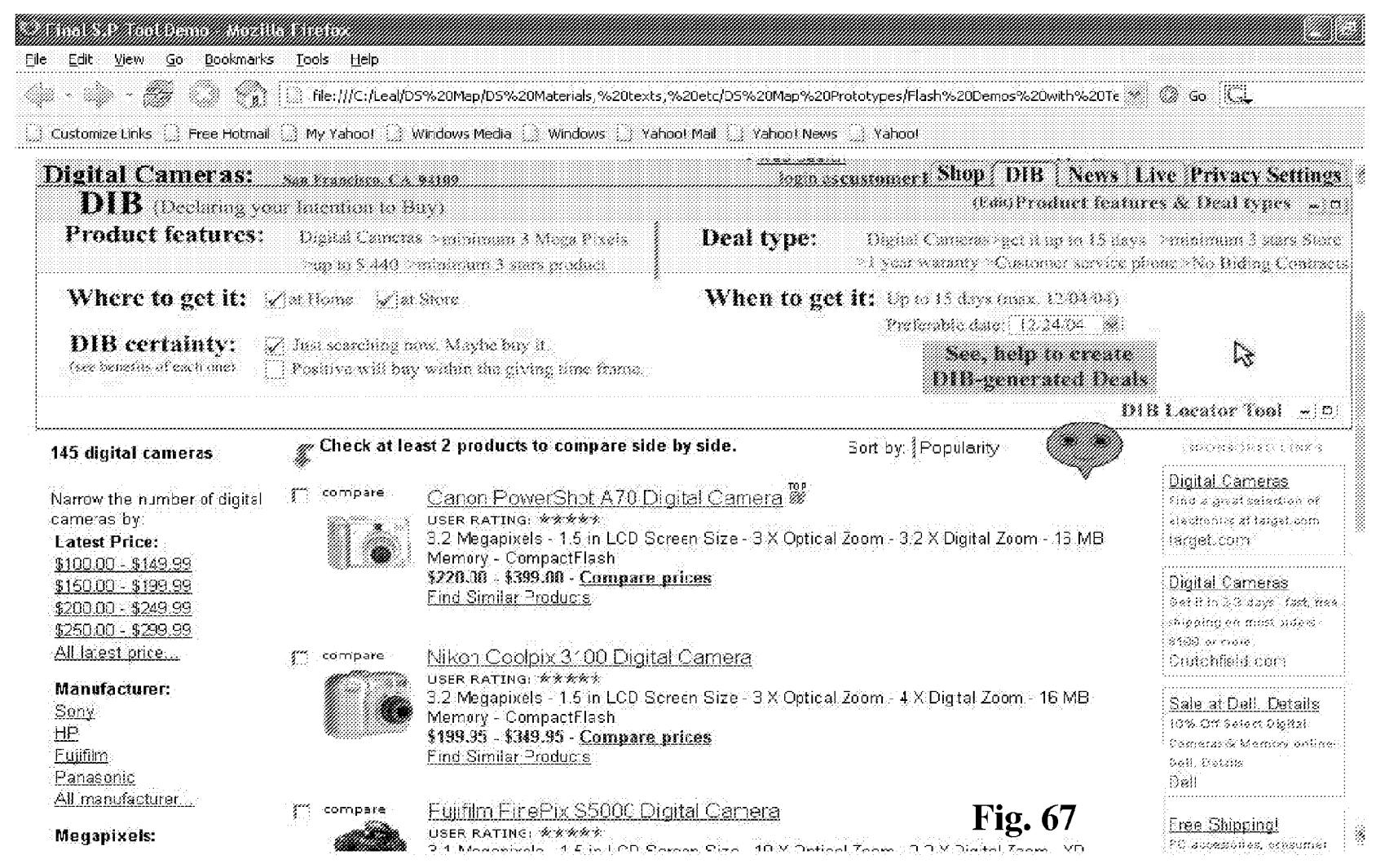

FIG. 67 illustrates an example screenshot of an example graphical interface showing a shopping path tool with a DIB-section opened and displaying a few DIB options for the consumer to choose. When a consumer clicks, for example, on a DIB button for a specific product (such as the Product Panel 2005 or at the specific offers panel 2007 shown on FIG. 22) or for a general features product category (such as the Select/Filter-products-and-deals panel 2020 shown on FIG. 35), the DIB-section GUI is displayed, so that the consumer can DIB for that selected specific product or general features product category. The DIB page shown on FIG. 67 illustrates that the consumer was searching at the shopping path tool (at a general features product category) when he or she clicked at the DIB button; notice that the chosen product features and offer types are described at the top of the DIB-section. The consumer would need to specify if he or she wants to get the product at home or at a store (or either one), his or her purchase certainty and his or her preferable date of delivery; in order to confirm his or her DIB. Immediately after the consumer confirmed the DIB, he or she might go back to the SHOP section of the shopping path tool to see if he or she received improved/customized deals over the offers that were already (publicly) available. In another embodiment of the present invention, the DIB-section displays, in addition to the buttons shown on FIG. 67, an additional option (a button saying: "customize the product" that is not shown of FIG. 67) would give consumers the ability to DIB for a customized product, like a customized computer for example. If the consumer clicks at the "customize the product" button, then the height of the DIB-section panel would expand to display different product features for the consumer to choose. After selecting the desired product features and confirming the DIB, the consumer can expect to receive customized product DIB-offers at his or her shopping path tool.

Figure 68:
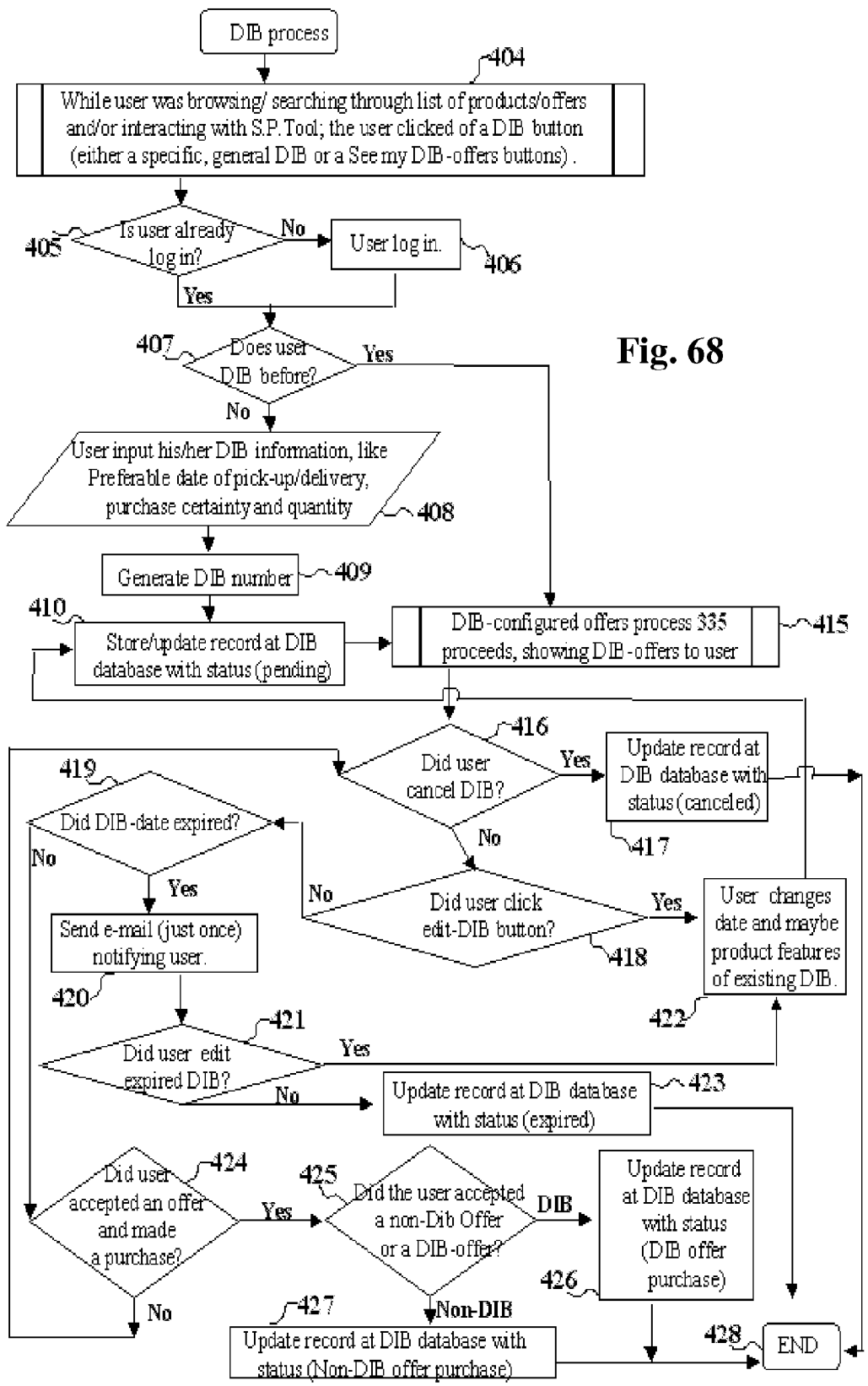
FIG. 68 is a flow chart describing the DIB process 402 implemented at the DIB server (shown in FIG. 12) according to specific embodiments of the invention.

FIG. 68 is a flow chart describing the DIB process 402, implemented at the DIB server 401, shown in FIG. 12. As illustrated in FIG. 68, DIB process 402 is initiated during step 404 while the user was browsing/searching through list of products/offers and/or interacting with shopping path tool; and the user clicked on a DIB button (either a specific, a general or a See-my-DIB-offers button). Thereafter, DIB server 401 further initiates a test, during step 405, to determine if user is already log-in. If the user is not log-in, he or she must log-in in order to DIB, during step 406, otherwise the DIB process won't proceed. If it is verified at step 405 that the user was already log-in, then DIB server 401 further performs a test during step 407 to determine if the user already DIB for that specific or general product; DIB server 401 queries DIB database 491 to determine if the user has DIB for it. If the user hasn't DIB yet, then during step 408, the shopping path tool GUI presents to the user a display/form where he or she input his/her DIB information, like the preferable date of pick-up/delivery, purchase certainty, where to get the product and quantity. Thereafter the user confirmed the DIB, DIB server 401 generates a DIB number, during step 409, and then store/update record at DIB database 491 with status (pending), during step 410. Once the DIB-number is stored or up-dated, the DIB-offer configurator process 335 (described in FIG. 52) configures and sends to the uses his or hers DIB-offers, during step 415. If it was verified, during step 407, that the user already DIB for that specific or general product; then the process goes to step 415. Then a further test is performed by DIB server 401, during step 416, verifying if the user cancelled his or her DIB. If the user cancelled the DIB, DIB server 401 updates record at DIB database 491 with status (canceled), during step 417. If the DIB was canceled, during step 417, then DIB process 402 is terminated at step 428.

If it was verified that the user didn't cancel the DIB, at step 416, DIB server 401 further performers another test verifying if user clicked at a edit-DIB button, during step 418. If the user clicked at edit-DIB button, the user may change the date and maybe the product features of his or her existing DIB, during step 422. The changes at the user DIB are stored/up-dated dated at DIB database 491 with status (pending), during step 410. If the user didn't click at the edit-DIB button, during step 418, then a further test is performed at step 419, verifying if the DIB-date is expired. If it is verified on step 419 that the DIB-date is expired, then the DIB server 401 triggers a mechanism that sends an e-mail (just once) notifying the user that her or his DIB is expired, during step 420. Then a further test is performed at step 421, verifying if the user edited the expired DIB (say after two 2 days the DIB was expired, for example). If the user clicked at edit-DIB button, and then he or she can change the DIB, at step 422; those changes are stored/up-dated at DIB-database 491, during step 410.

If the user didn't up-dated the expired DIB (say after 2 days the DIB expired), DIB server 401 updates record at DIB database 491 with status (expired), during step 423. As the DIB is recorded as expired, the DIB process 402 is terminated at step 428. If it was verified at step 419 that the DIB was not expired, then a further test is performed at step 424, verifying if the user accepted an offer and made a purchase. If the user didn't make a purchase, then the process goes back to step 416, verifying if the user cancel the DIB. If it was verified at step 424 that the user made a purchase, a further test is performed at step 425, verifying if the user accepted a DIB-offer or a non-DIB (public) offer. If the use accepted a DIB-offer, DIB server 401 updates record at DIB database 491 with status (DIB offer purchase), during step 426. After the DIB server 401 changed the DIB status to DIB offer purchase, and DIB process 402 is terminated at step 428. If the user accepted a non-DIB offer, DIB server 401 updates record at DIB database 491 with status (non-DIB offer purchase), during step 427. After the DIB server 401 changed the DIB status to non-DIB offer purchase, and DIB process 402 is terminated at step 428.

In another embodiment of the present invention, consumers have the ability to DIB for customized products; so that at the step 408 of DIB process 402, the consumer would also determine his or her the desirable customized product features.

In one embodiment of this invention, the DS/SP system is deployed at a price comparison engine; where consumers can compare products and offers, wherein after clicking on an offer, consumers are sent to the seller website to accept the offer and purchase the product. Ideally every time a consumer clicks on a offer at the shopping tool, and confirms (purchase) a offer at the seller's website, the seller should have a mechanism (at their website, say a installed piece of software code) that would let the DS/SP system know that a public or DIB-offer selected at the shopping path tool was accepted (purchased) at the seller's website. In one embodiment of this invention, the DIB server 401 (at the DIB process 402) would be notified by the installed piece of software code at the seller's website, during step 424, if the consumer made the purchase at the seller's website. The prior art of these software mechanisms (cookies or Google's AdSense from google.com, for example) that notifies a networked hub when a purchase took place at the seller's website are becoming so widely used nowadays, that it won't be detailed at this invention.

Figure 69:
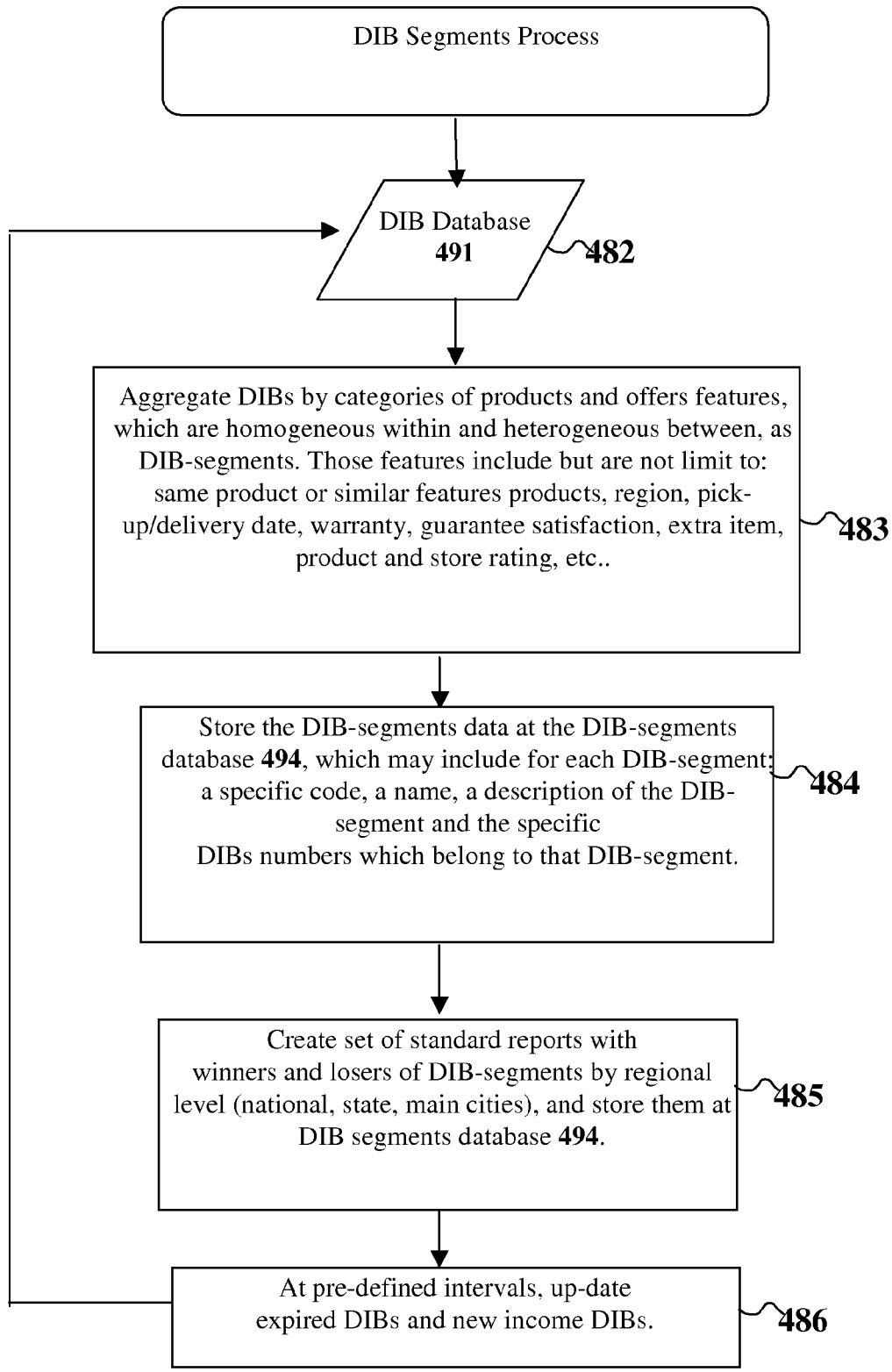
FIG. 69 is a flow chart describing the DIB Segments process 480 (shown in FIG. 12) according to specific embodiments of the invention.

FIG. 69 is a flow chart describing the DIB Segments process 480, implemented at the DIB server 401, shown in FIG. 12. As illustrated in FIG. 69, DIB Segments process 480 is initiated during step 482 when DIB server 401 access DIB Database 491. The DIB server 401 aggregates DIBs by categories of products and offers features, which are homogeneous within and heterogeneous between, as DIB-segments, during step 483. Those features include but are not limit to: same product or similar features products, region, pick-up/delivery date, warranty, guarantee satisfaction, extra item, product and store rating. Thereafter, DIB server 401 stores the DIB-segments data at the DIB-segments database 494, which may include for each DIB-segment: a specific code, a name, a description of the DIB-segment and the specific DIBs numbers which belong to that DIB-segment, during step 484. Thereafter, DIB server 401 creates a set of standard reports with winners and losers of DIB -segments by regional level (national, state, main cities), storing the reports at DIB segments database 494, during step 485. Thereafter, DIB server 401, at predefined intervals, up-dates the expired DIBs and new income DIBs, during step 486, starting the process again, accessing the DIB database at step 482 and so on.

In another embodiments of this invention, marketers deploy data mining and/or analytical/business intelligence applications to add additional analytical capabilities to the DIB-segments process 480 and the segments queries of user/sellers. Enterprises can use, for example, their current IT infrastructure, say their data mining applications and OLAP systems, to select and aggregate DIB-data available at the DIB Database 491, delivering DIB-related analytical information to its enterprise applications like ERP, CRM, SCM, 17 of FIG. 11). The prior art of using data mining and analytical/business intelligence applications to categorize and rank consumers data into market segments are so widespread nowadays that it won't be detailed at this invention.

MARKETING SHOPPING PATH TOOLS

As the same way the DS/SP model system, deployed at networked hub systems (such as e-retailers or price comparison engines), provides supporting shopping tools (the shopping path tool) for consumers; it also provides marketing tools for sellers (the marketing shopping path tool). Several panels and functions present at the shopping path tool are also present at the marketing shopping path tool, with the difference that the marketing shopping path tool has additional features and panels that are only pertinent to sellers, such as the ability to search DIB-segments and to create and edit offers for products and services.

Figures 70, 71:
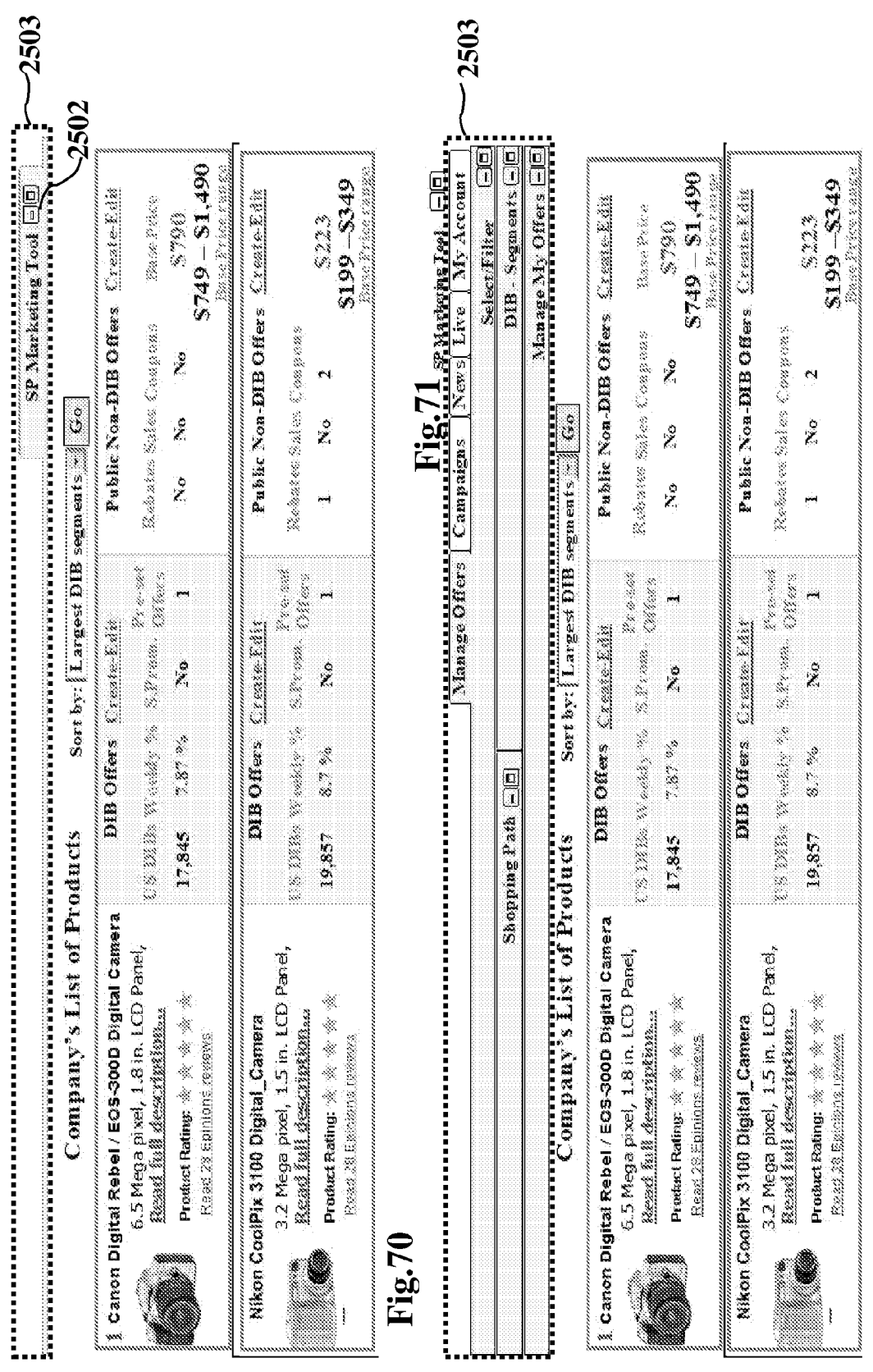

In a particular embodiment of this invention, the marketing shopping path tool is an interactive tool (that could be deployed either in Java or Macromedia's Flash) displayed inside one interactive row (the SP-MKT-tool row) 2503 shown on FIG. 70, which are displayed among other rows that display the seller list of products and offers. The SP-MKT-tool row 2503 identically follows the model of the SP-tool row 2003, wherein the SP-MKT-tool row 2503 displays a marketing shopping path tool inside it. Html-code/Call-GUI process 100 implemented at the networked hub web-server 10, shown in FIG. 11, is responsible to create both the SP-tool row 2003 for the consumer's shopping path tool as well as the SP-MKT-tool row 2503 for the sellers' marketing shopping path tool.

FIG. 70 and FIG. 71 illustrate the SP-MKT tool row 2503 expanding its height to accommodate the marketing shopping path tool 2503 different panels and control functions. FIG. 70 illustrates the SP-MKT tool row with a marketing shopping path tool at its most contracted form inside it. FIG. 71 illustrates an expanded SP-MKT tool row 2503 with a marketing shopping path tool displaying its main control functions, which includes Manage Offers (for comparison, creation and edition of offers), Campaigns (for creation and edition of regional product shopping path related ads), News (for products and offers news/reports), Live (for three dimensional navigation and live chatting at regional shopping paths) and My account (to manage account details and privacy issues). As it shown in FIG. 71, the Manage Offers control function is selected, displaying its related panels; say the Select/Filter (products and deals) panel, Interactive Shopping Path panel, DIB-segments panel and Manage-my-offers panel.

As the same way the Html-code/Call-GUI process 100 produces the buyers' SP-tool row 2003 (shown on FIG. 49), it also produces the seller's SP-MKT-tool row 2503. The difference is that the Html-code/Call-GUI 100 is initiated during step 102 when a seller, while is browsing/searching the pages of the networked hub website, requested a page that has a Marketing Shopping Path Tool 2002. While the web-server 10 is building the page, it places a SP-MKT-tool row 2503 on the designated area of the page, during step 103. Thereafter, the web-server 10 calls Marketing Shopping Path tool 250 process, located at the DS/SP model-tool Server 200, requesting marketing shopping path tool information related to a specific product category (like digital cameras), during step 104. Thereafter, the web-server 10 downloads the page contents first, and then downloads Marketing Shopping Path Tool, during step 105. Html-code/Call-GUI process 100 terminates during step 106.

Figure 72:
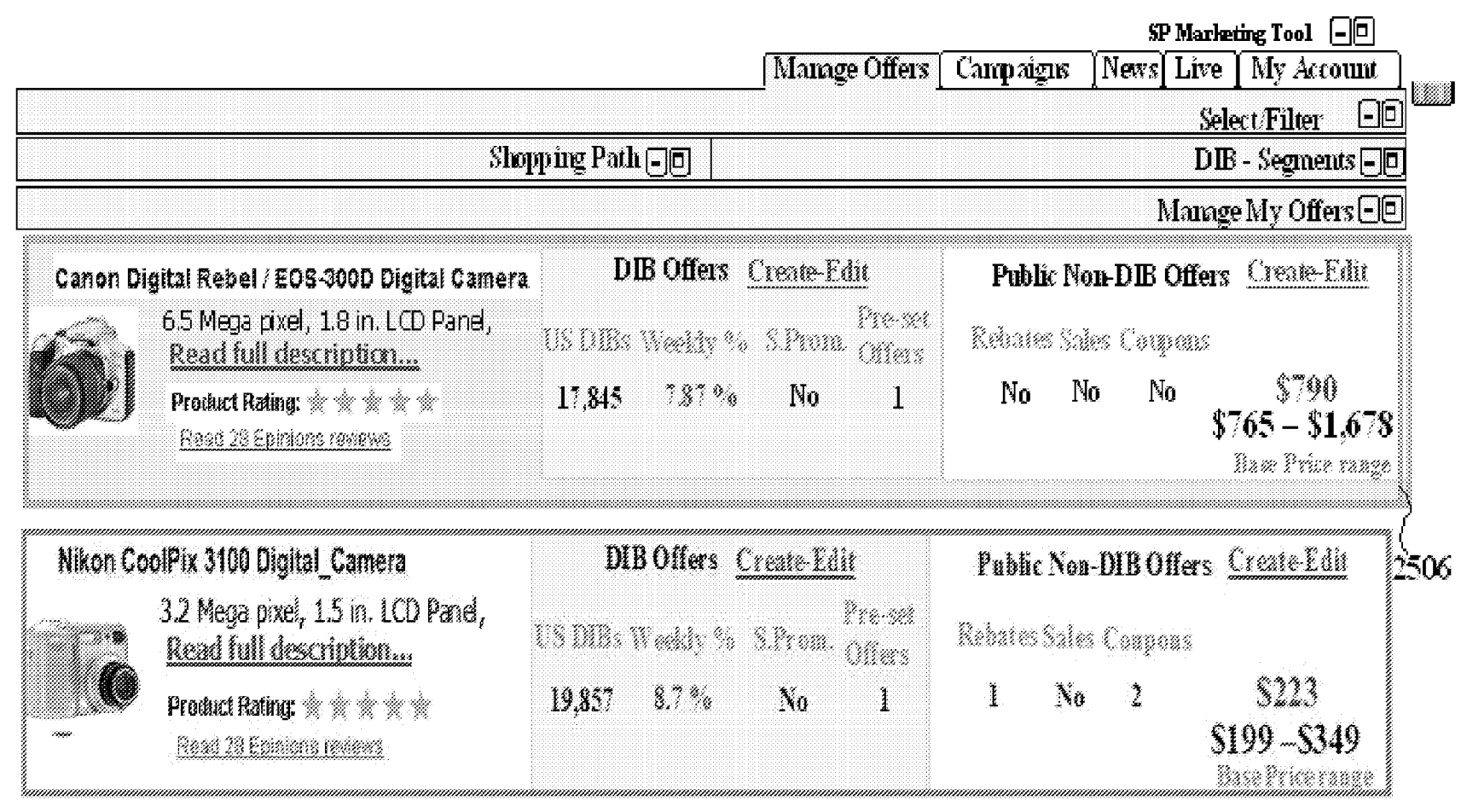

FIG. 72 illustrates an example screenshots of an example graphical interface showing that the marketing shopping path tool (located above a list of products) can interact with the list of products, when the seller scrolls down/up the browser scroll button. The marketing shopping path tool interacts with the list of products identically to how the shopping path tool interacts the list of products, as explained on FIG. 24 to FIG. 27. FIG. 72 follows the example shown on FIG. 71, illustrating a seller scrolling-down the browser, so that the SP-MKT-tool row and the shopping path tool recognize the product at the top-row of the list, which is touching the bottom of the SP-MKT-tool row, embracing the top-row with a colored square or rectangle 2506. In this particular case, the embraced row is related to the Canon Digital Rebel/EOS-300D digital camera. If the seller keeps scrolling down one more row, for example, the Nikon Coolpix 3100 digital camera row would be embraced.

Figure 73:
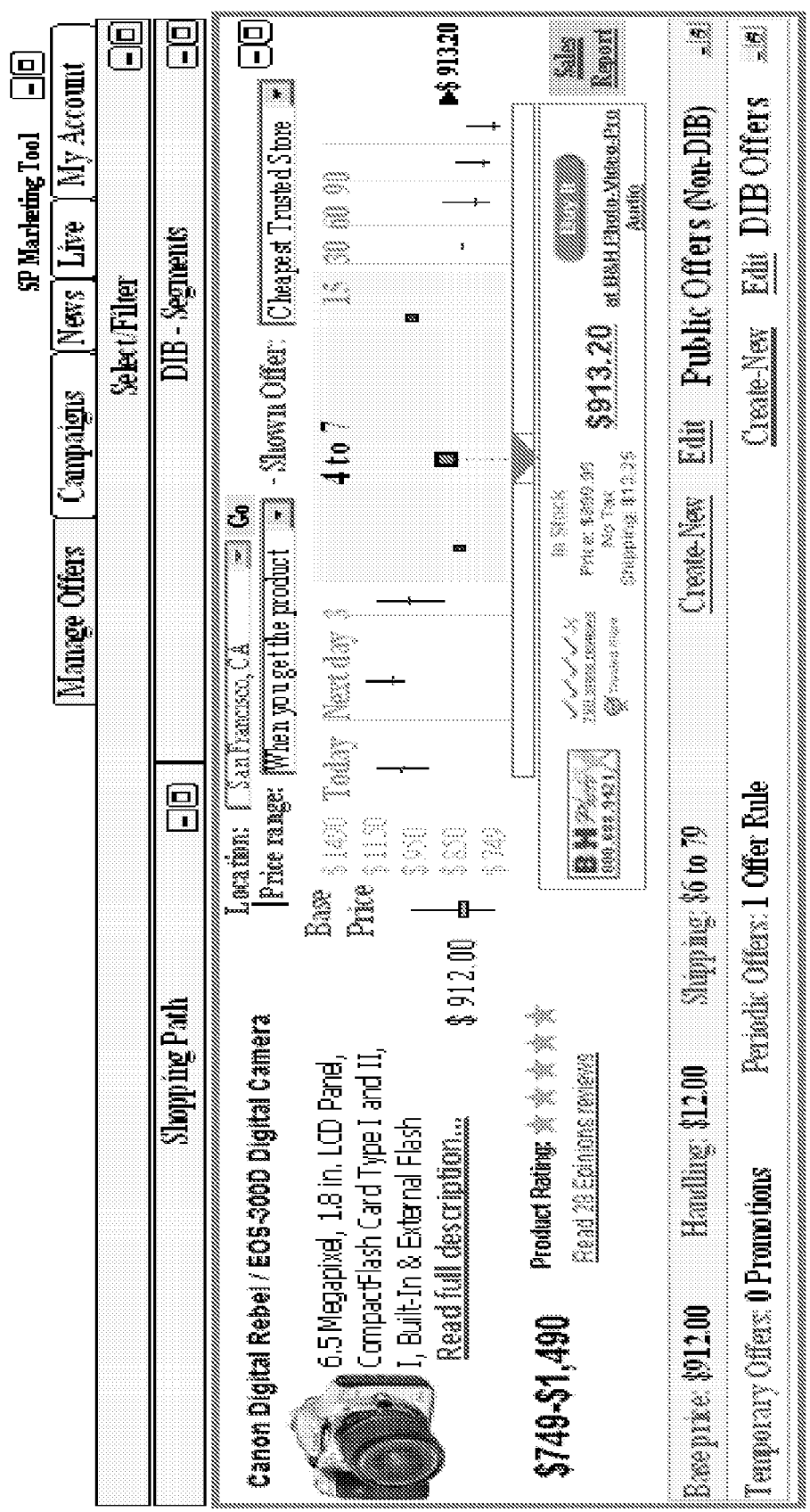
FIG. 73 illustrates an example screenshot of an example graphical interface showing a marketing shopping path tool with the manage-my-offers panel opened according to specific embodiments of the invention.

FIG. 73 illustrates an example screenshot of an example graphical interface showing a marketing shopping path tool with the manage-my-offers panel opened. The manage-my-offers panel displays information (like product features and offers details) related to the selected product, in this particular case the Canon Digital Rebel/EOS-300D digital camera. The manage-my-offers panel displays, at its right side, product information like name, product features and price variation. Identically to the shopping path tool's Product Panel 2005, the manage-my-offers panel has two additional panels displayed at the left side of it, particularly the Offers panel, and the specific offer panel. The Offers panel, and the specific offer panel won't be described because they are identical to the panels described at the shopping path tool, shown on FIGS. 19, 21, 22 and 23. The manage-my-offers panel has two additional panels, the Public Offers panel and the DIB offers panel, with the respective functions of creating new or editing public-offers and DIB-offers. Both Public Offers panel and the DIB offers panel are shown on FIG. 73 at their contracted form.

The Select/Filter panel and the Shopping Path panel (shown on FIG. 73) present at the marketing shopping path tool won't be described because they are identical to the Select/Filter panel and the Shopping Path panel described at the shopping path tool on FIGS. 19, 20, 34 and 35.

Figure 74:
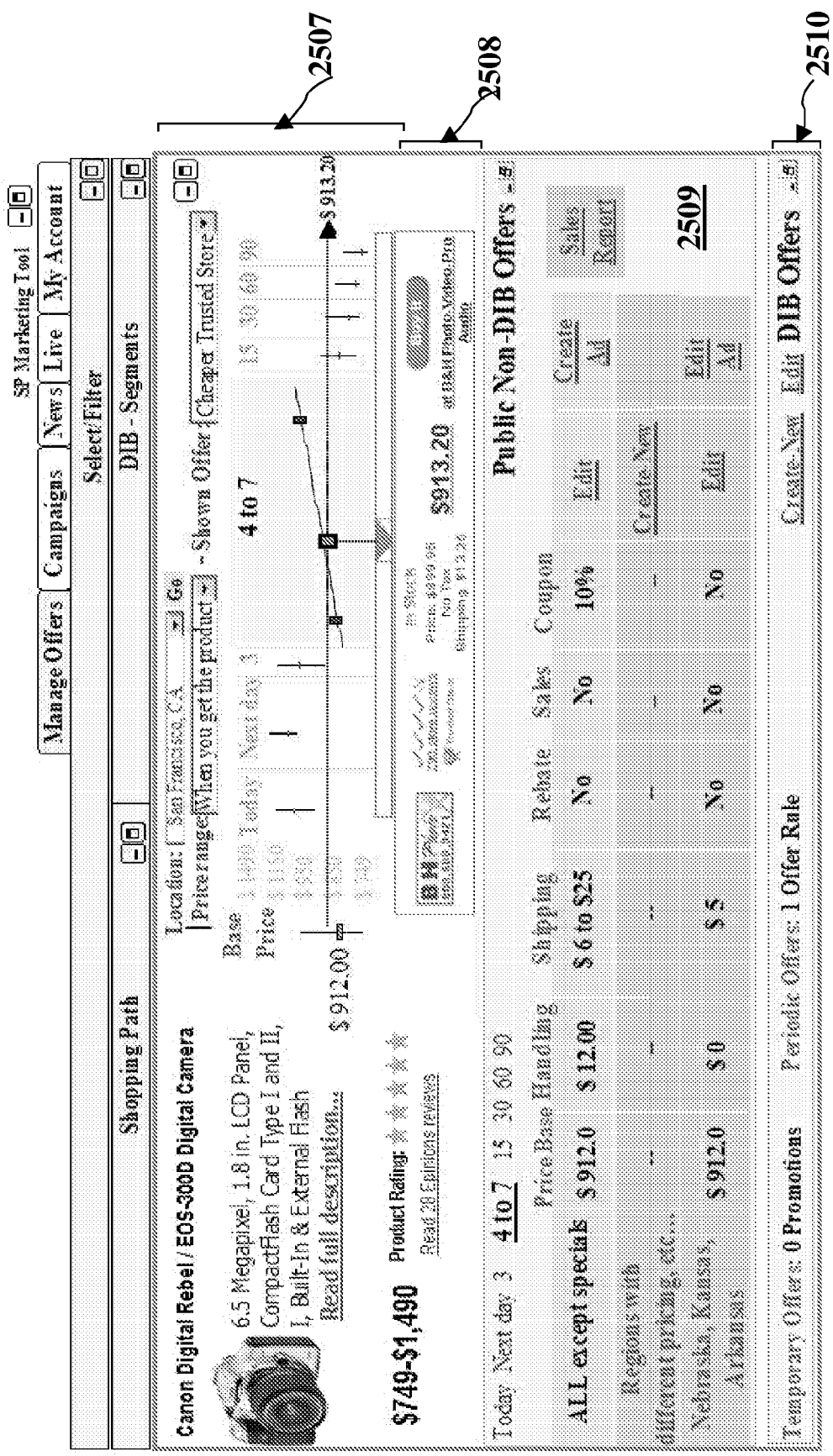
FIG. 74 illustrates an example screenshot of an example graphical interface showing a marketing shopping path tool with its manage-my-offers panel opened, and in particular with the Public non-DIB offers control function selected according to specific embodiments of the invention.

FIG. 74 illustrates an example screenshot of an example graphical interface showing a marketing shopping path tool with its manage-my-offers panel opened, and in particular, with the Public Offers panel 2509 opened and the DIB-offer panel 2510 closed. Sellers can use the marketing shopping path tool to compare its own offers with the competitors' offers, being able to edit current offers, create new public offers, as well as create/update DIB-offers. So that when a seller logs in to the networked hub, the seller's marketing shopping path tool is already set-up to focus in the seller's offers in contrast to the competitor's offers. The offers panel 2507 is showing the 4 to 7 days pick-up/delivery offers from all sellers (at the networked hub), highlighting the seller's offers with bigger squares. Similarly to the shopping path tool, the specific offer panel 2508 displays details the specific offer (selected and highlighted at the offers panel 2507). The public offers panel 2509 displays the price components (like base price) of the offers that are public, meaning that any person whishing to purchase that product have access to that offer. Notice that the type of offer highlighted at the offers-panel 2507 and shown at the public offers panel 2509 are the same (they display the same type of offer, in this particular case both displays 4 to 7 days offers), so that it is easy for the seller to edit it existing public offers. By changing the values of an existing offer at the public offers panel 2509, such as the base price or handling fees for example, the seller would instantly see (simulate) the price result at the offers panel 2507, and the effective change would only take place if he or she clicks the Edit button. If the seller wants to boost the offer's sales, he or she might create an ad for that specific offer by clicking the create ad button, and then a page from the campaigns control function would appear, in order for the seller to create the ad. The prior art of creating and managing ads by product keywords or category of features, for example at search engines like yahoo.com or google.com, are so mainstream nowadays that it won't be detailed at this invention. If the seller wants to manage the performance of its offers, he or she might click on the sales reports button, and then a sales report would appear at a different page or as an additional panel on the marketing shopping path tool. The prior art of sales reporting, displaying tables and/or graphics, are also so mainstream nowadays that it won't be detailed at this invention.

Figure 75:
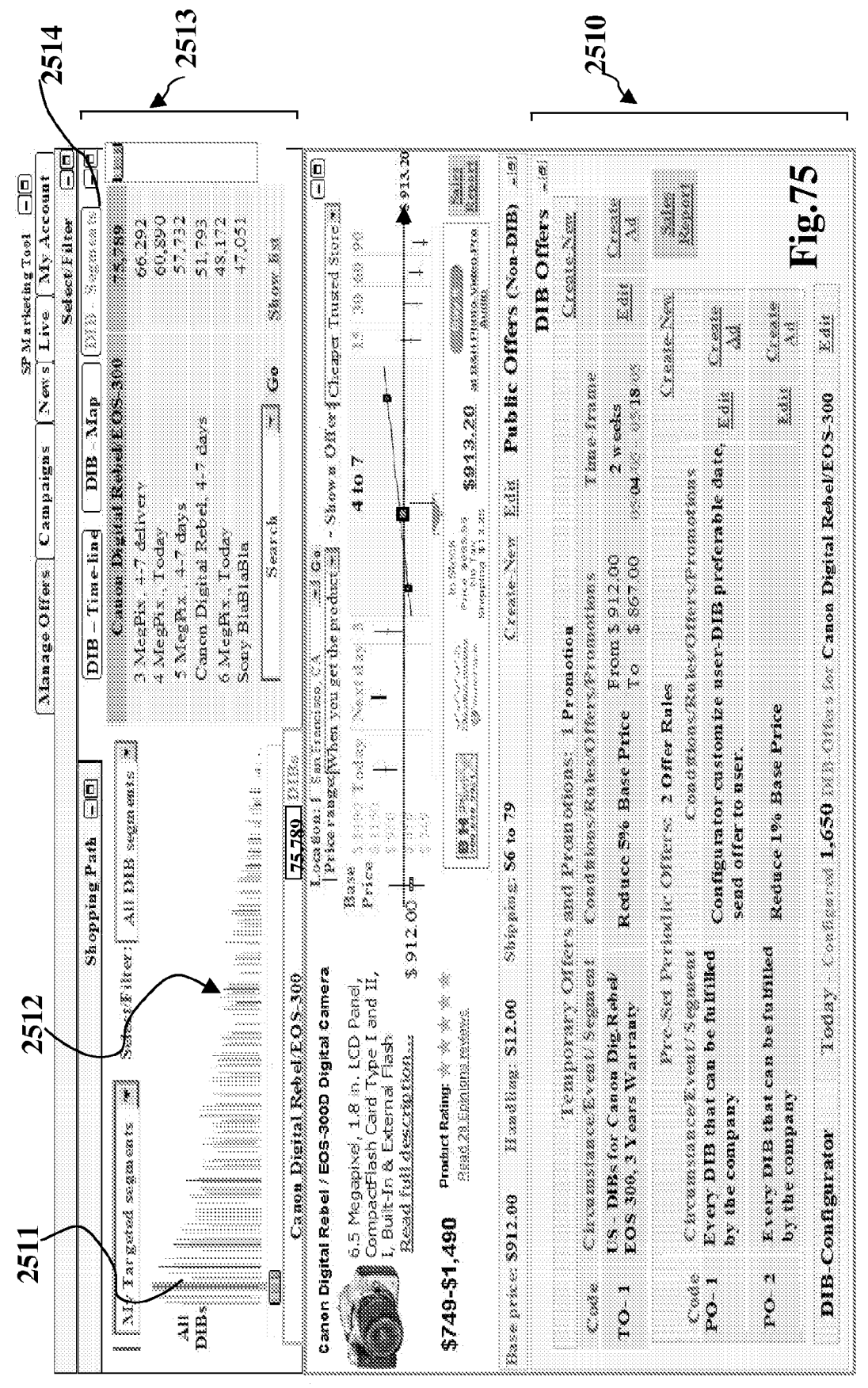

FIG. 75 illustrates an example screenshot of an example graphical interface showing a marketing shopping path tool displaying information about DIB-segments (at US territory), as well as details of the seller's DIB-offers for a specific product. The marketing shopping path tool shown on FIG. 75 has two main panels opened: the DIB-segments panel 2513 with only the DIB-segment control function 2514 selected, and the manage-my-offers panel opened; with the Public Offers panel 2509 closed and the DIB-offers panel 2510 opened. Sellers can use the marketing shopping path tool to navigate and select specific DIB-segments (from very specific/narrow segments to broad-categories segments), being able to edit and/or create new temporary and periodic offers/promotions for those selected DIB-segments, so that only the consumers (the consumers' DIBs), belonging to those targeted DIB-segments, receive the targeted DIB-offers.

The marketing shopping path tool shown on FIG. 75 illustrates an opened DIB-segments panel 2513, displaying (at the right side) a plurality of bars 2512, each bar representing one DIB-segment; where the size (the height) of each bar is proportional to the number of DIBs the DIB -segment has. In this particular case, of the FIG. 75, the group of DIB-segments 2512 is arranged in decreasing order. Similarly to the shopping path tool's product-selector 2012 shown on FIG. 19, the marketing shopping path tool has a DIB-segment-selector 2511. The DIB-segment-selector 2511 is attached at a parallel-scroll button, recognizing the DIB -segment bar it touches, so when a seller scrolls the button either left or right, the DIB-segment-selector 2511 highlights the touched DIB -segment bar, and the product information (like public and DIB-offers) related to the DIB -segment is displayed at the manage-my-offers panel. When a seller scroll up/down the list of DIB -segments located at the right side of the DIB-segments panel 2513, and select one DIB-segment; the same DIB -segment highlighted at the list is also highlighted at the group of DIB-segments 2512 and the product information (like public and DIB-offers) related to the selected DIB-segment is displayed at the manage-my-offers panel.

In the particular case of the FIG. 75, the DIB -segment-selector 2511 is highlighting the DIB-segment of the Canon Digital Rebel/EOS-300D digital camera, while the DIB-offer panel 2510 displays the DIB-offers related to the Canon Digital Rebel/EOS-300D digital camera. So it is easy for the seller to analyze, edit (existing offers) and/or create new temporary and periodic offers/promotions targeting the DIB-segment of the Canon Digital Rebel/EOS-300D digital camera. In order to create a new temporary DIB-offer, for example, the seller would need to click the button "create new" (at the right side of temporary offers and promotions section at the DIB-offers panel 2510), and the software (of the marketing shopping path tool) would automatically place the DIB-segment name (US-Canon Digital Rebel/EOS-300D digital camera) at the circumstance/event/segment section.

Note that the seller can elaborate and add more details and characteristics of the DIB-segment at this section. If this is the case, the seller would need to define the offers details (at least price) at the conditions/rules/offers/promotions section, and finally the seller would need to define the time-frame the offer is valid. During this defined time frame, only the consumers that DIB for the Canon Digital Rebel/EOS-300D digital camera would have access to this example DIB-offer. Similarly to the process defined above, sellers can define periodic/continuous DIB-offers simply by determining a circumstance/event/segment and then defining the conditions/rules/offers/promotions (at least price) of the offer; so that every time a consumer's DIB fit the defined circumstance/event/segment, the consumer receives the DIB-offer. FIG. 75 illustrates examples of temporary and periodic/continuous DIB-offers for the Canon Digital Rebel/EOS-300D digital camera. If the seller wants to change an existing DIB-offer, he or she just need to delete and write either the circumstance/event, the conditions/rules or the time frame and click the edit button.

If the seller wants to boost the DIB-offer's sales, he or she might create an ad for that specific DIB-offer by clicking the create ad button, and then a page from the campaigns control function would appear in order for the seller to create the ad. The prior art of creating and managing ads by product keywords or category of features, for example at search engines like yahoo.com or google.com, are so mainstream nowadays that it won't be detailed at this invention. If the seller wants to manage the performance of its DIB-offers, he or she might click on the sales reports button, and then a sales report would appear at a different page or as an additional panel on the marketing shopping path tool. The prior art of sales reporting, displaying tables and/or graphics, are also so mainstream nowadays that it won't be detailed at this invention.

The DIB-configurator section, located at the bottom of the DIB-offers panel 2510, displays the "today" amount of configured DIB-offers for the Canon Digital Rebel/EOS-300D digital camera. By default, all sellers (that use a marketing shopping path tool), have a pre-set periodic DIB-offer rule, where for every consumer DIB (that can be fulfilled by the company), wherein the DIB-offers configurator will select the available public offer that related to the DIB's preferable date of pick-up/delivery (the DIB-offers configurator process is described at the FIG. 52). If the seller wants to change the settings of its DIB-configurator, he or she would need to click at the edit button, and then the height of the DIB-configurator section (at DIB-offers panel 2510) expands, to display different options of customization for the seller to choose (not shown on FIG. 75).

In another embodiment of this invention, sellers can define rules for product configuration at the DIB-configurator section, so that when a consumer DIBs for a customized product, say a lap-top with a certain size of screen, certain RAM and certain processor for example; the DIB-configurator process would automatically mach (as much as possible) the consumer's DIB product requirements with the company's product features options, sending a customized product DIB-offer to the consumer (see DIB-offers configurator process at FIG. 52).

Figure 76:
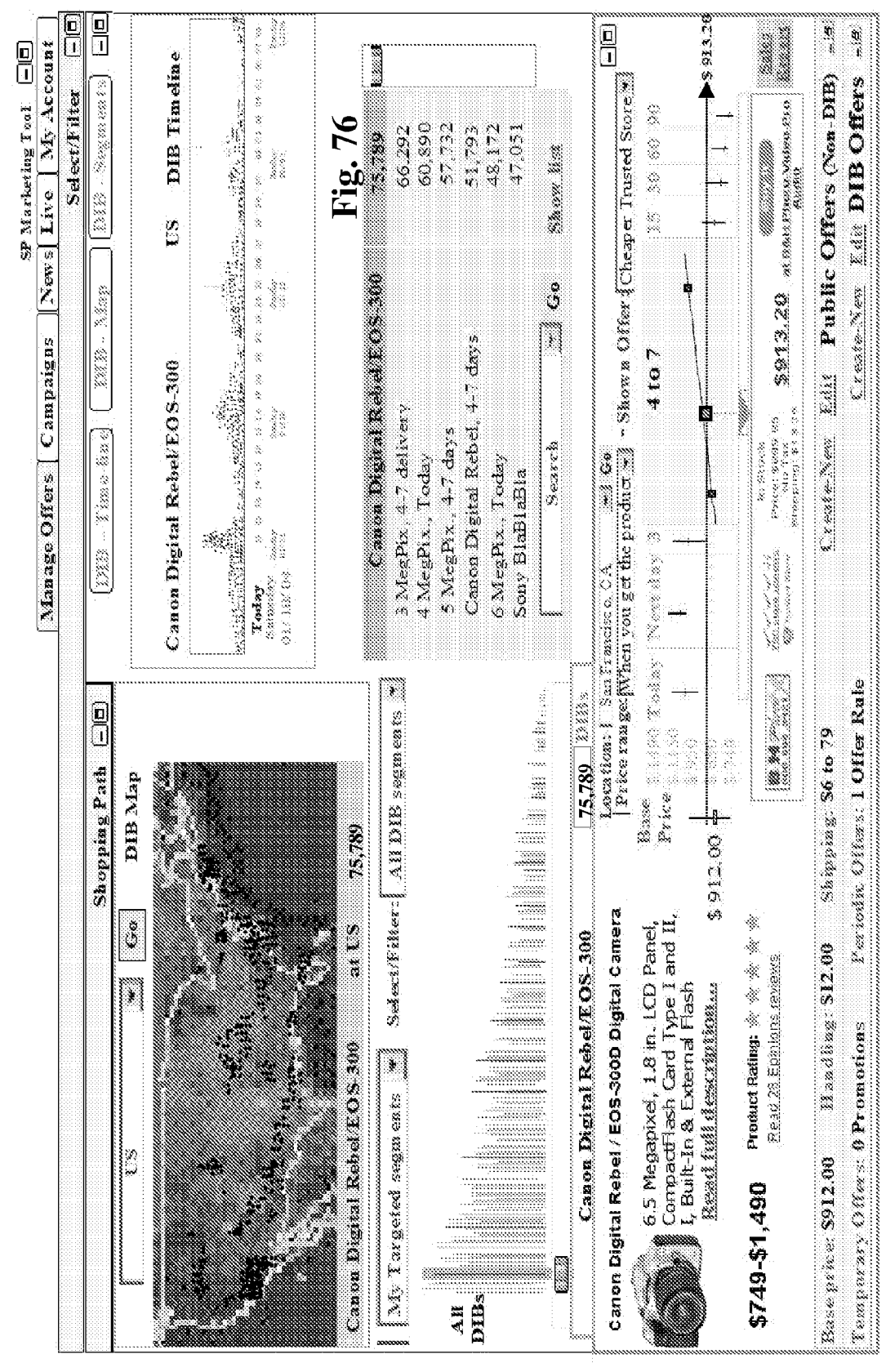

FIG. 76 illustrates an example screenshot of an example graphical interface showing a marketing shopping path tool displaying product offers and DIB-information, and particularly the time-frame and location of the DIBs, related to one selected DIB-segment. The marketing shopping path tool shown on FIG. 76 has the DIB-segments panel 2513 opened, with its DIB-time frame, DIB-map and DIB-segments control functions selected; and also, the manage-my-offers panel is opened, with the Public Offers panel 2509 and the DIB-offers panel 2510 closed. When a seller scrolls the DIB-segment-selector 2511 and selects a specific DIB-segment, the information related to that specific DIB-segment will be displayed or highlighted at whichever the panel or control function of the marketing shopping path tool that is opened. At the exemplary marketing shopping path tool, shown on FIG. 76, the seller selected a DIB-segment related to the Canon Digital Rebel/EOS-300D digital camera, so that offers information related to that camera is displayed at the manage-my-offers panel; and the time-frame and location of the DIBs of that selected DIB-segment are displayed at the DIB-segments panel.

The DIB-map control function provides a map where the location of the DIBs of a certain DIB-segment is located. In one embodiment of this invention, the DIB-map only discloses an approximate location of the consumers' DIBs; so that at the same time the consumers' privacy (their exact location) is preserved, sellers still have a good reference of where is the potential future demand (DIBs). The DIB-time-line control function provides a graph that shows the DIBs of a certain DIB-segment displayed at their preferable date of pick-up/delivery on a time-line. In one embodiment of this invention, the DIB-time-line is juxtaposed by other time-lines graphs showing past sales and forecast sales, so that the seller can analyze the size of the opportunity that DIB-segment represents in comparison with its on sales projections. The combination of the DIB-segments, DIB -time-line and DIB-map control functions provide to sellers a valuable notion of what, where and when is the future sales opportunity, so that sellers can orchestrate their offers in advance, in order to grab as much of that declared demand as possible.

Figure 77:
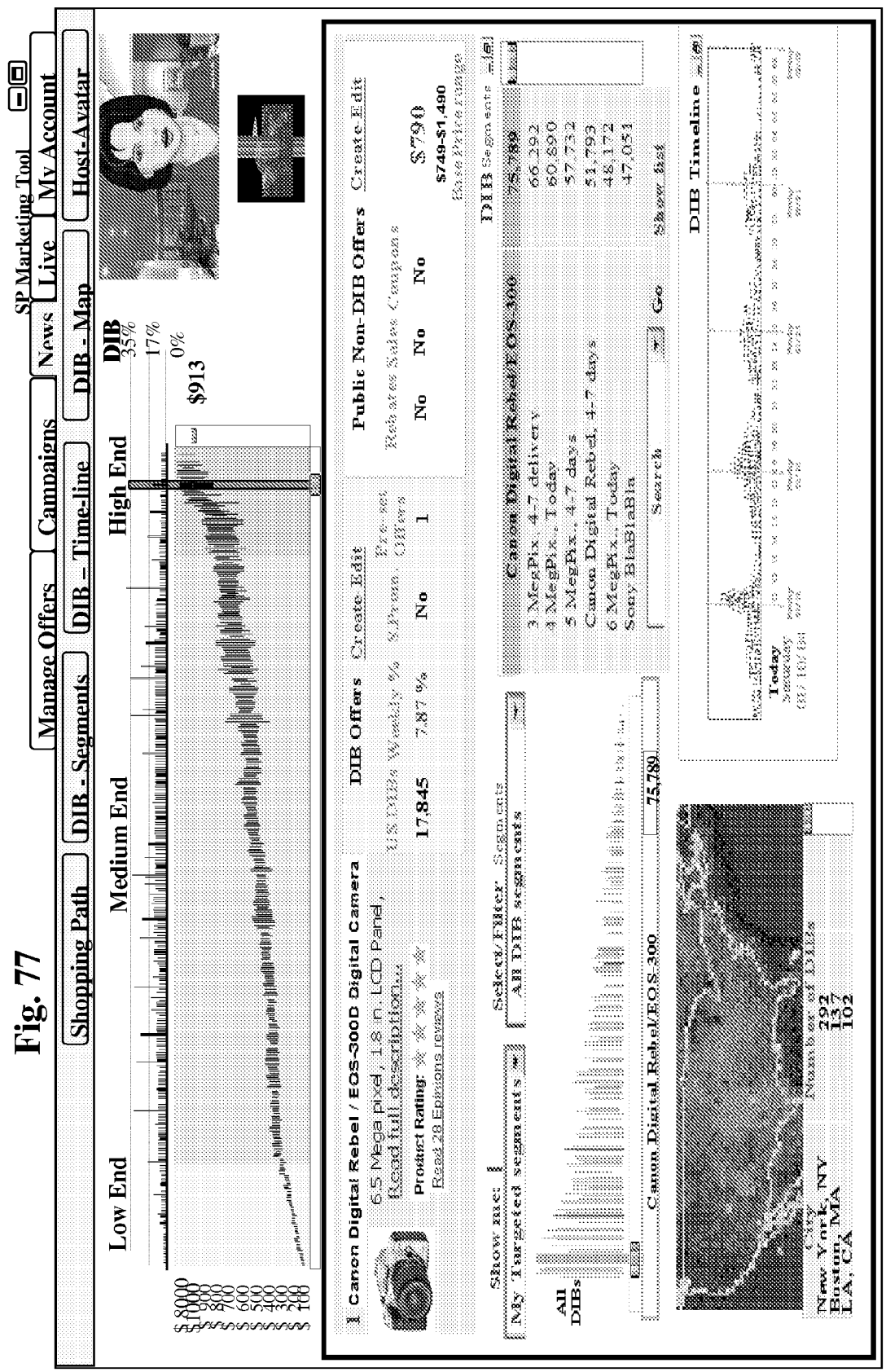
FIG. 77 illustrates an example screenshot of an example graphical interface showing a marketing shopping path tool displaying news/report information being described by an animated host avatar according to specific embodiments of the invention

FIG. 77 illustrates an example screenshot of an example graphical interface showing a marketing shopping path tool displaying news/reports information. The News section of the marketing shopping path tool, shown on FIG. 77, shows the News section with its Shopping Path, DIB -segments, DIB-time frame, DIB -map and host-avatar control functions selected. An animated host avatar, which is located at the right-top section of the screenshot, describes the seller news/ report. The presented screenshot of the seller news/report highlights the offers of the Canon Digital Rebel/EOS-300D digital camera at the digital cameras shopping path; describing a summary of the sellers offers, and DIB-information related to that digital camera.

The news service (control functions) provided by the marketing shopping path tool is not described in detail because it is almost identical to the news service described at the shopping path tool at FIG. 53, FIG. 54 and FIG. 54; the difference of the marketing shopping path tool news service is that it describes information such as the consumers' DIB and product sales which are only pertinent to sellers.

In one embodiment of this invention, a sellers would be able to customize the type of information presented at the news/reports service section of the marketing shopping path tool. In another embodiment of this invention, a seller could determine alarms and triggers for various events, such as competitors' offers, sales volume of products and specific DIB-segments opportunities; being notified by e-mail or mobile device that a selected event was triggered and the related news/report service (describing the selected event) would be available at the news/reports section of the marketing shopping path tool.

Figure 78:
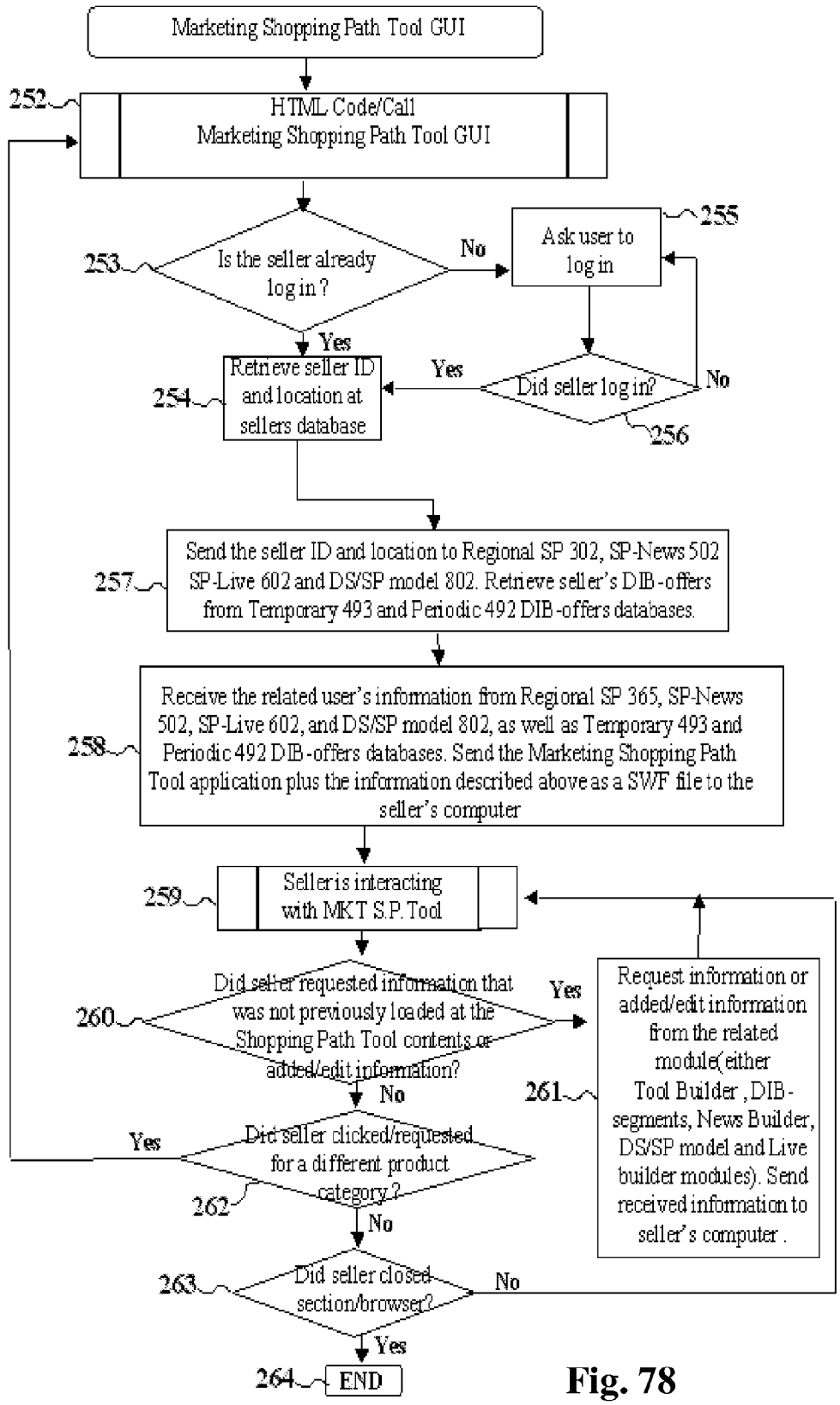
FIG. 78 is a flow chart describing the Marketing Shopping Path tool process 250 (shown in FIG. 12) according to specific embodiments of the invention.

FIG. 78 is a flow chart describing the Marketing Shopping Path tool process 250, implemented at the DS/SP model-tool Server 200, shown in FIG. 12. As illustrated in FIG. 78, the Marketing Shopping Path tool process 250 is initiated during step 252, when Html-code/Call-GUI process 100 requests that a Marketing Shopping Path tool (with information of a certain Product category like digital cameras) needs to be built and downloaded to a certain page. A test is initially performed during step 253 to verify if the seller is already log-in. If it is verified during step 253 that the seller is already log-in, then DS/SP model-tool Server 200 retrieves seller identification (ID) and location at seller database (not show) at the networked hub databases 13, during step 254. If it is determined at step 253 that the seller is not log-in, the seller is asked to log-in, during step 255. Then a further test is performed at step 256, verifying if the seller log-in. If the seller log-in, DS/SP model-tool Server 200 go to step 254, retrieving seller ID and location at sellers database (not show) at the networked hub databases 13.

If it is determined at step 256 that the user didn't log-in, DS/SP model-tool Server 200 will keep asking the sellers ID, and the process won't proceed unless the seller log-in. After the ID and location of the seller is retrieved at step 254, the DS/SP model-tool Server 200 requests the seller's regional product Shopping Path information to Regional SP 302, SP-news 502, SP-Live 602, DS/SP model 802 and also retrieving seller's DIB-offers from Temporary 493 and Periodic 492 DIB-offers databases, during step 257. Thereafter DS/SP model-tool Server 200 received the related seller information from Regional SP 302, SP-news 502, SP-Live 602, Private Settings 650, DS/SP model 802, Temporary 493 and Periodic 492 DIB-offers databases arranging this information according to Marketing Shopping Path Tool template, converting it into a macromedia flash's SWF file and sending it (the Marketing Shopping Path Tool application plus the received information described above) to the seller's computer, during step 258. Thereafter the seller is interacting with the marketing shopping path tool at the web-browser on his/hers computer, during step 259.

A further test is performed at step 260, verifying if the seller requested information that was not previously loaded at the Marketing Shopping Path Tool contents or added/edit information (this also include the Offers (non-DIB) and DIB-Offers creation and edit process 430). If the seller did requested new information or added/edit information, the DS/SP model-tool Server 200 requests information or added/edit information from the related software components (either Regional SP 302, SP-news 502, SP-Live 602, DS/SP model 802, Temporary 493 and Periodic 492 DIB-offers databases). Sending the received information to the seller's computer, during step 261. Thereafter the seller is interacting with the marketing shopping path tool at the web-browser on his/hers computer, during step 259. If the seller didn't request additional information at step 260, a further test is performed at step 262, verifying if the seller clicked/requested information about a different product category. If the seller requested information about a different product category, DS/SP model-tool Server 200 starts the whole process again, performing the process described at step 252. If the user didn't requested information about a different product category, DS/SP model-tool Server 200 performs a further test, verifying if the seller closed the browser, during step 264. If the seller closed the browser, Marketing Shopping Path tool process 250 terminates during step 263. If the seller didn't close the browser, the seller keeps interacting with the marketing shopping path tool at the web-browser on his/hers computer, during step 259.

Figure 79:
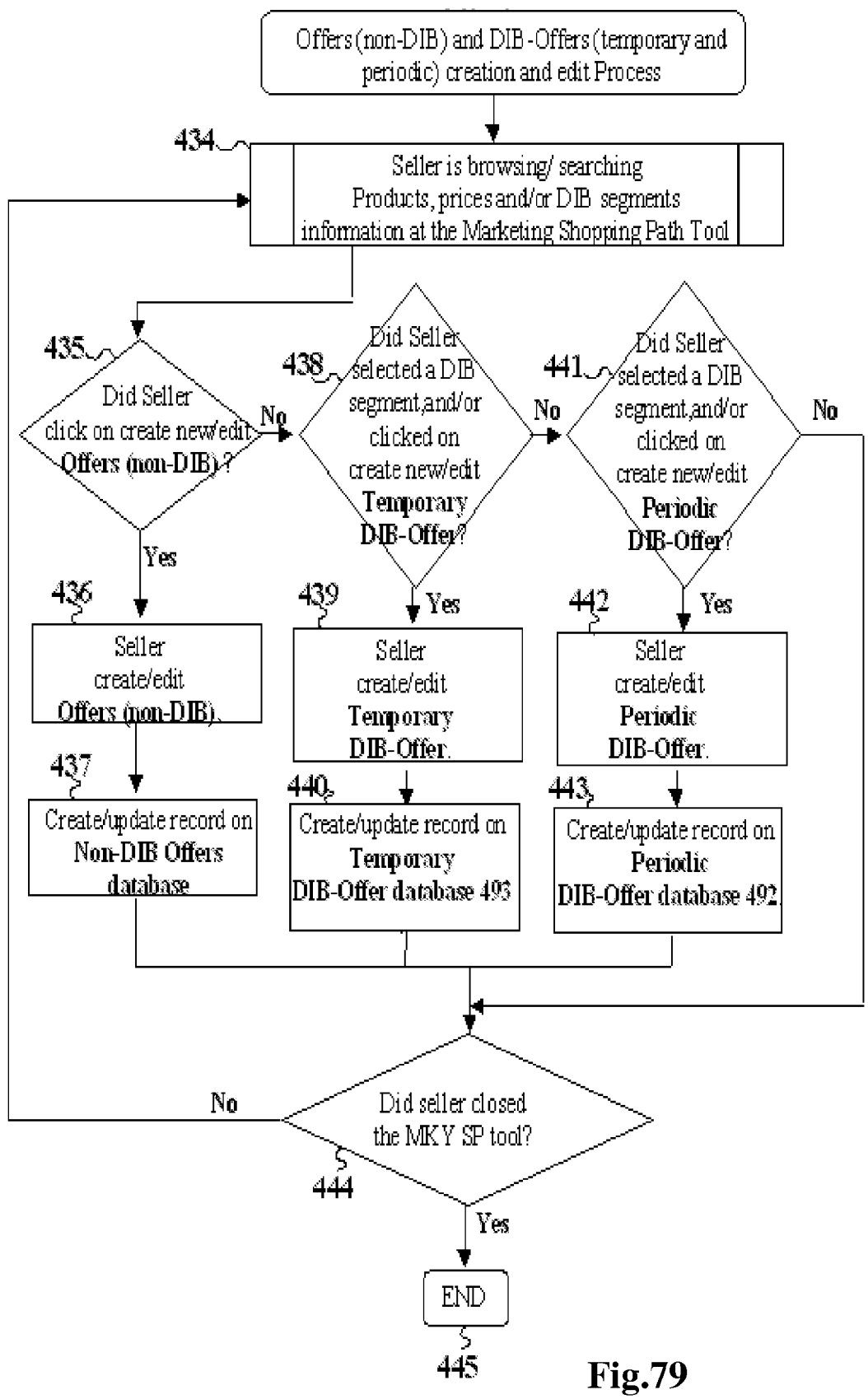
FIG. 79 is a flow chart describing the Offers (non-DIB) and DIB-Offers creation and edit process 430 (shown in FIG. 12) according to specific embodiments of the invention.

FIG. 79 is a flow chart describing the Offers (non-DIB) and DIB-Offers creation and edit process 430, implemented at the DIB Server 401, shown in FIG. 12. As illustrated in FIG. 79, the Offers (non-DIB) and DIB-Offers creation and edit process 430 is initiated during step 434 while the seller is browsing/searching products, prices and/or DIB segments information at the Marketing Shopping Path Tool. An initial test is performed during step 435 verifying if the seller clicked on create new/edit Offers (non-DIB) button. If the seller clicked on the create new/edit Offers (non-DIB) button, then during step 436, the seller creates/edit the (Non-DIB) Offer, see screenshot illustration on FIG. 74. Thereafter, during step 437, DIB Server 401 creates/up-dates a record at the Offers (Non-DIB) database (not shown) at the networked hub databases 13, which may include for each public offer: a specific offer's code, a name, base price, handling and shipping fees and a description of the offer. If the seller didn't click on create new/edit Offers (non-DIB) button, during step 435; a further test is performed at step 438 verifying if the seller clicked on create new/edit Temporary DIB-Offers button.

If the seller clicked on the create new/edit Temporary DIB-Offers button, then during step 439, the seller create/edit a Temporary DIB-Offer (see screenshot illustration on FIG. 75). Thereafter the DIB Server 401, during step 440, creates/up-dates record at the Temporary DIB-Offers database 493, which may include for each Temporary DIB-Offer: a specific offer's code, the circumstance/event/DIB-segment, the condition/rule/offer/promotion (which includes the at least price information) and the time frame of the offer. If the seller didn't click on create new/edit Temporary DIB-Offers button, during step 438; a further test is performed at step 441, verifying if the seller clicked on create new/edit Periodic DIB-Offers button. If the seller clicked on the create new/edit Periodic DIB-Offers button, then during step 442, the seller create/edit a Periodic DIB-Offer (see screenshot illustration on FIG. 75). Thereafter DIB Server 401 creates/up-dates, during step 443, a record at the Periodic DIB-Offers database 492, which may include for each Temporary DIB-Offer: a specific offer's code, the circumstance/event/DIB-segment, the condition/rule/offer/promotion (which includes the at least price information) and maybe the periodic time-intervals of the offer. Whether the seller chose to create/edit a non-DIB Offers, a Temporary or a Periodic DIB-Offer a further test is performed after the steps 437, 440 and 443, verifying if the user closed the Marketing Shopping path tool, during step 444. If the user didn't close the tool, the process goes back to step 434 where the seller is browsing/searching at the Marketing Shopping Path Tool. If the user closed the Marketing Shopping Path tool, Offers (non-DIB) and DIB-Offers creation and edit process 430 is terminated at step 445. If the seller didn't click on create new/edit Periodic DIB-Offers button, during step 441; then the process goes to step 444, verifying if the user closed the Marketing Shopping path tool.

In one embodiment of this invention, the DS/SP system is deployed at a price comparison engine; where consumers (usually) compare products and offers, but after clicking an offer, consumers are sent to the seller website to proceed the purchase process. DIB-offers can be public and also can be selective to specific DIB-segments; and in regard to the selective DIB-offers, the seller would need a mechanism (at their website) that allows consumers to have access to selective DIB-offers, that are not publicly available at the seller's website. In this price comparison engine embodiment of the present invention, public-offer, temporary DIB-offer and periodic DIB-offer are also stored at the seller's database; so that when the consumer clicks on a DIB-offer, for example, the consumer is sent to the seller's website, having access to that DIB-offer. In one embodiment of this invention, at the Offers (non-DIB) and DIB-Offers creation and edit process 430, after the seller created an offer (either public or DIB offer) at steps 436, 439 and 443; the DIB Server 401 would store the created offer (at steps 437, 440 and 444) not only at the DIB-offers databases (at the DIB data storage device 490) but also at the seller's offers database (not shown on the computers 2 of FIG. 11). In one embodiment of this invention, when the consumer click on a DIB-offer at the shopping path tool, the specific code of the DIB-offer would be automatically copied while the consumer is sent to a specific web-page of the seller's website. Said web-page of the seller's website asks the consumer to click on a "Click here to get your offer" button that would paste the specific code of that DIB-offer, then the consumers have access to its selective specific DIB-offer.

In another embodiment of the present invention, consumers have the ability to DIB for customized products (determining their desirable customized product features as part of their DIBs). At this embodiment, sellers can define rules for product configuration (different prices for different features and services) at the DIB-configurator section (shown on FIG. 75). The definition of these rules for product configuration would take place at the Offers (non-DIB) and DIB-Offers creation and edit process 430. At this embodiment, the Offers (non-DIB) and DIB-Offers creation and edit process 430 have three additional steps, particularly, after a "no" answer at step 441, (instead of going to step 444) the DIB-server 401, would make a additional test (say step 447 not shown of FIG. 79) verifying if the sellers clicked the edit button at the DIB-configurator section (shown on FIG. 75) and wanted to create or edit rules for product configuration (for that specific product). If the seller didn't want to create or edit rules for product configuration, during step 447 (not shown of FIG. 79); then the process goes to step 444 (and proceeds as shown on FIG. 79). If the seller wants to create or edit rules for product configuration, during step 447 (not shown on FIG. 79); then the seller creates or edits the required rules for the specific product configuration, during step 448 (not shown on FIG. 79). Thereafter the DIB Server 401 creates/up-dates record at the product configuration database (not shown at the DIB-process module 400 of FIG. 12), during step 449 (not shown on FIG. 79). Thereafter the process goes to step 444 (and proceeds as shown on FIG. 79).

5. Demand And Supply Map Model

The DS/SP model is a graphical model that maps/models several aspects of the demand and supply dynamics at the different levels of the Earth's locations (over time), representing the process of the demand and supply dynamics as a dynamic graphical structure. FIG. 4 to FIG. 11 exemplifies and explains the demand and supply map (DS Map) model and the shopping path model, however details about the models spatial form, proportions and dimensions(which are related to the Earth's locations/dimensions, time and money) were not described. The DS map and Shopping Path models spatial form, proportions and dimensions are detailed at the appendix: Demand and Supply Map (DS Map) conceptual model.

In one embodiment of the presented invention, a networked hub at the Internet (such as e-retailer, a search or price comparison engine) runs a DS/SP model software system, which use part or all of the network's information to build a DS/SP model. In one embodiment of the presented invention, the DS/SP model software system use data from the networked hub (such as sales and DIBs) to build an animated model of a regional shopping path (such as the San Francisco Shopping Path). This animated model of a regional shopping path can be displayed at buyers' shopping tools and sellers' marketing tools, for example, to illustrate and support news and reports functions (as shown on FIG. 53a, FIG. 53b and FIG. 77). In one embodiment of the presented invention, the networked hub can choose the circumstances when the shopping and marketing tools display an animated regional shopping path that represents actual data, and when the displayed animated regional shopping path is just a fictitious illustration.

Figure 80:
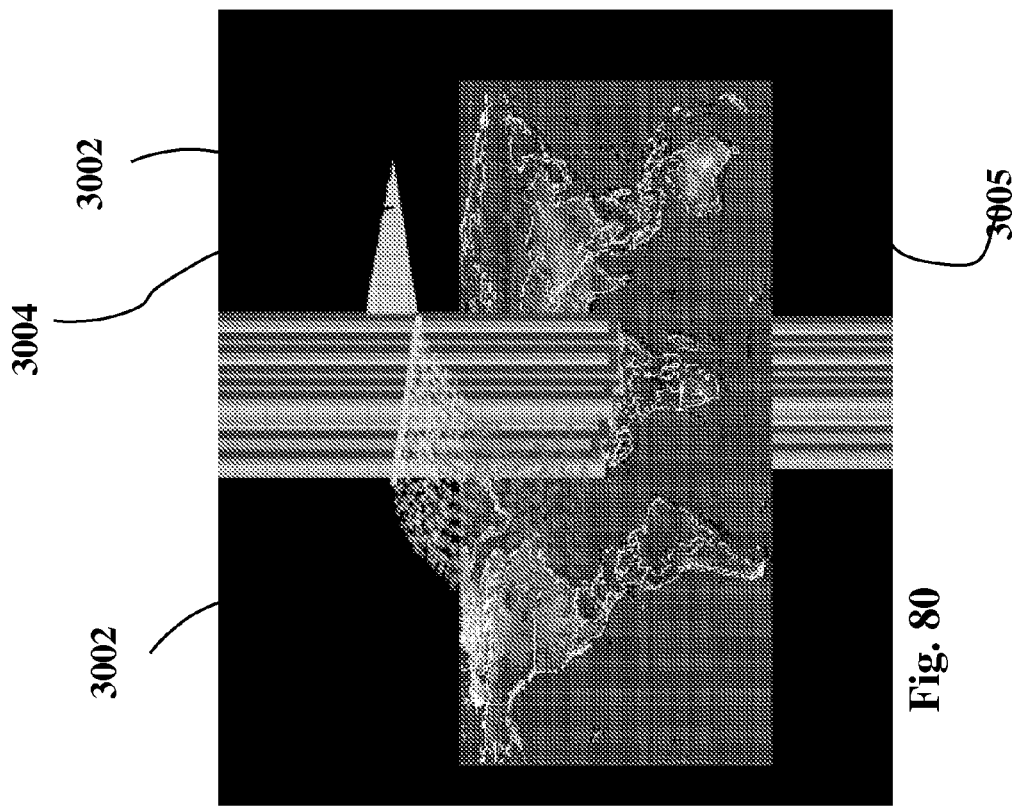
FIG. 80 illustrates an example screenshot of an animated regional shopping path, and particularly an example illustration of the earth shopping path according to specific embodiments of the invention.

FIG. 80 illustrates an example screenshot of an animated regional shopping path, and particularly a fictitious illustration of the earth's shopping path 3001. This fictitious illustration displays only a illustrative product cascade 3002 at the earth shopping path 3001; wherein the DIB space 3004 (above the shopping path 3002) and the DS Map tail 3005 are empty, with no DIBs displayed at the DIB space 3004 and no past sales displayed at the DS Map tail 3005. According to the DS/SP model, the product cascade 3002 represents the flow of products and services that are being acquired by consumers at the represented specific region (at the represented specific time); wherein each ball falling from the shopping path represents a product that were picked-up/delivered to a consumer at the represented time.

Figure 81:
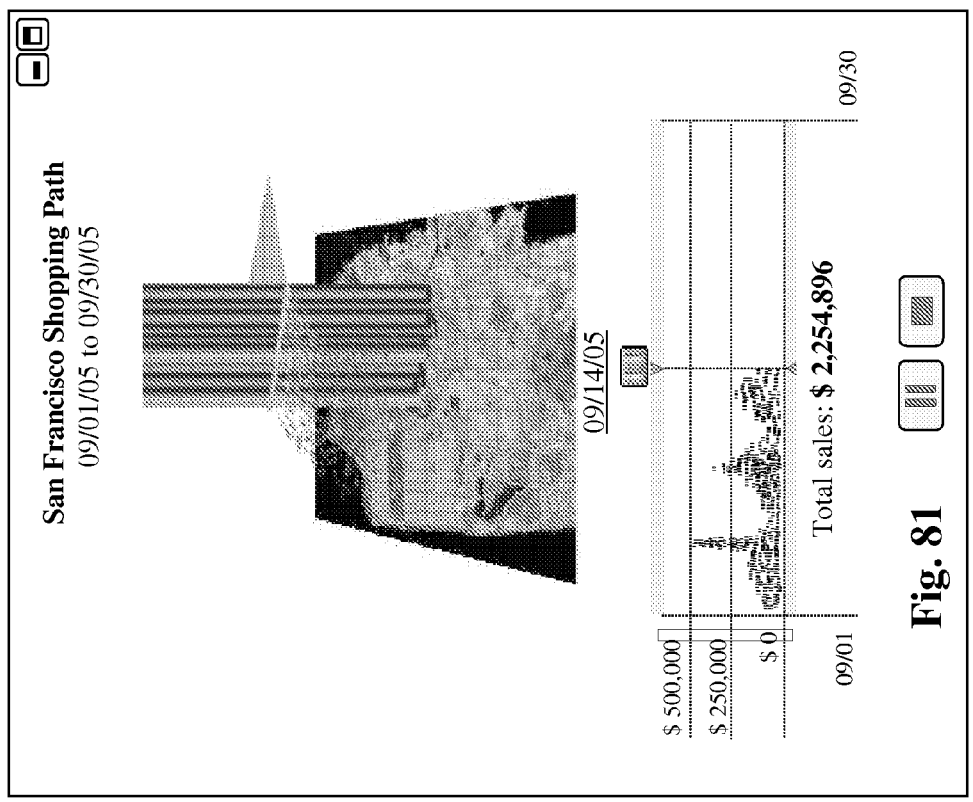
FIG. 81 illustrates an example screenshot of an example graphical interface showing a simple animation of a regional shopping path, and particularly a simple animation of an actual San Francisco shopping path (built by past and actual sales data from a net-worked hub) according to specific embodiments of the invention.

FIG. 81 illustrates an example screenshot of an example graphical interface showing a simple animation of a regional shopping path, and particularly a simple animation of an actual San Francisco shopping path (built by past and actual sales data from the networked hub). Similarly to the example shown on FIG. 80, the animated actual model shown of FIG. 81 displays only the product cascade at the San Francisco shopping path; the DIB space is empty and DS Map tail is not even displayed. The screenshot shows the actual sales volume at the San Francisco shopping path animation (at the networked hub) over the period of Sep. 01, 2005 to Sep. 14, 2005 was $2,254,896. The graphical interface provides to the user a play, pause and stop buttons, as well as a time-line scrolling button.

Figure 82:
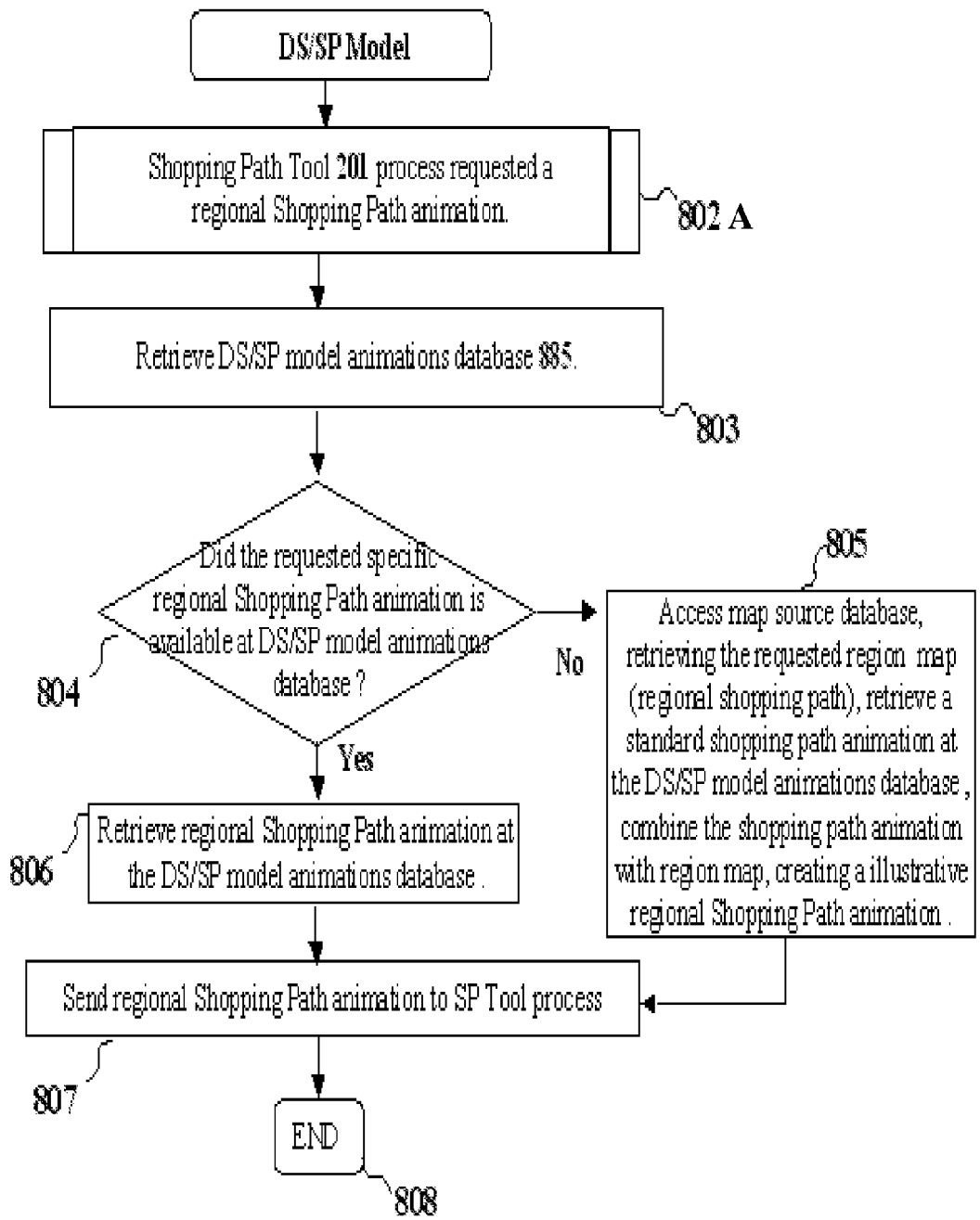
FIG. 82 is a flow chart describing the DS/SP model process 802 (shown in FIG. 12) according to specific embodiments of the invention.

FIG. 82 is a flow chart describing the DS/SP model process 802, implemented at the DS/SP model Server 801, shown in FIG. 12. As illustrated on FIG. 82, the DS/SP model process 802 is initiated during step 802A when Shopping Path Tool process 201 requested a regional Shopping Path animation. Thereafter DS/SP model Server 801 retrieves DS/SP model animations database 885, during step 803. An initial test is performed at step 804 verifying if the requested specific regional Shopping Path animation is available at DS/SP model animations database 885. If the requested regional Shopping Path animation is available at DS/SP model animations database 885, then DS/SP model Server 801 retrieves the requested regional Shopping Path animation at the DS/SP model animations database 885, during step 806. If the requested regional Shopping Path animation is not available at DS/SP model animations database 885, then the DS/SP model Server 801 will build it, during step 805. In this particular embodiment the networked hub pre-determined a limit number of specific regional shopping paths that will be pre-built/up-dated and stored at DS/SP model animations database 885, and if the requested regional shopping paths is not pre-built then an illustrative/fictitious regional shopping paths is built on the fly. At step 805, DS/SP model Server 801 accesses a map source database (it can be a third part database such as Google earth database), retrieving the requested region map (related to the regional shopping path); and then it retrieves a standard shopping path animation at the DS/SP model animations database 885, and then it combines the shopping path animation with region map, creating a illustrative regional Shopping Path animation. Thereafter both step 805 and 806, DS/SP model Server 801 sends the requested regional Shopping Path animation to SP Tool process 201, at step 807. After SP Tool process 201 receives the specific regional Shopping Path animation, DS/SP model process 802 is terminated at step 808.

Figure 83:
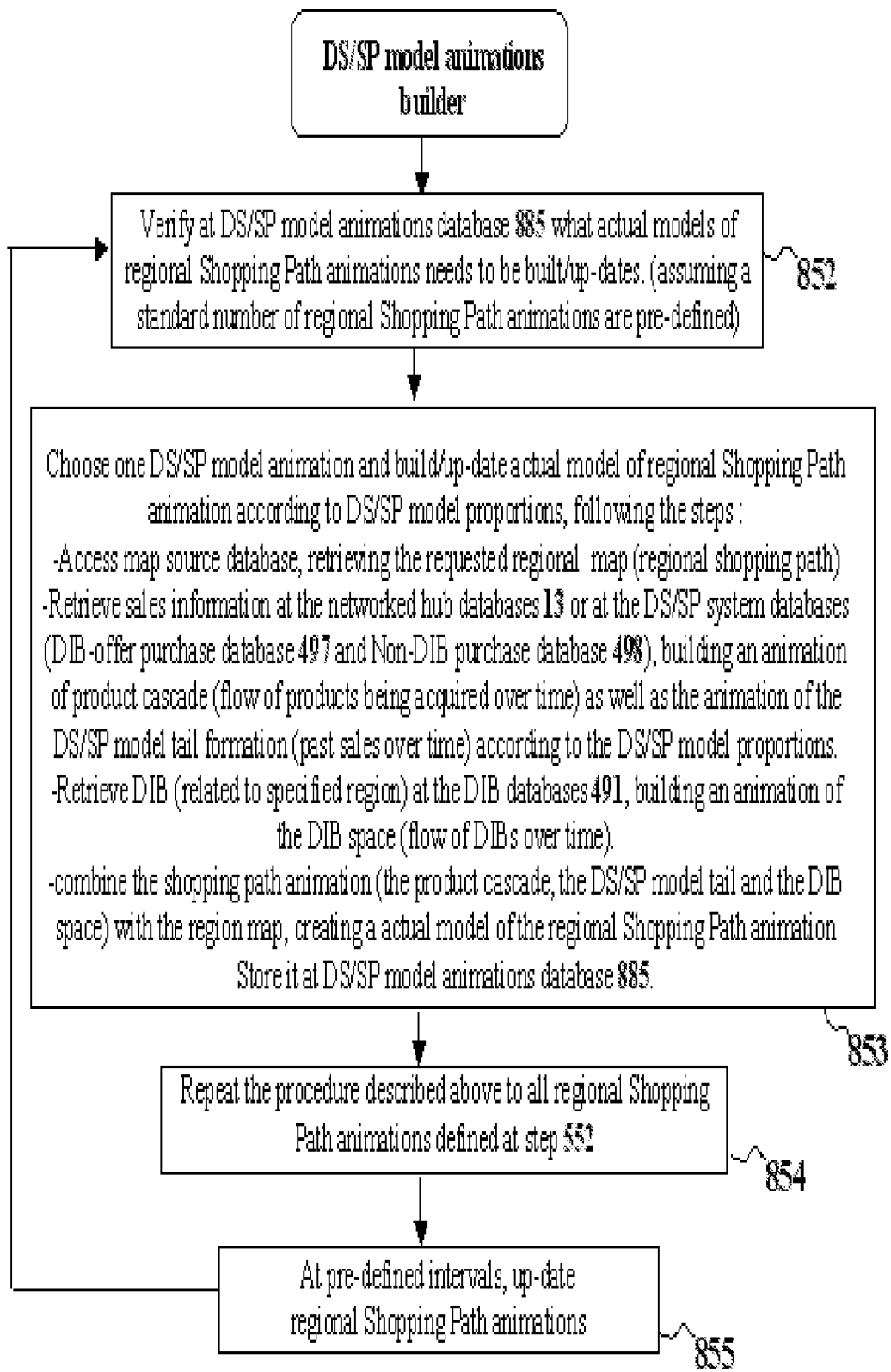
FIG. 83 is a flow chart describing the DS/SP model animations builder 850 (shown in FIG. 12) according to specific embodiments of the invention.

FIG. 83 is a flow chart describing the DS/SP model animations builder 850, implemented at the DS/SP model Server 801, shown in FIG. 12 as Regional SP animation builder 850. As illustrated in FIG. 83, DS/SP model animations builder 850 is initiated during step 852, when DS/SP model Server 801 verifies at DS/SP model animations database 590 what are the actual-models of regional Shopping Path animations that needs to be built/up-dated (assuming a standard number of regional Shopping Path animations are pre-defined by the networked hub). Thereafter, during step 853, DS/SP model Server 801 chooses one DS/SP model animation and build/up-date the actual model of regional Shopping Path animation according to DS/SP model proportions, following the steps:

Access map source database, retrieving the requested regional map (regional shopping path)

Retrieve sales information at the networked hub databases 13 or at the DS/SP system databases (DIB-offer purchase database 497 and Non-DIB purchase database 498), building an animation of product cascade (flow of products being acquired over time) as well as the animation of the DS/SP model tail formation (past sales over time) according to the DS/SP model proportions.

Retrieve the DIBs (related to the specified region) at the DIB databases 491, building an animation of the DIB space (flow of DIBs over time).

Combine the shopping path animation (the product cascade, the DS/SP model tail and the DIB space) with the region map, creating an actual model of the regional Shopping Path animation Store it at DS/SP model animations database 589.

Thereafter, during step 854, DS/SP model Server 801 repeats the procedure described above to all regional Shopping Path animations defined at step 552. Thereafter, during step 885, DS/SP model Server 801 will up-date the regional Shopping Path animations, at pre-defined intervals, going back to step 852.

In another embodiment of this invention, a DS/SP model system have access to the enterprise analytical databases (data warehouse and OLAP 14 of FIG. 11), collecting the required data, building DS/SP model animations (by DS/SP model animations builder process 850) and delivering those animations to enterprise applications 17.

Embodiment in a Programmed Information Appliance

Figure 84:
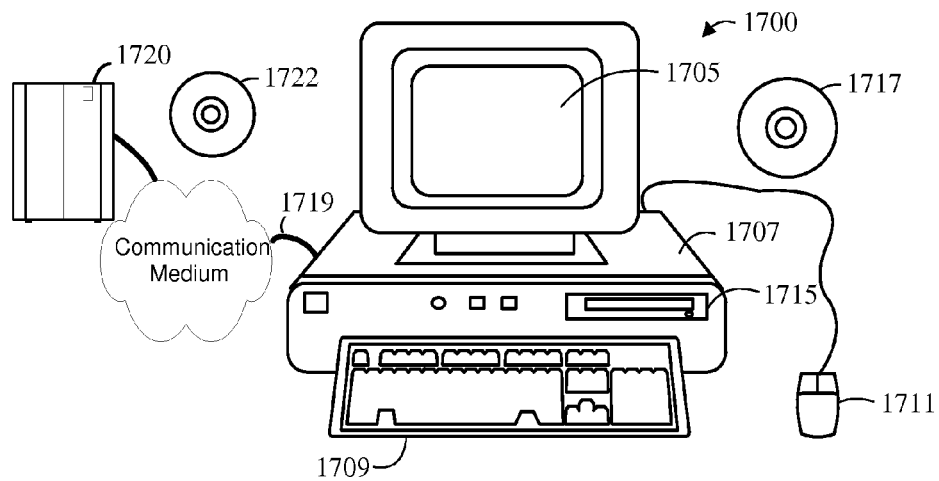
FIG. 84 is a block diagram showing a representative example logic device in which various aspects of the present invention may be embodied.
Figure 48G:
FIG. 48g illustrates a shopping path panel that is deployed as an advertisement (such as expandable rich media advertising) according to specific embodiments of the invention.

FIG. 84 is a block diagram showing a representative example logic device in which various aspects of the present invention may be embodied. As will be understood to practitioners in the art from the teachings provided herein, the invention can be implemented in hardware and/or software. In some embodiments of the invention, different aspects of the invention can be implemented in either client-side logic or server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a user on a fixed media for physically loading into a user's computer or a fixed media containing logic instructions may reside on a remote server that a user accesses trough a communication medium in order to download a program component.

FIG. 84 shows an information appliance (or digital device) 1700 that may be understood as a logical apparatus that can read instructions from media 1717 and/or network port 1719, which can optionally be connected to server 1720 having fixed media 1722. Apparatus 1700 can thereafter use those instructions to direct server or client logic, as understood in the art, to embody aspects of the invention. One type of logical apparatus that may embody the invention is a computer system as illustrated in 1700, containing CPU 1707, optional input devices 1709 and 1711, disk drives 1715 and optional monitor 1705. Fixed media 1717, or fixed media 1722 over port 1719, may be used to program such a system and may represent a disk-type optical or magnetic media, magnetic tape, solid state dynamic or static memory, etc. In specific embodiments, the invention may be embodied in whole or in part as software recorded on this fixed media. Communication port 1719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language, which may be used to create an ASIC, or PLD that operates as herein described.

7. Other Embodiments

The invention has now been described with reference to specific embodiments. Other embodiments will be apparent to those of skill in the art. In particular, a user digital information appliance has generally been illustrated as a personal computer. However, the digital computing device is meant to be any information appliance for interacting with a remote data application, and could include such devices as a digitally enabled television, cell phone, personal digital assistant, laboratory or manufacturing equipment, etc. It is understood that the examples and embodiments described herein are for illustrative purposes and that various modifications or changes in light thereof will be suggested by the teachings herein to persons skilled in the art and are to be included within the spirit and purview of this application and scope of the claims.

Furthermore, various different actions can be used to effect indications of a product or other display object. For example, a voice command may be spoken by the purchaser, a key may be depressed by the purchaser, a button on a client-side scientific device may be depressed by the user, or selection using any pointing device may be effected by the user.

All publications, patents, and patent applications cited herein or filed with this application, including any references filed as part of an Information Disclosure Statement, are incorporated by reference in their entirety.

What is claimed:

1. A computer interface system providing a visual display enabling a user to compare products or offers, said system executing on a computing device, said visual display comprising:

a shopping path panel presenting a plurality of display objects;

wherein a majority of said display objects each represent a range of offers for a products or service;

wherein different ones of said display objects each represent a range of offers for different but similar or related products or services;

said display objects arranged side-by-side in one or more linear, increasing, or decreasing patterns;

said one or more linear, increasing, or decreasing patterns providing a visual comparison between multiple offers for each of a number of different related products or services;

said display objects arranged side-by-side such that an object's position relative to said pattern indicates a value related to that object's corresponding range of offers;

said display objects arranged such that a majority of objects being compared, can be seen on one display regardless of the number of product options, without the need of scrolling down the page;

wherein an object's placement compared to other objects indicates a relationship between that object's associated offers and other objects associated offers;

wherein one or more of said display objects can be indicated;

wherein indicating a display object causes details about a range of offers associated with that object to be presented; and said visual display patterns providing a compact way for a viewer to compare both a number of different offers for one particular product to a number of different offers for similar or related products or services.

2. The system of claim 1 further wherein:

said shopping path panel indicates on a first axis prices; and said shopping path panel indicates on a second axis a grouping related to one or more characteristics of product offers or group of product offers, such as price and features.

3. The system of claim 1 further comprising:

a plurality of product images;

wherein a product image enlarges when indicated or selected, providing an enlarged image of a product on offer;

wherein a plurality of product images near an enlarged product image also enlarge, providing multiple images of different products on offer.

4. The system of claim 3 further wherein:

said display objects are said product images.

5. The system of claim 3 further wherein:

said display objects are displayed adjacent to said product images.

6. The system of claim 3 further wherein:

said shopping path panel can display a comparison of a large number of products of a product category at once (regardless of the number of products or amount of product options), without the need of scrolling down the page.

7. The system of claim 3 further wherein:

said shopping path panel is a pictorial pattern that can be seem at once.

8. The system of claim 3 further wherein:

the position of the price of each and all other product options can be seen and compared inside that contextual pattern.

9. The system of claim 1 further comprising:

a map display indicating an available location of one or more product offers.

10. The system of claim 1 further wherein different categories of offers are displayed side-by-side.

11. The system of claim 10 further wherein:

one or more of said display objects can represent dynamic-price offers;

said dynamic-price offers are displayed at a designated section of said panel;

a vertical axis represents price;

a horizontal axis represents offers categories and or a timeline;

a horizontal position of a dynamic-price offer is determined by its future-time deadline.

12. The system of claim 1 further comprising:

a product list panel indicating a list of products related by one or more characteristics;

an interactive linking between said shopping path panel and said product list panel, such that when an object is selected or otherwise indicated in said shopping path panel a corresponding object is selected in said product list panel; and when a specific product is selected or otherwise indicated or displayed in said product list panel, a corresponding object in said shopping path panel is highlighted.

13. The system of claim 1 further comprising:

a menu allowing a user to select a second grouping of interest related to said product offers;

said shopping path panel thereby displaying objects in a plurality of groups, each group providing a linear, increasing or decreasing pattern of product offers.

14. The system of claim 1 further comprising:

a compare similar offers filter selector that when selected causes products or offers with similar features to a selected or highlighted product or offer to remain displayed at said panel, while suppressing the display of products or offers that do not have similar features to a selected or highlighted product or offer.

15. The system of claim 1 further comprising:

one or more ads placed along said shopping path panel;

wherein indicating an ad or a portion thereof causes said shopping path panel to indicate one or more products related to said ad.

16. The system of claim 1 further comprising:

one or more video or animated graphical representation describing, vocally or in a written form, advertisement of said products and or offers.

* * * * *